(12) United States Patent
Baldwin et al.

(10) Patent No.: US 12,057,688 B1
(45) Date of Patent: Aug. 6, 2024

(54) CONFIGURABLE ELECTRICAL OUTLET COVER ENCLOSURE

(71) Applicants: Jeffrey P. Baldwin, Anthem, AZ (US); John E. Klein, Chandler, AZ (US)

(72) Inventors: Jeffrey P. Baldwin, Anthem, AZ (US); John E. Klein, Chandler, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 309 days.

(21) Appl. No.: 17/695,754

(22) Filed: Mar. 15, 2022

Related U.S. Application Data

(63) Continuation-in-part of application No. 17/020,965, filed on Sep. 15, 2020, now Pat. No. 11,276,996, and a continuation-in-part of application No. 16/990,958, filed on Aug. 11, 2020, now Pat. No. 11,539,196, said application No. 17/020,965 is a continuation of application No. 16/524,680, filed on Jul. 29, 2019, now Pat. No. 10,777,981, said application No. 16/990,958 is a continuation of application No. 16/102,676, filed on Aug. 13, 2018, now Pat. No. 10,742,010, which is a continuation-in-part of application No. 16/028,254, filed on Jul. 5, 2018, now Pat. No. 10,490,988, which is a continuation-in-part of application No. 15/944,689, filed on Apr. 3, 2018, now Pat. No. 10,367,341, which is a continuation of application No. 15/265,837, filed on Sep. 14, 2016, now Pat. No. 9,935,436.

(60) Provisional application No. 62/218,374, filed on Sep. 14, 2015.

(51) Int. Cl.
*H02G 3/08* (2006.01)
*H02G 3/14* (2006.01)

(52) U.S. Cl.
CPC ............. *H02G 3/083* (2013.01); *H02G 3/088* (2013.01); *H02G 3/14* (2013.01)

(58) Field of Classification Search
CPC .......... H02G 3/088; H02G 3/14; H02G 3/081; H02G 3/083; H02G 3/08
See application file for complete search history.

(56) References Cited

U.S. PATENT DOCUMENTS

| | | |
|---|---|---|
| 2,458,153 A | 1/1949 | Festge |
| 2,880,264 A | 3/1959 | Ruskin |
| 2,916,733 A | 12/1959 | Hirsch |
| 3,449,706 A | 6/1969 | Carissimi |
| 4,634,015 A | 1/1987 | Taylor |
| 4,803,307 A | 2/1989 | Shotey |
| 4,988,832 A | 1/1991 | Shotey |

(Continued)

*Primary Examiner* — Stephen J Castellano
(74) *Attorney, Agent, or Firm* — Booth Udall Fuller, PLC; Kenneth C. Booth

(57) ABSTRACT

An electrical outlet cover with a lid having an adjustable enclosure. The electrical outlet cover includes a base coupled to an electrical outlet and a hinged lid. The lid includes a frame with a central aperture and a gasket with a sealing edge surrounding the central aperture. The enclosure is slidably coupled to the lid within the central aperture and is configured to move between a collapsed position and an extended position. The enclosure has a front wall, a side wall extending rearward from the front wall, and a ledge extending outward from the side wall. The side wall of the enclosure has a first groove and a second groove. When the enclosure is in the collapsed position, the sealing edge of the gasket is in the first groove and when the enclosure is in the extended position, the sealing edge of the gasket is in the second groove.

20 Claims, 60 Drawing Sheets

(56) References Cited

U.S. PATENT DOCUMENTS

| | | |
|---|---|---|
| 5,042,673 A | 8/1991 | McShane |
| 5,171,939 A | 12/1992 | Shotey |
| 5,389,740 A | 2/1995 | Austin |
| 5,445,539 A | 8/1995 | Dale |
| 5,527,993 A | 6/1996 | Shotey |
| 5,562,222 A | 10/1996 | Shilinsky |
| 5,574,256 A | 11/1996 | Cottone |
| 5,703,329 A | 12/1997 | Delone |
| 5,763,831 A | 6/1998 | Shotey et al. |
| 5,875,912 A | 3/1999 | Hobson |
| 5,931,325 A | 8/1999 | Filipov |
| 6,133,531 A | 10/2000 | Hayduke et al. |
| 6,166,329 A | 12/2000 | Oliver et al. |
| 6,232,553 B1 | 5/2001 | Regen |
| 6,300,567 B1 | 10/2001 | Hayduke |
| 6,395,984 B1 | 5/2002 | Gilleran |
| 6,441,307 B1 | 8/2002 | Shotey |
| 6,476,321 B1 | 11/2002 | Shotey |
| 6,642,453 B2 | 11/2003 | Shotey et al. |
| 6,723,922 B1 | 4/2004 | Shotey |
| 6,737,576 B1 | 5/2004 | Dinh |
| 6,761,582 B1 | 7/2004 | Shotey |
| 6,770,816 B2 | 8/2004 | Shotey |
| 6,820,760 B2 | 11/2004 | Wegner |
| 6,894,223 B1 | 5/2005 | Shotey et al. |
| 6,956,169 B1 | 10/2005 | Shotey et al. |
| 6,979,777 B2 | 12/2005 | Marcou et al. |
| 6,987,225 B2 | 1/2006 | Shotey |
| 7,034,222 B1 | 4/2006 | York |
| 7,038,131 B1 | 5/2006 | Gretz |
| 7,109,414 B2 | 9/2006 | Reynolds |
| 7,109,419 B1 | 9/2006 | Gretz |
| 7,176,377 B1 | 2/2007 | Gretz |
| 7,179,996 B1 | 2/2007 | Britt |
| 7,259,328 B1 | 8/2007 | Gretz |
| 7,301,099 B1 | 11/2007 | Korez |
| 7,321,096 B1 | 1/2008 | Huang |
| 7,388,162 B1 | 6/2008 | Gretz |
| 7,396,996 B1 | 7/2008 | Shotey et al. |
| 7,431,594 B2 | 10/2008 | Castaldo |
| 7,479,598 B1 | 1/2009 | Shotey et al. |
| 7,541,540 B1 | 6/2009 | Shotey et al. |
| 7,554,037 B1 | 6/2009 | Shotey et al. |
| 7,598,454 B1 | 10/2009 | Baldwin |
| 7,619,163 B1 | 11/2009 | Shotey |
| 7,626,121 B1 | 12/2009 | Cleghorn |
| 8,017,865 B1 | 9/2011 | Baldwin |
| 8,053,671 B1 | 11/2011 | Shotey |
| 8,106,295 B1 | 1/2012 | Shotey |
| 8,389,858 B2 | 3/2013 | Drane |
| 8,569,620 B1 | 10/2013 | Baldwin |
| 8,586,864 B1 | 11/2013 | Shotey |
| 9,935,436 B1 | 4/2018 | Baldwin |
| 9,960,524 B2 | 5/2018 | Sathyanarayana |
| D843,331 S | 3/2019 | Long et al. |
| D848,348 S | 5/2019 | Long et al. |
| 10,367,341 B1 | 7/2019 | Baldwin |
| 10,490,988 B1 | 11/2019 | Baldwin |
| 10,742,010 B1 | 8/2020 | Baldwin |
| 11,539,196 B1 | 12/2022 | Baldwin |
| 2003/0089710 A1 | 5/2003 | Gates |
| 2005/0197019 A1 | 9/2005 | Maltby |
| 2018/0034253 A1 | 2/2018 | Mortun |
| 2018/0048132 A1 | 2/2018 | Dinh et al. |

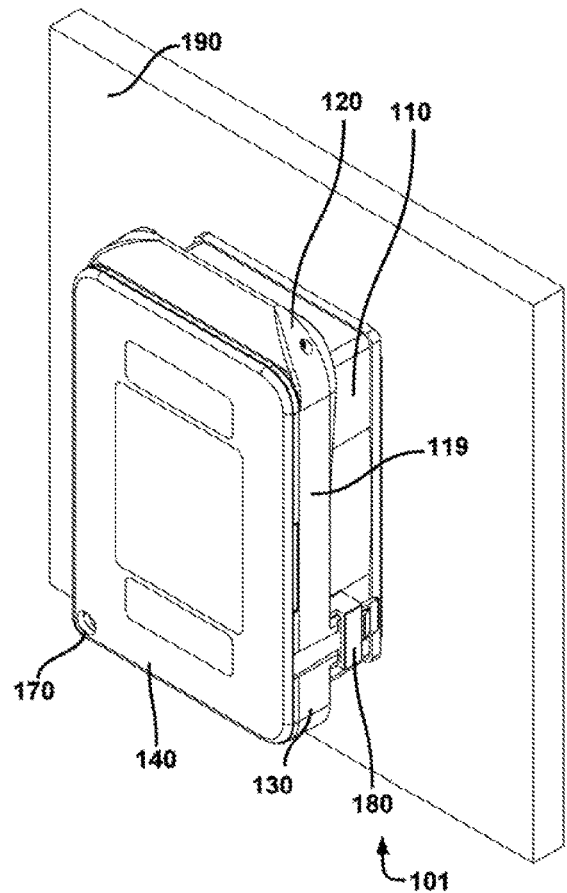
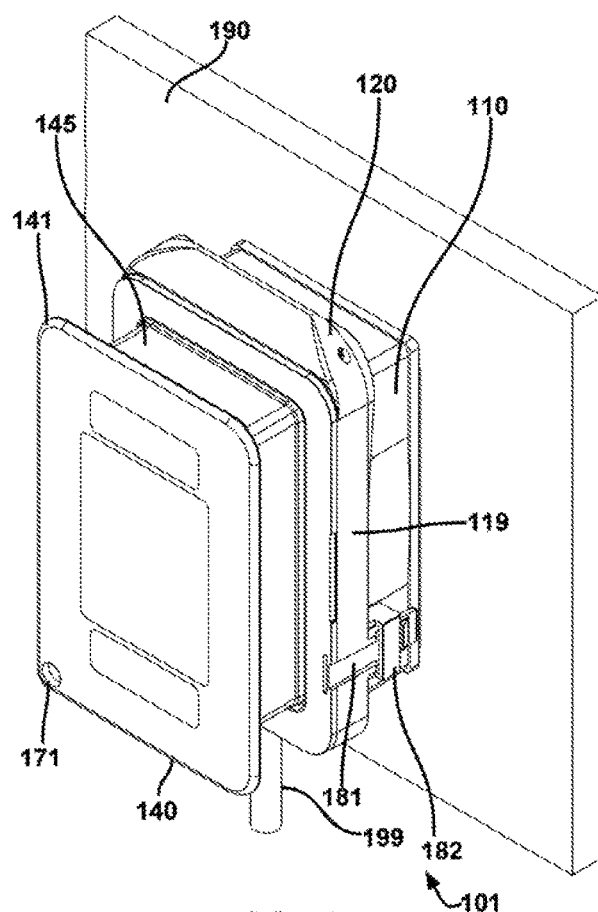
FIG. 1
FIG. 2

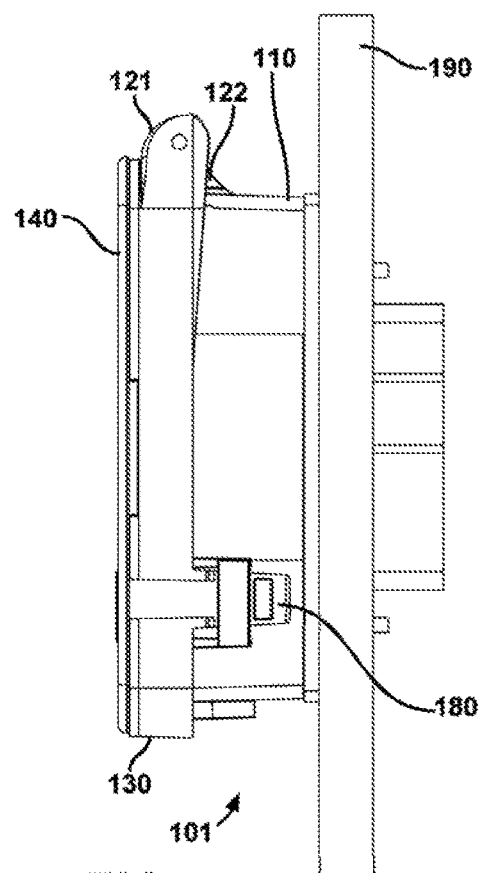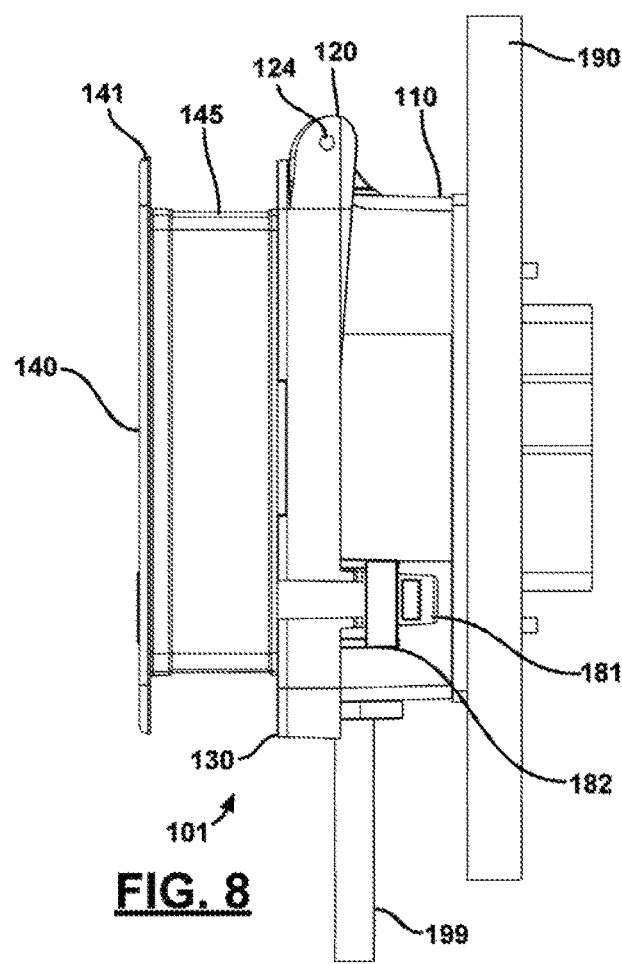
FIG. 7
FIG. 8

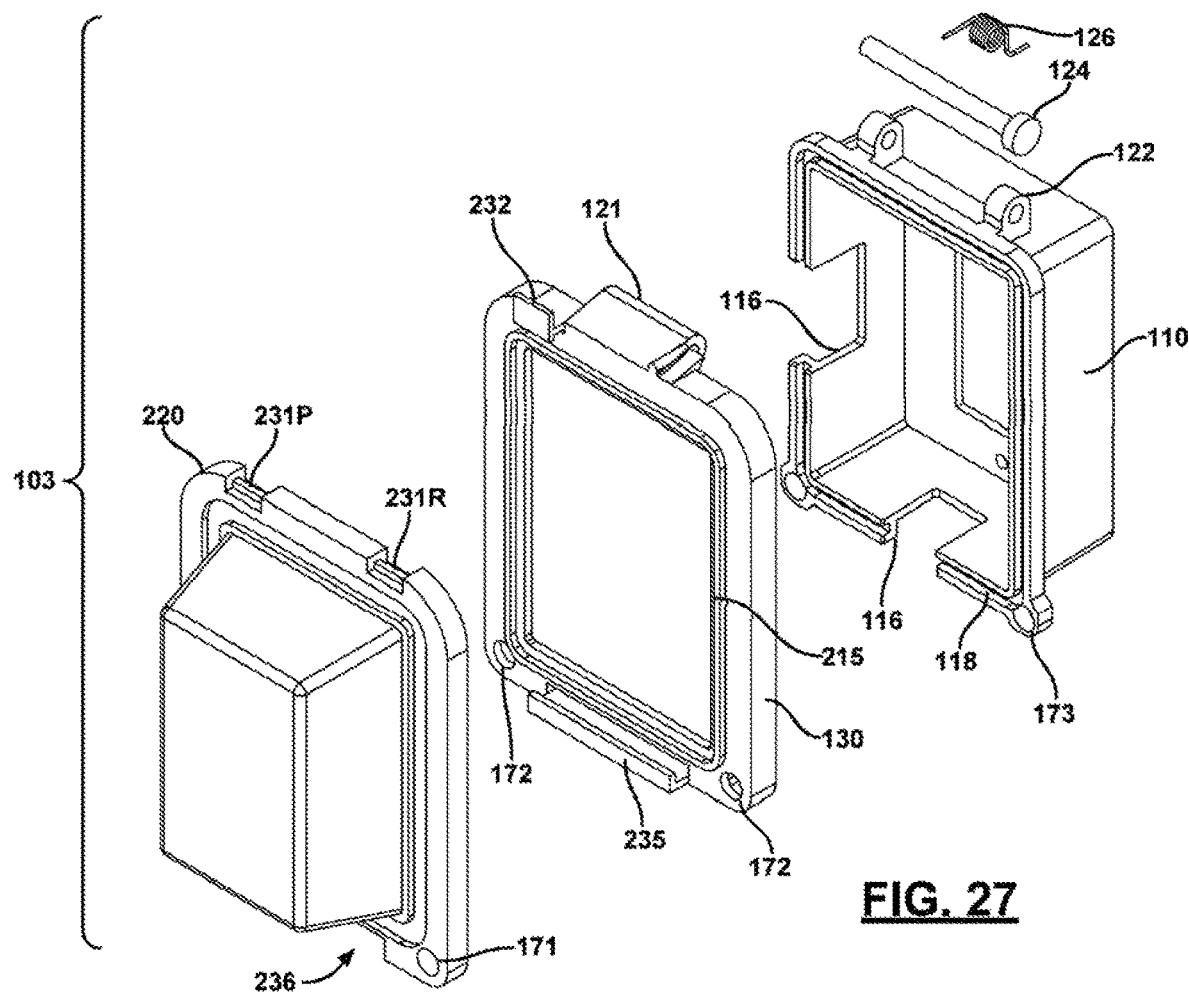

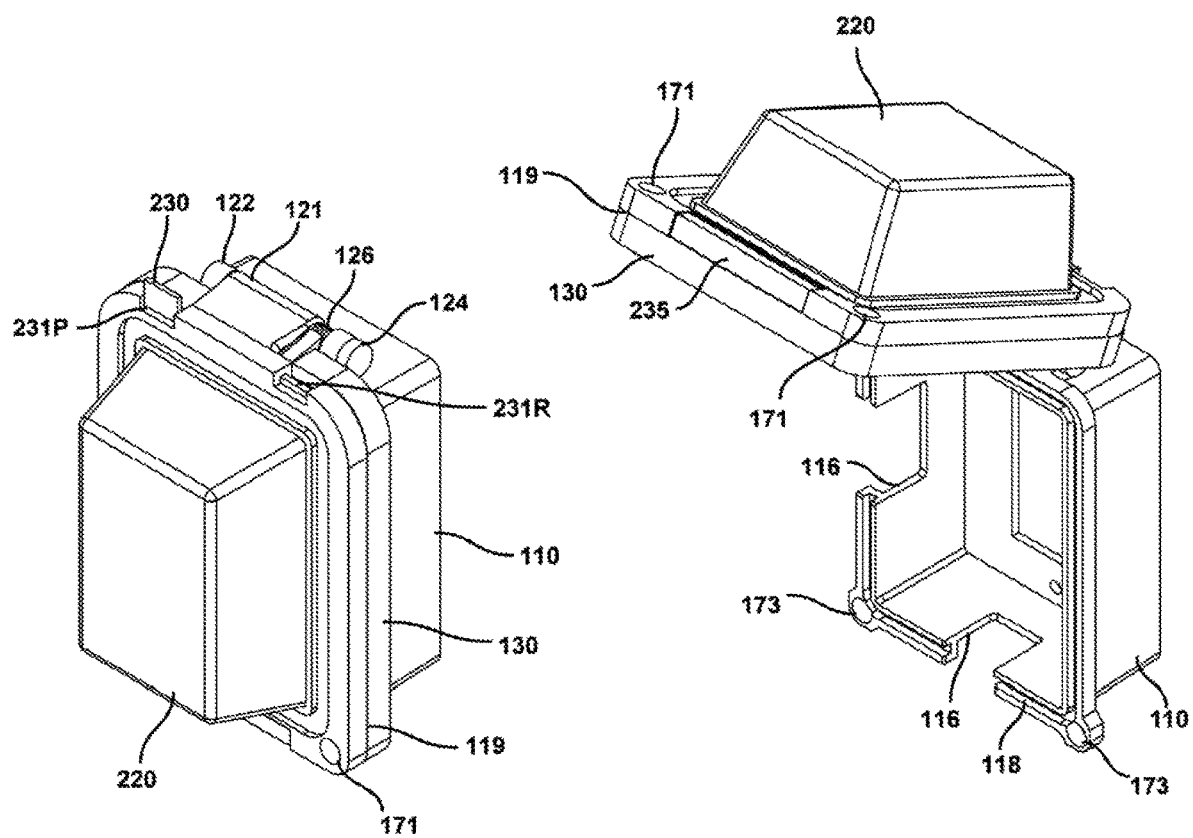

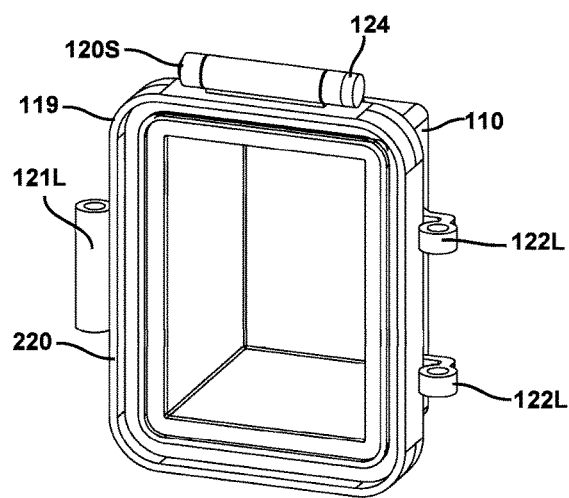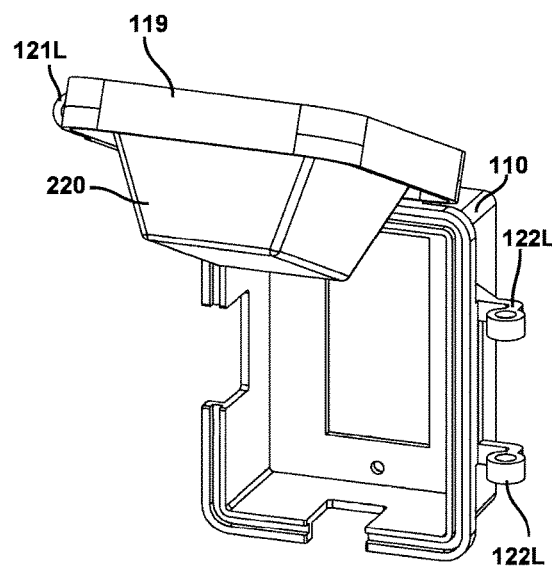
FIG. 35          FIG. 36

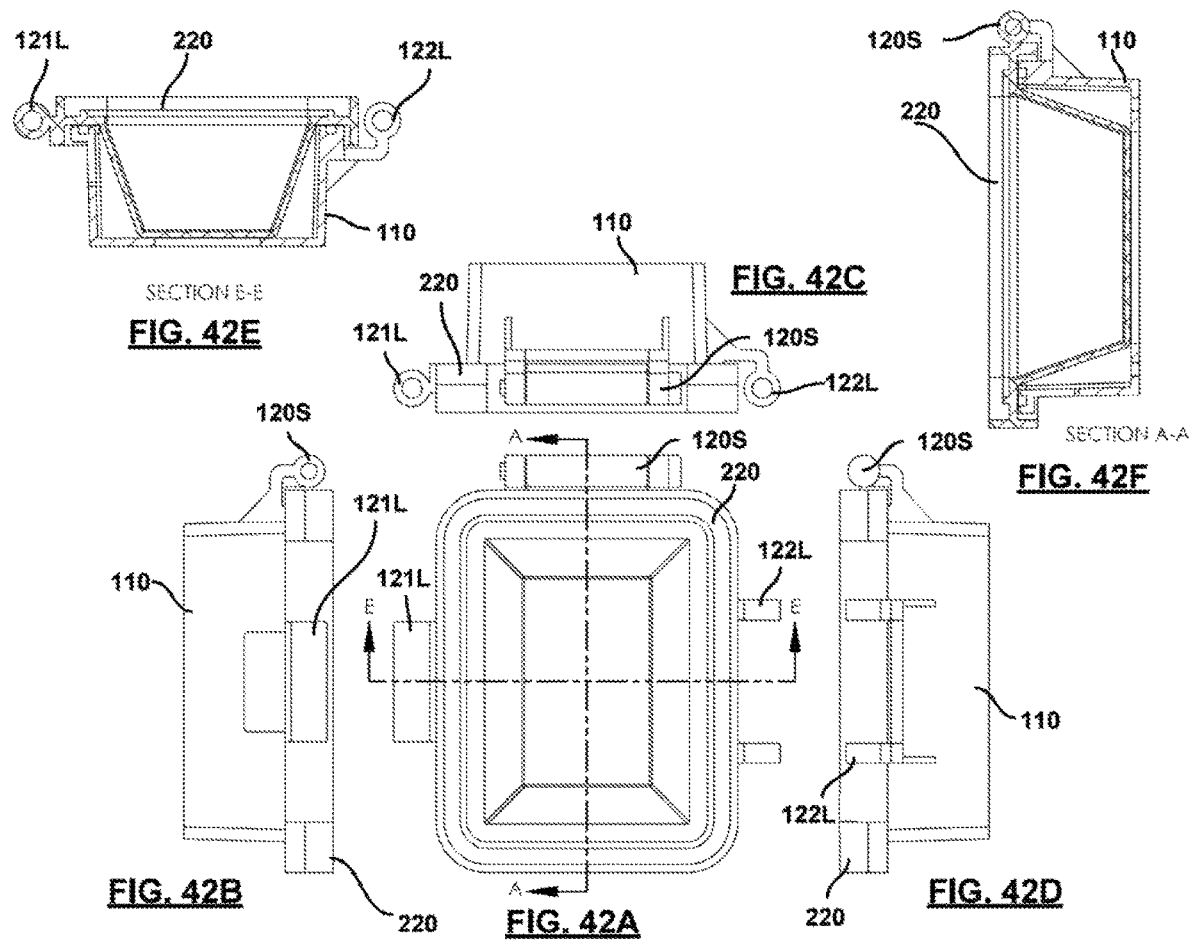

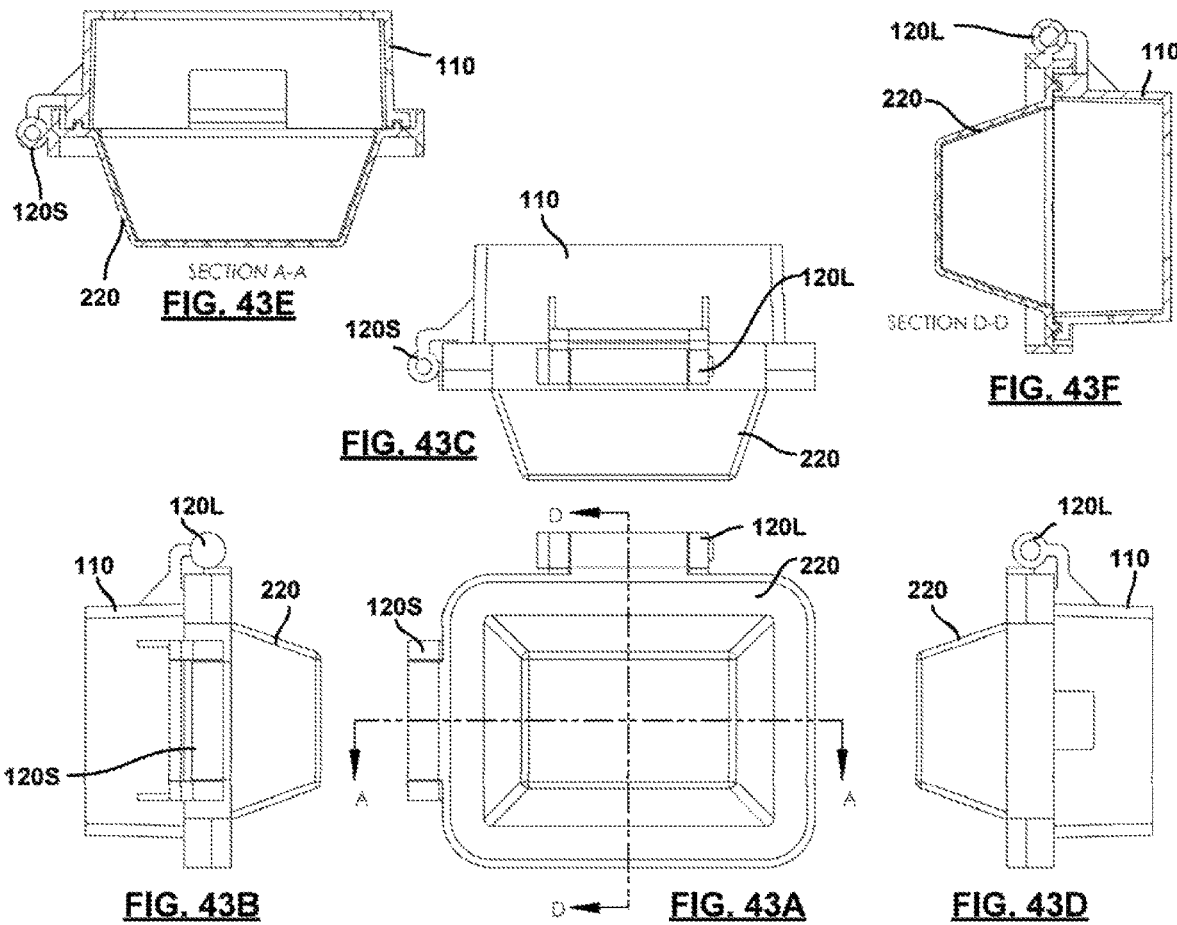

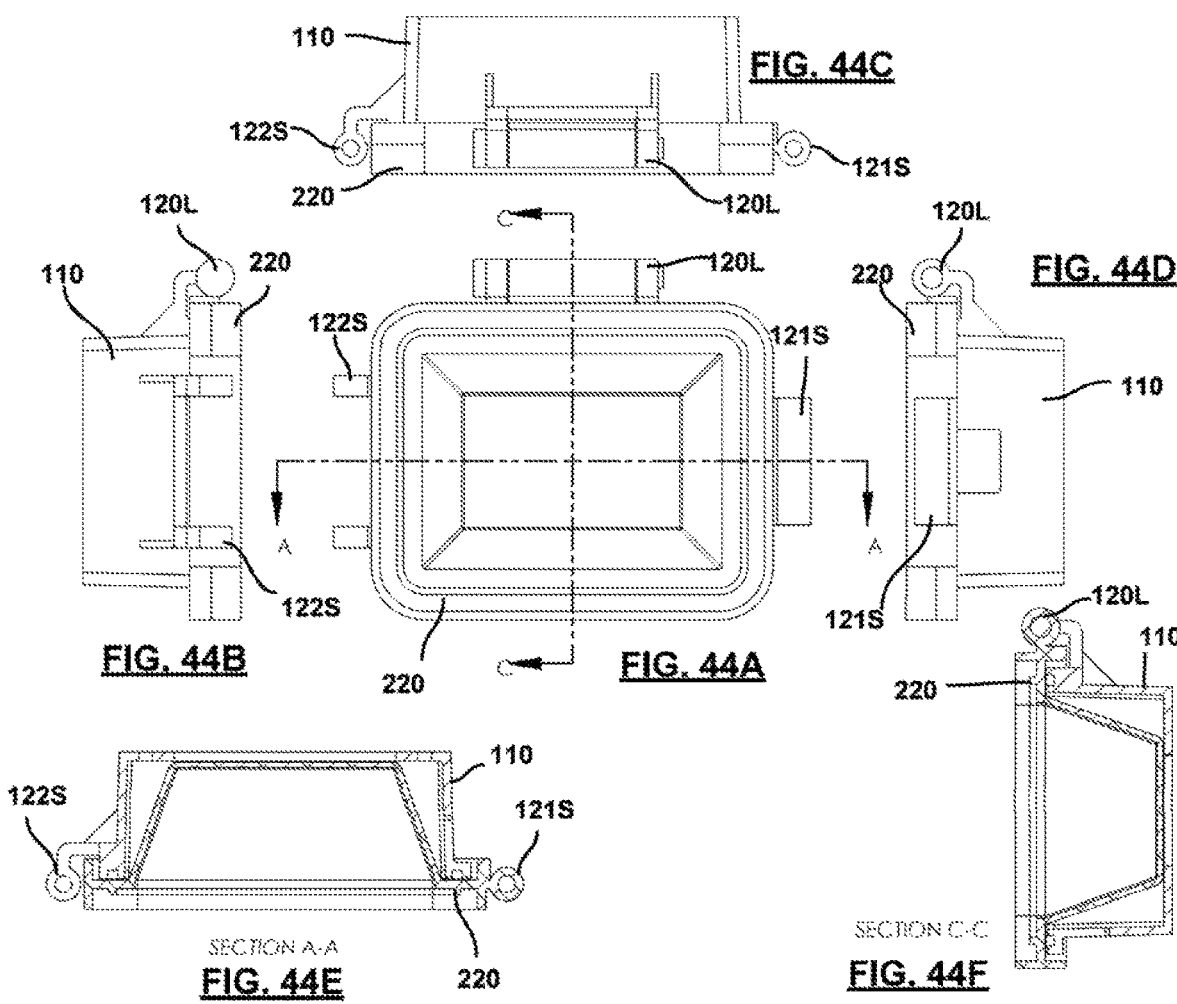

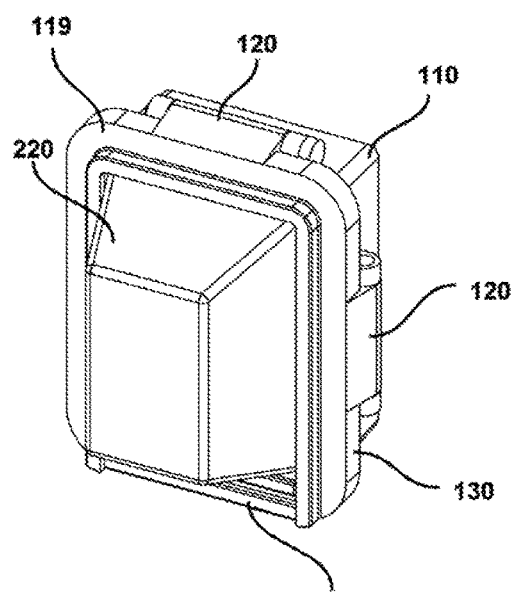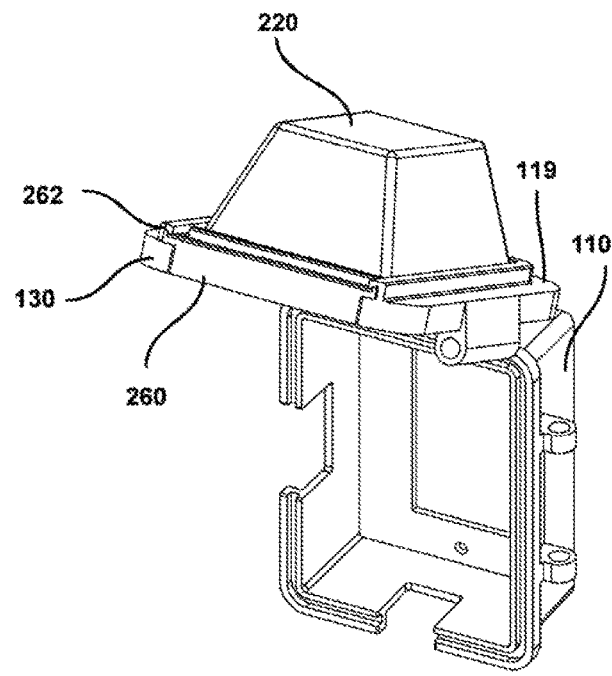
FIG. 46
FIG. 47

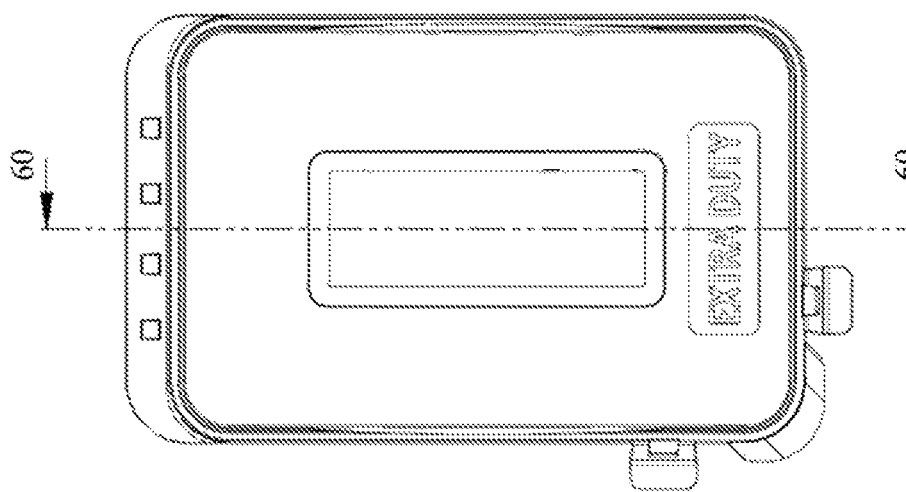

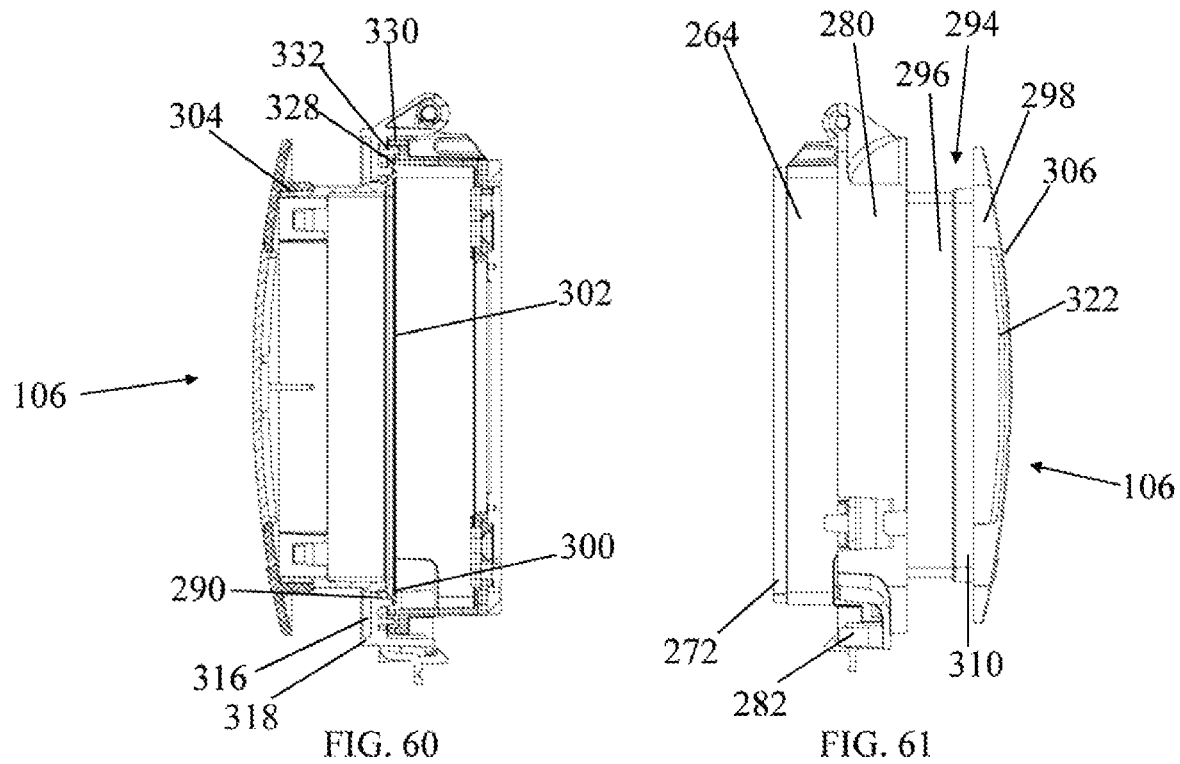

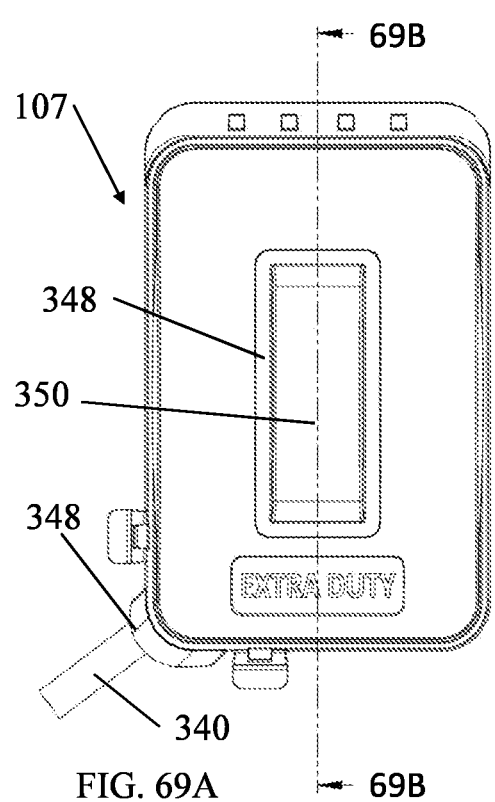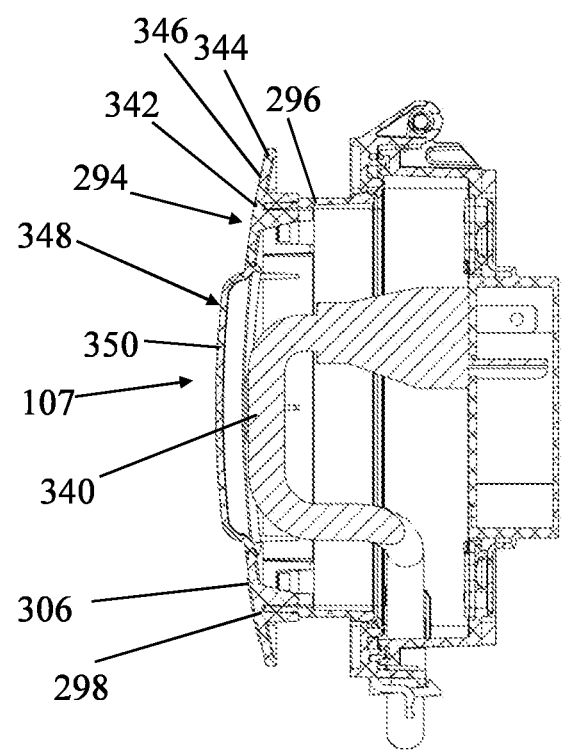
FIG. 69A
FIG. 69B

CONFIGURABLE ELECTRICAL OUTLET COVER ENCLOSURE

CROSS REFERENCE TO RELATED APPLICATIONS

This application is a continuation-in-part of U.S. Utility patent application Ser. No. 16/990,958 entitled "Configurable Electrical Outlet Cover Enclosure" to Jeffrey P. Baldwin et al. that was filed on Aug. 11, 2020, now U.S. Pat. No. 11,539,196, which is a continuation of U.S. Utility patent application Ser. No. 16/102,676 entitled "Configurable Electrical Outlet Cover Enclosure" to Jeffrey P. Baldwin et al. that was filed on Aug. 13, 2018 and issued as U.S. Pat. No. 10,742,010 on Aug. 11, 2020, which application is a continuation-in-part of U.S. Utility patent application Ser. No. 16/028,254 entitled "Configurable Electrical Outlet Cover Enclosure" to Jeffrey P. Baldwin that was filed on Jul. 5, 2018 and issued as U.S. Pat. No. 10,490,988 on Nov. 26, 2019, which is a continuation-in-part of U.S. Utility patent application Ser. No. 15/944,689 entitled "Configurable Electrical Outlet Cover Enclosure" to Jeffrey P. Baldwin that was filed on Apr. 3, 2018 and issued as U.S. Pat. No. 10,367,341 on Jul. 30, 2019, which is a continuation application of U.S. Utility patent application Ser. No. 15/265,837 entitled "Configurable Electrical Outlet Cover Enclosure" to Jeffrey P. Baldwin that was filed on Sep. 14, 2016 and issued as U.S. Pat. No. 9,935,436 on Apr. 3, 2018, which application claims the benefit of the filing date of U.S. Provisional Patent Application No. 62/218,374 entitled "Configurable Enclosure" to Jeffrey P. Baldwin that was filed on Sep. 14, 2015, the disclosures of each of which are hereby incorporated herein by reference. This application is also a continuation-in-part of U.S. Utility patent application Ser. No. 17/020,965 entitled "Configurable Electrical Outlet Cover Enclosure" to Jeffrey P. Baldwin et al. that was filed on Sep. 15, 2020 and issuing as U.S. Pat. No. 11,276,996 on Mar. 15, 2022, which application is a continuation of U.S. Utility patent application Ser. No. 16/524,680 entitled "Configurable Electrical Outlet Cover Enclosure" to Jeffrey P. Baldwin et al. that was filed on 1 Jul. 29, 2019 and issued as U.S. Pat. No. 10,777,981 on Sep. 15, 2020, which application is a continuation of U.S. Utility patent application Ser. No. 15/944,689 entitled "Configurable Electrical Outlet Cover Enclosure" to Jeffrey P. Baldwin that was filed on Apr. 3, 2018 and issued as U.S. Pat. No. 10,367,341 on Jul. 30, 2019, which is a continuation application of U.S. Utility patent application Ser. No. 15/265,837 entitled "Configurable Electrical Outlet Cover Enclosure" to Jeffrey P. Baldwin that was filed on Sep. 14, 2016 and issued as U.S. Pat. No. 9,935,436 on Apr. 3, 2018, which application claims the benefit of the filing date of U.S. Provisional Patent Application No. 62/218,374 entitled "Configurable Enclosure" to Jeffrey P. Baldwin that was filed on Sep. 14, 2015, the disclosures of each of which are hereby incorporated herein by reference.

BACKGROUND

1. Technical Field

Aspects of this document relate generally to configurable enclosures to cover an electrical outlet.

2. Background Art

Outlet covers are used on exterior electrical outlets to reduce or prevent water, dirt, or other contaminants from entering the electrical outlet. Outlet covers for the exterior of buildings are typically large and boxy because they have sufficient space to allow one or more power plugs to plug into sockets while the outlet cover is closed. Many outlet covers may be attached to electrical outlets that are rarely used. A need exists for outlet covers that can collapse or be configured to take up less space.

SUMMARY

Aspects of this disclosure relate to a cover for an electrical outlet having a base comprising an electrical device aperture extending through the base sized large enough to receive a portion of an electrical device therethrough, a lid hingedly coupled to the base along a first side of the lid and pivotable between an open position and a closed position, the lid comprising a lid frame with a central aperture defined by an inner edge of the lid frame and a gasket surrounding the central aperture on a rear surface of the lid frame, wherein the gasket has a sealing edge extending inward past the inner edge of the lid frame, and an enclosure slidably coupled to the lid frame within the central aperture and slidable within the lid frame between a collapsed position and an extended position, the enclosure comprising a front wall positioned in front of the lid frame, a side wall extending rearward from the front wall through the central aperture of the lid frame, and a ledge extending outward from the side wall positioned behind the lid frame opposite the front wall, the side wall having a first groove adjacent the front wall of the enclosure and a second groove adjacent the ledge of the enclosure, wherein each of the first groove and the second groove extends around a perimeter of the side wall and is configured to receive the sealing edge of the gasket and lock the enclosure in place, and wherein when the enclosure is in the collapsed position, the sealing edge of the gasket is in the first groove and when the enclosure is in the extended position, the sealing edge of the gasket is in the second groove.

Particular implementations may further include one or more of the following features. At least two tabs extending outward from the front wall configured to provide a grip for moving the enclosure between the collapsed position and the extended position. A latch assembly comprising a first latch member on the base and a second latch member on the lid frame, the second latch member aligned with the first latch member when the lid frame is in the closed position, wherein the lid frame is releasably locked to the base when the lid frame is in the closed position. At least one cord port configured to allow an electrical cord to enter the outlet cover and couple to the electrical outlet.

Aspects of this disclosure relate to a cover for an electrical outlet having a base comprising an electrical device aperture extending through the base sized large enough to receive a portion of an electrical device therethrough, a lid hingedly coupled to the base along a first side of the lid and pivotable between an open position and a closed position, the lid comprising a lid frame with a central aperture defined by an inner edge of the lid frame and a gasket surrounding the central aperture on a surface of the lid frame, wherein the gasket has a sealing edge extending inward past the inner edge of the lid frame, and an enclosure slidably coupled to the lid frame within the central aperture and slidable within the lid frame between a collapsed position and an extended position, the enclosure comprising a front wall on a front side of the lid frame, a side wall extending rearward from the front wall through the central aperture of the lid frame, and a ledge extending outward from the side wall on a rear side of the lid frame opposite the front side, the side wall having a first groove and a second groove each configured to receive the sealing edge of the gasket, wherein when the enclosure is in the collapsed position, the sealing edge of the gasket is in the first groove and the enclosure is positionally locked in relation to the lid frame, and when the enclosure is in the extended position, the sealing edge of the gasket is in the second groove and the enclosure is positionally locked in relation to the lid frame.

Particular embodiments may comprise one or more of the following features. The first groove may be adjacent the front wall of the enclosure and the second groove is adjacent the ledge of the enclosure. The gasket may be positioned on a rear surface of the lid frame. Each of the first groove and the second groove extends around a perimeter of the side wall. At least two tabs extending outward from the front wall configured to provide a grip for moving the enclosure between the collapsed position and the extended position. A latch assembly comprising a first latch member on the base and a second latch member on the lid frame, the second latch member aligned with the first latch member when the lid frame is in the closed position, wherein the lid frame is releasably locked to the base when the lid frame is in the closed position. At least one cord port configured to allow an electrical cord to enter the outlet cover and couple to the electrical outlet.

Aspects of this disclosure relate to a cover for an electrical outlet having a base comprising an electrical device aperture extending through the base, a lid hingedly coupled to the base along a first side of the lid and pivotable between an open position and a closed position, the lid comprising a lid frame with a central aperture and a gasket with a sealing edge surrounding the central aperture, and an enclosure slidably coupled to the lid frame within the central aperture and slidable within the lid frame between a collapsed position and an extended position, the enclosure comprising a side wall having a first groove and a second groove each configured to receive the sealing edge of the gasket, wherein when the enclosure is in the collapsed position, the sealing edge of the gasket is in the first groove and the enclosure is positionally fixed in relation to the lid frame, and when the enclosure is in the extended position, the sealing edge of the gasket is in the second groove and the enclosure is positionally fixed in relation to the lid frame.

Particular embodiments may comprise one or more of the following features. A front wall on a front side of the lid frame, wherein the side wall extends rearward from the front wall through the central aperture of the lid frame, and a ledge extending outward from the side wall on a rear side of the lid frame opposite the front side. The first groove may be adjacent the front wall of the enclosure and the second groove is adjacent the ledge of the enclosure. The central aperture of the lid frame may be defined by an inner edge of the lid frame and wherein the sealing edge of the gasket extends inward past the inner edge of the lid frame. The gasket is positioned on a rear surface of the lid frame. Each of the first groove and the second groove may extends around a perimeter of the side wall. At least two tabs extending outward from the front wall configured to provide a grip for moving the enclosure between the collapsed position and the extended position. A latch assembly comprising a first latch member on the base and a second latch member on the lid frame, the second latch member aligned with the first latch member when the lid frame is in the closed position, wherein the lid frame is releasably locked to the base when the lid frame is in the closed position. At least one cord port configured to allow an electrical cord to enter the outlet cover and couple to the electrical outlet.

Aspects of this document relate to a cover for an electrical outlet that may comprise a base comprising at least one electrical box mounting screw aperture extending through a portion of the base, and an electrical device aperture extending through the base sized large enough to receive a portion of an electrical device therethrough, a lid frame hingedly coupled to the base along a first side of the lid frame and pivotable between an open position and a closed position, the lid frame comprising a central aperture, and a gasket surrounding the central aperture on a surface of the lid frame, and an enclosure slidably coupled to the lid frame within the central aperture and movable within the lid frame between a collapsed, not-in-use position and an extended, in-use position, the enclosure comprising a continuous enclosure side wall comprising a ledge extending outward from the enclosure side wall adjacent a back edge of the enclosure side wall, the ledge in contact with the lid frame gasket when the enclosure is in its extended, in-use position, and the ledge adjacent the base when in its collapsed, not-in-use position, the enclosure side wall further comprising a leading edge distal to the back edge, and an enclosure front wall coupled to the enclosure side wall, the enclosure front wall comprising a convex front surface.

Particular embodiments may comprise one or more of the following features. An aperture through the enclosure front wall, the aperture comprising a window within the aperture, the window having a rear surface that curves outward in relation to the leading edge of the continuous enclosure side wall and extends forward of the leading edge. A window portion extending forward of the convex front surface of the enclosure wall. A bulge extending outward from the convex front surface of the enclosure wall. A leading surface surrounding the central aperture and a lid frame lip surrounding and extending forward of the leading surface, the second perimeter of the enclosure front wall being smaller than an inner perimeter of the lid frame lip, at least two tabs extending outward from the enclosure front wall on opposing sides, wherein when the enclosure is in the collapsed, not-in-use position, the enclosure front wall is seated within the lid frame lip surrounding the leading surface, and the convex front surface extends forward of the lid frame lip providing a gap between the at least two tabs and the lid frame lip. A cord port aperture extending through a base side wall, wherein when the enclosure side wall is in the collapsed, not-in-use position, the enclosure side wall blocks access from the cord port aperture to the aperture extending through the base.

According to an aspect of the disclosure, a cover for an electrical outlet may comprise a base comprising at least one electrical box mounting screw aperture extending through a portion of the base, and an electrical device aperture extending through the base sized large enough to receive a portion of an electrical device therethrough, a lid frame hingedly coupled to the base along a first side of the lid and pivotable between an open position and a closed position, the lid frame comprising a central aperture, and an enclosure slidably coupled to the lid frame within the central aperture and movable within the lid frame between a collapsed, not-in-use position and an extended, in-use position, the enclosure comprising a continuous enclosure side wall comprising a ledge extending outward from the enclosure side wall adjacent a back edge of the enclosure side wall, the enclosure side wall further comprising a leading edge distal to the back edge, and an enclosure front wall coupled to the enclosure side wall, the enclosure front wall comprising a front surface, and a window in the enclosure front wall having a rear surface that extends outward in relation to the leading edge of the continuous enclosure side wall and extends forward of the leading edge.

Particular embodiments may comprise one or more of the following features. The front surface of the enclosure front wall may be curved. The front surface of the enclosure front wall may be flat. The front surface of the enclosure may comprise a convex front surface, the lid frame further comprising a leading surface surrounding the central aperture and a lid frame lip surrounding and extending forward of the leading surface, the second perimeter of the enclosure front wall being smaller than an inner perimeter of the lid frame lip, at least two tabs extending outward from the enclosure front wall on opposing sides, wherein when the enclosure is in the collapsed, not-in-use position, the convex front surface extends forward of the lid frame lip providing a gap between the at least two tabs and the lid frame lip. The window curves outward from the front surface in at least two different directions. A window portion extending forward of the front surface of the enclosure wall. A bulge extending outward from the front surface of the enclosure wall.

According to an aspect of the disclosure, a cover for an electrical outlet may comprise a base comprising an electrical device aperture extending through the base sized large enough to receive a portion of an electrical device therethrough, a lid hingedly coupled to the base along a first side of the lid and pivotable between an open position and a closed position, the lid comprising a lid frame with a central aperture, and an enclosure slidably coupled to the lid frame within the central aperture and slidable within the lid frame between a collapsed, not-in-use position and an extended, in-use position, the enclosure comprising a continuous enclosure side wall comprising a ledge extending outward from the enclosure side wall adjacent a back edge of the enclosure side wall, the ledge adjacent the lid frame when the enclosure is in its extended, in-use position, and adjacent the base when the enclosure is in its collapsed, not-in-use position, the enclosure side wall further comprising a perimeter, and an enclosure front wall comprising a front surface and a window in the enclosure front wall, the window having a rear surface that curves outward in relation to the leading edge of the continuous enclosure side wall and extends forward of the leading edge.

Particular embodiments may comprise one or more of the following features. A gasket surrounding the central aperture on a rear surface of the lid frame, the enclosure side wall ledge in contact with the lid frame gasket when the enclosure is in its extended, in-use position. A convex front surface, the lid frame further comprising a leading surface surrounding the central aperture and a lid frame lip surrounding and extending forward of the leading surface, the second perimeter of the enclosure front wall being smaller than an inner perimeter of the lid frame lip, at least two tabs extending outward from the enclosure front wall on opposing sides, wherein when the enclosure is in the collapsed, not-in-use position, the convex front surface extends forward of the lid frame lip providing a gap between the at least two tabs and the lid frame lip. The front surface of the enclosure front wall is flat. A window portion extending forward of the front surface of the enclosure wall. A bulge extending outward from the front surface of the enclosure wall. The window curves outward in at least two directions.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and:

FIGS. 1 and 2 are perspective views of an outlet cover assembly in, respectively, closed collapsed and closed extended positions;

FIGS. 7 and 8 are side views of the outlet cover assembly of FIG. 1 in, respectively, closed collapsed and closed extended positions;

FIG. 27 is an exploded perspective view of an outlet cover assembly with a frame and a removable bubble that seats on the frame;

FIG. 28 is a perspective view of the outlet cover assembly of FIG. 27 in the closed protruding position;

FIG. 29 is a perspective view of the outlet cover assembly of FIG. 27 in the open protruding position;

FIG. 35 is a perspective view of the outlet cover assembly of FIG. 32 in the closed receding position;

FIG. 36 is a perspective view of the outlet cover assembly of FIG. 32 in the open receding position;

FIG. 42A is a front view of an outlet cover assembly of FIG. 35;
FIG. 42B is a first side view of FIG. 42A;
FIG. 42C is a second side view of FIG. 42A;
FIG. 42D is a third side view of FIG. 42A;
FIG. 42E is a sectional view of FIG. 42A;
FIG. 42F is a sectional view of FIG. 42A;
FIG. 43A is a front view of an outlet cover assembly of FIG. 37;

FIG. 43B is a first side view of FIG. 43A;
FIG. 43C is a second side view of FIG. 43A;
FIG. 43D is a third side view of FIG. 43A;
FIG. 43E is a sectional view of FIG. 43A;
FIG. 43F is a sectional view of FIG. 43A;
FIG. 44A is a front view of an outlet cover assembly of FIG. 39;
FIG. 44B is a first side view of FIG. 44A;
FIG. 44C is a second side view of FIG. 44A;
FIG. 44D is a third side view of FIG. 44A;
FIG. 44E is a sectional view of FIG. 44A;
FIG. 44F is a sectional view of FIG. 44A.

FIG. 46 is a perspective view of the outlet cover assembly of FIG. 45 assembled in a vertical orientation with the bubble and lid in the closed protruding position;

FIG. 47 is a perspective view of the outlet cover assembly of FIG. 45 in the open protruding position;

FIG. 59 is a front view of the outlet cover assembly of FIG. 54 in a closed position with the enclosure extended;

FIG. 60 is a sectional view of the outlet cover assembly of FIG. 59;

FIG. 61 is a side view of the outlet cover assembly of FIG. 59;

FIG. 69A is a front view of an embodiment of an electrical outlet cover;

FIG. 69B is a sectional view of the outlet cover of FIG. 69A taken along section line 69B;

Figure 3:
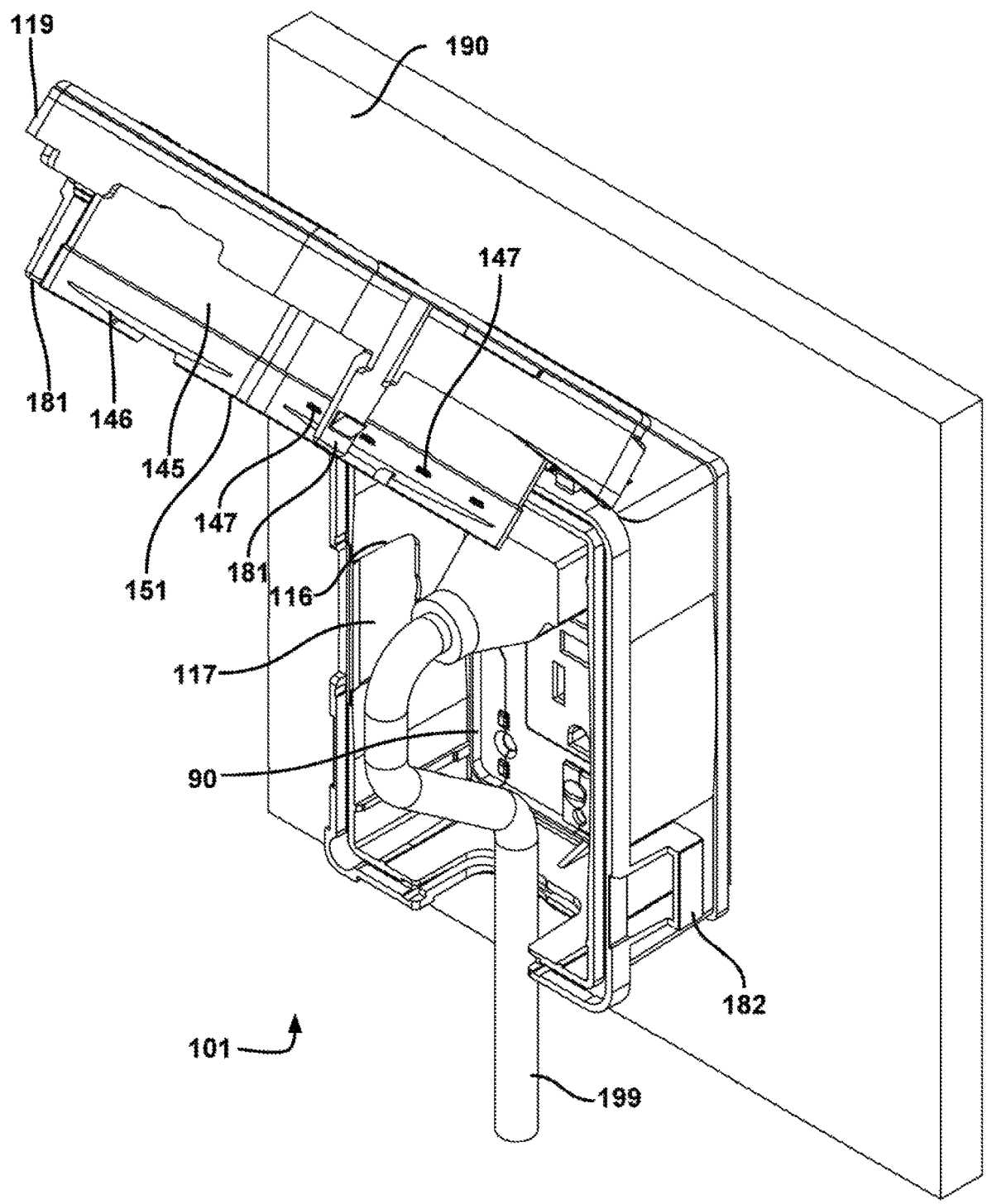
FIG. 3 is a perspective view of the outlet cover of FIG. 1 in an open position with the cover collapsed.
Figure 4:
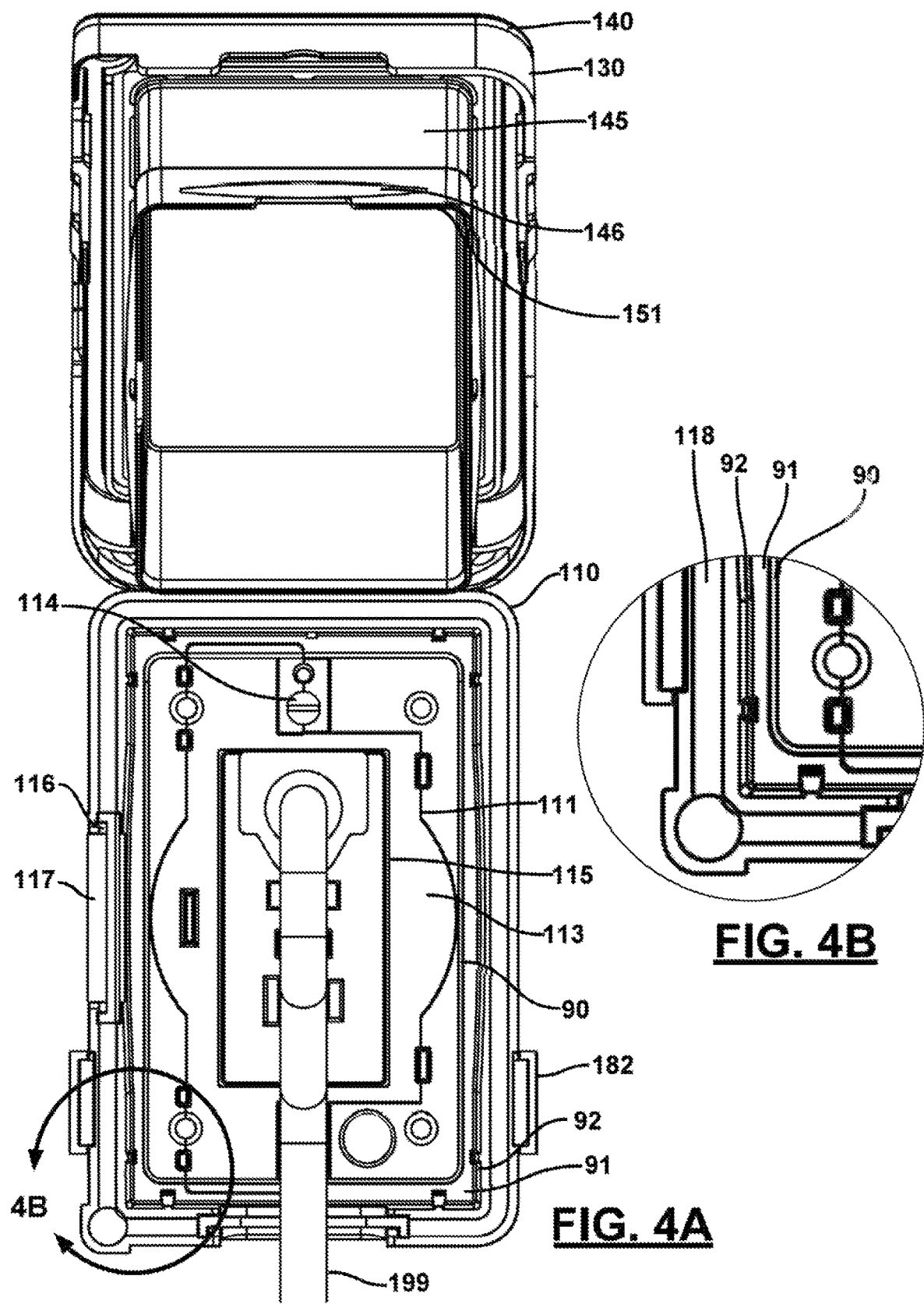
FIG. 4A is a front view of the outlet cover assembly of FIG. 3.
FIG. 4B is a break out view of the section 4B on FIG. 4A.
Figure 5:
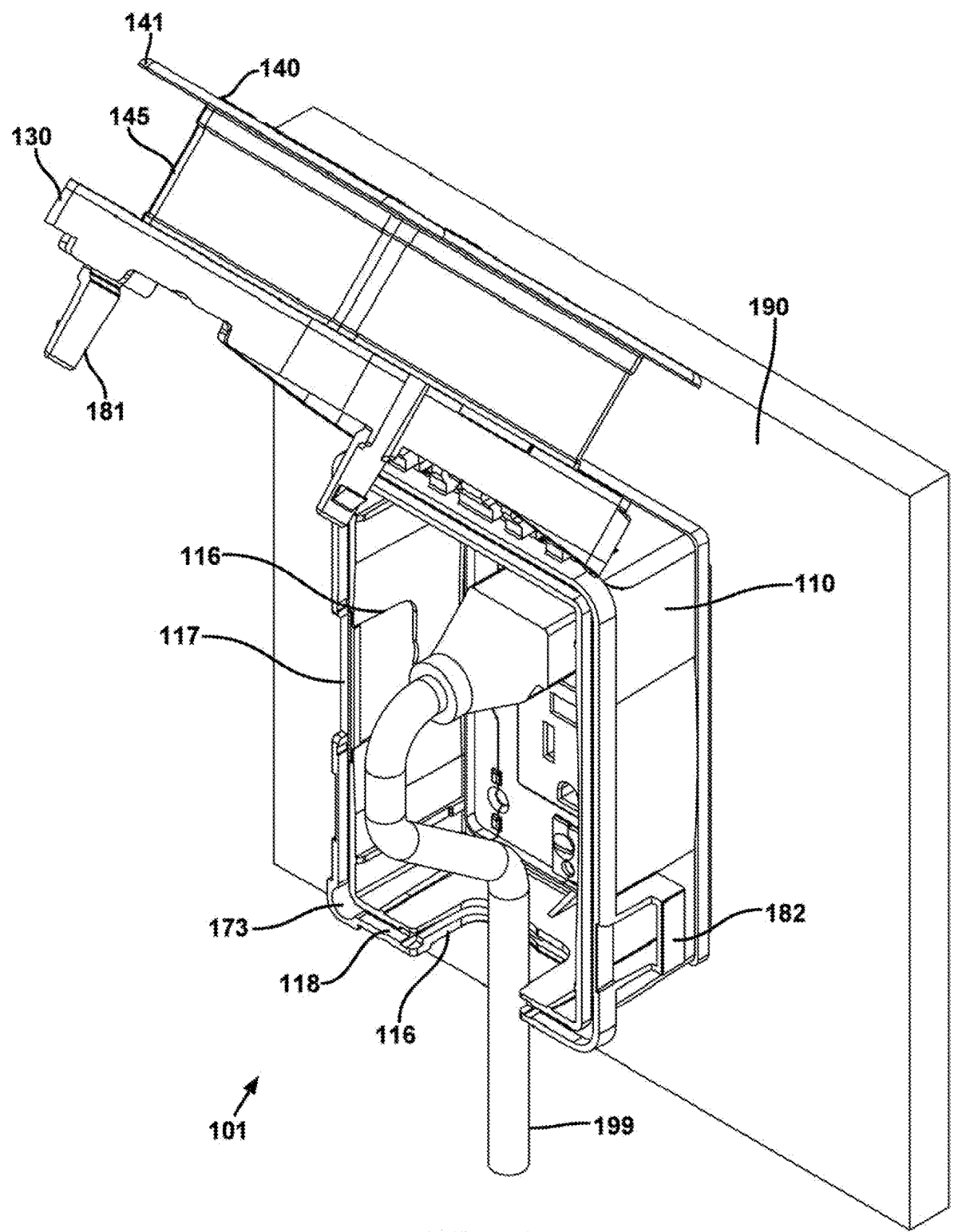
FIG. 5 is a perspective view of an outlet cover assembly of FIG. 1 in an open position with the cover expanded.
Figure 6:
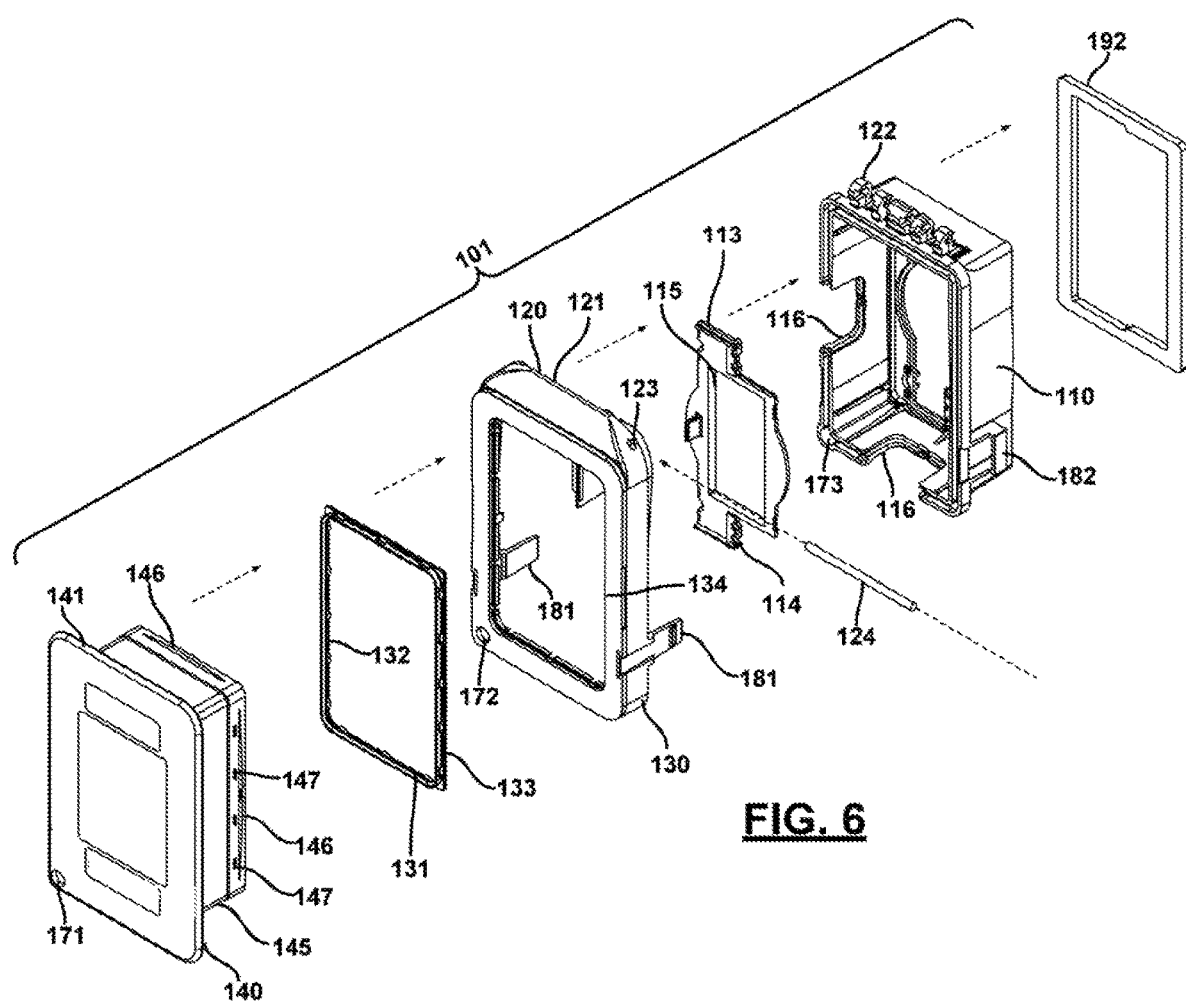
FIG. 6 is an exploded perspective view of the outlet cover assembly of FIG. 1.
Figure 9:
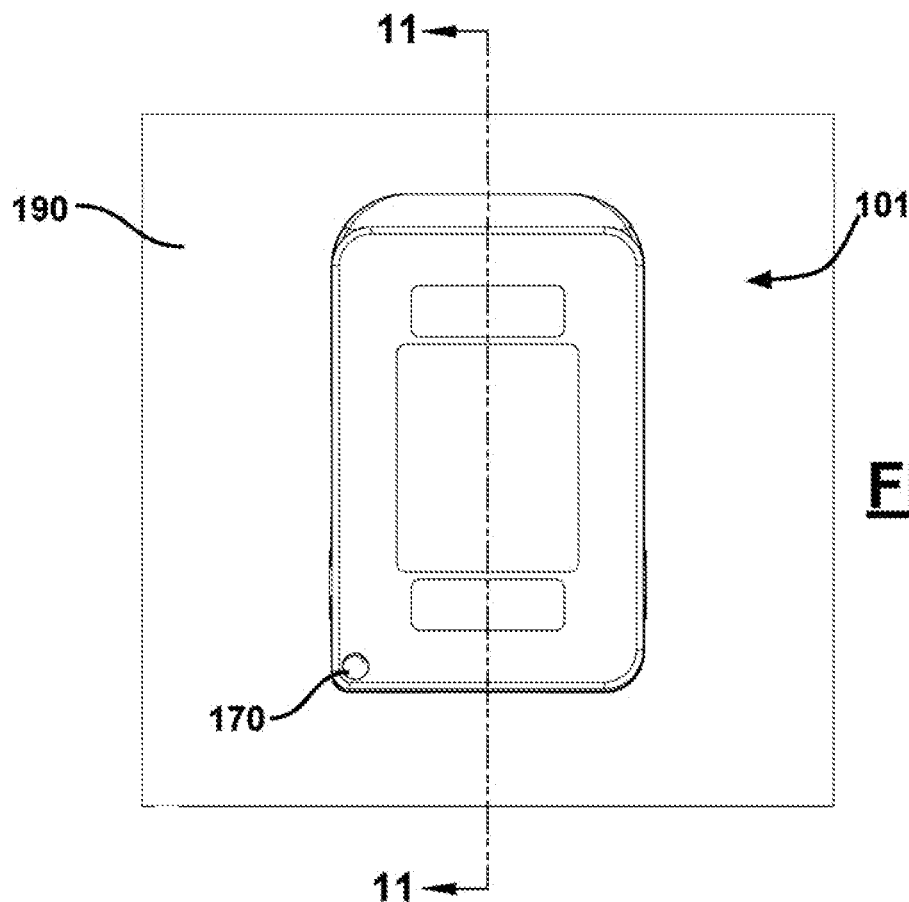
FIG. 9 is a front view of an outlet cover assembly of FIG. 1 shown mounted on a wall.
Figure 10:
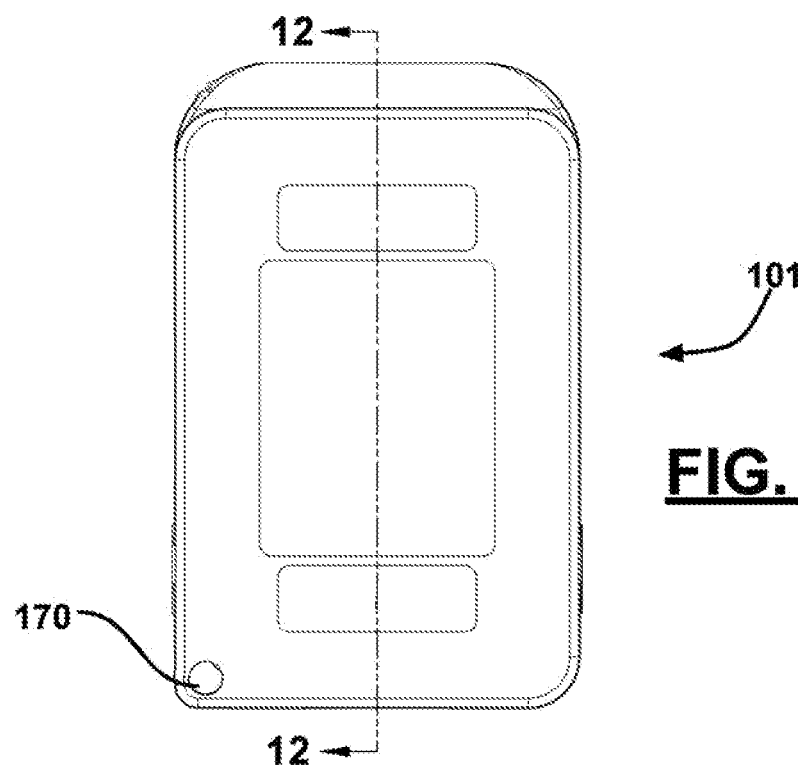
FIG. 10 is a front view of an outlet cover assembly of FIG. 1, not mounted on a wall.
Figure 11:
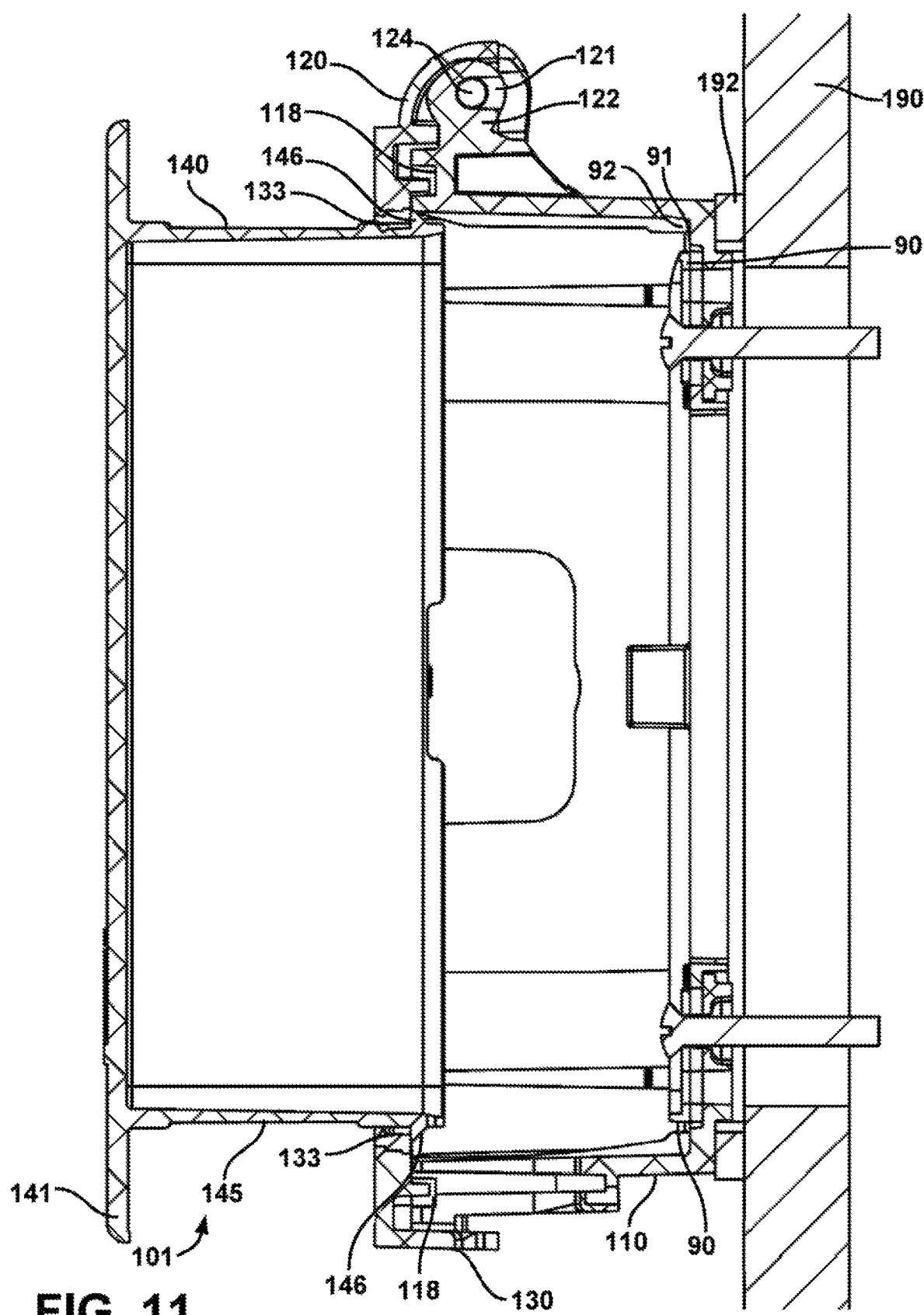
FIG. 11 is a sectional view of FIG. 9, with the section taken along section lines 11-11.
Figure 12:
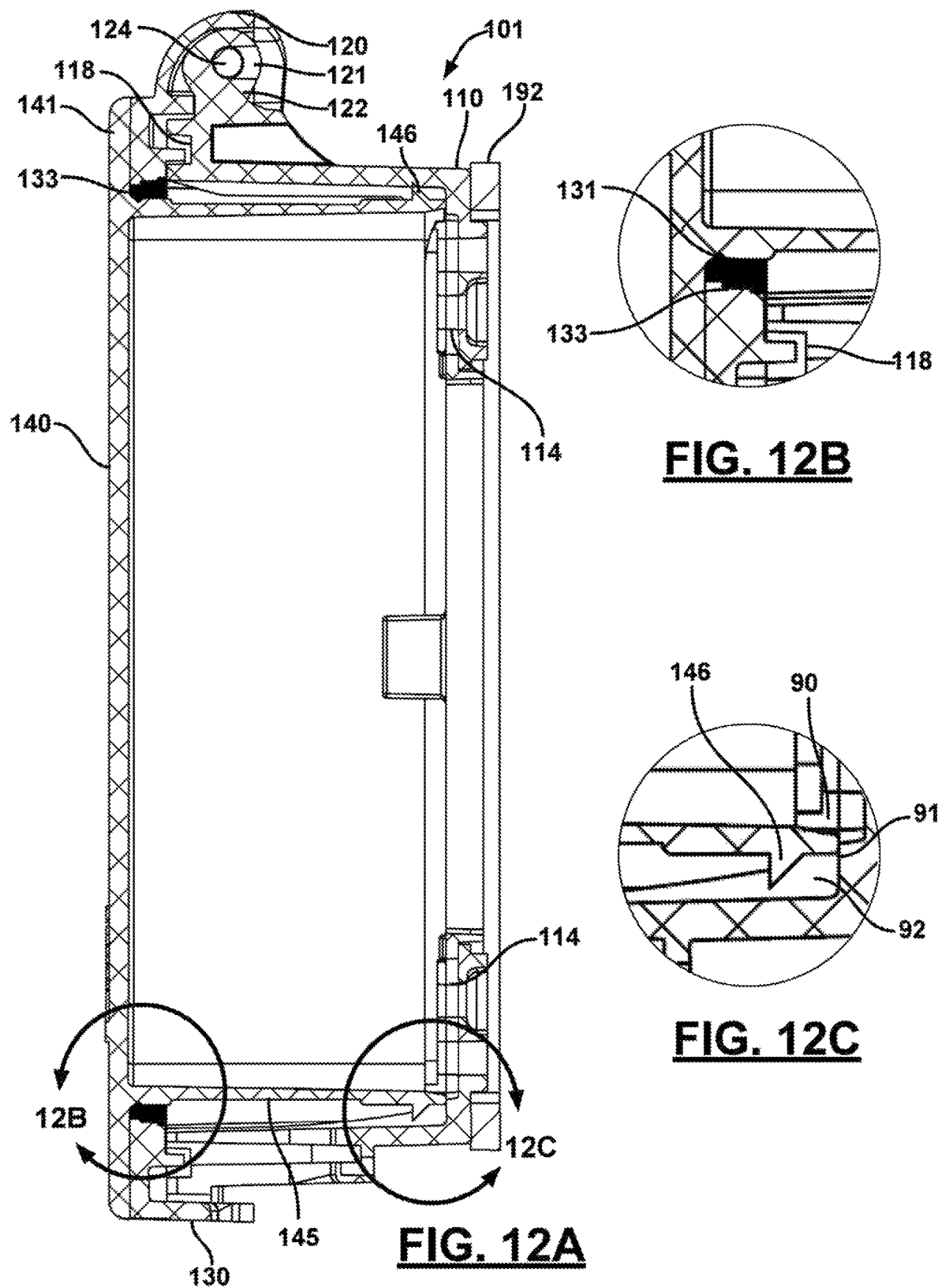
FIG. 12A is a sectional view of FIG. 10, with the section taken along section lines 12-12.
FIGS. 12B and 12C are break out views of, respectively, sections 12B and 12C on FIG. 12A.
Figure 13:
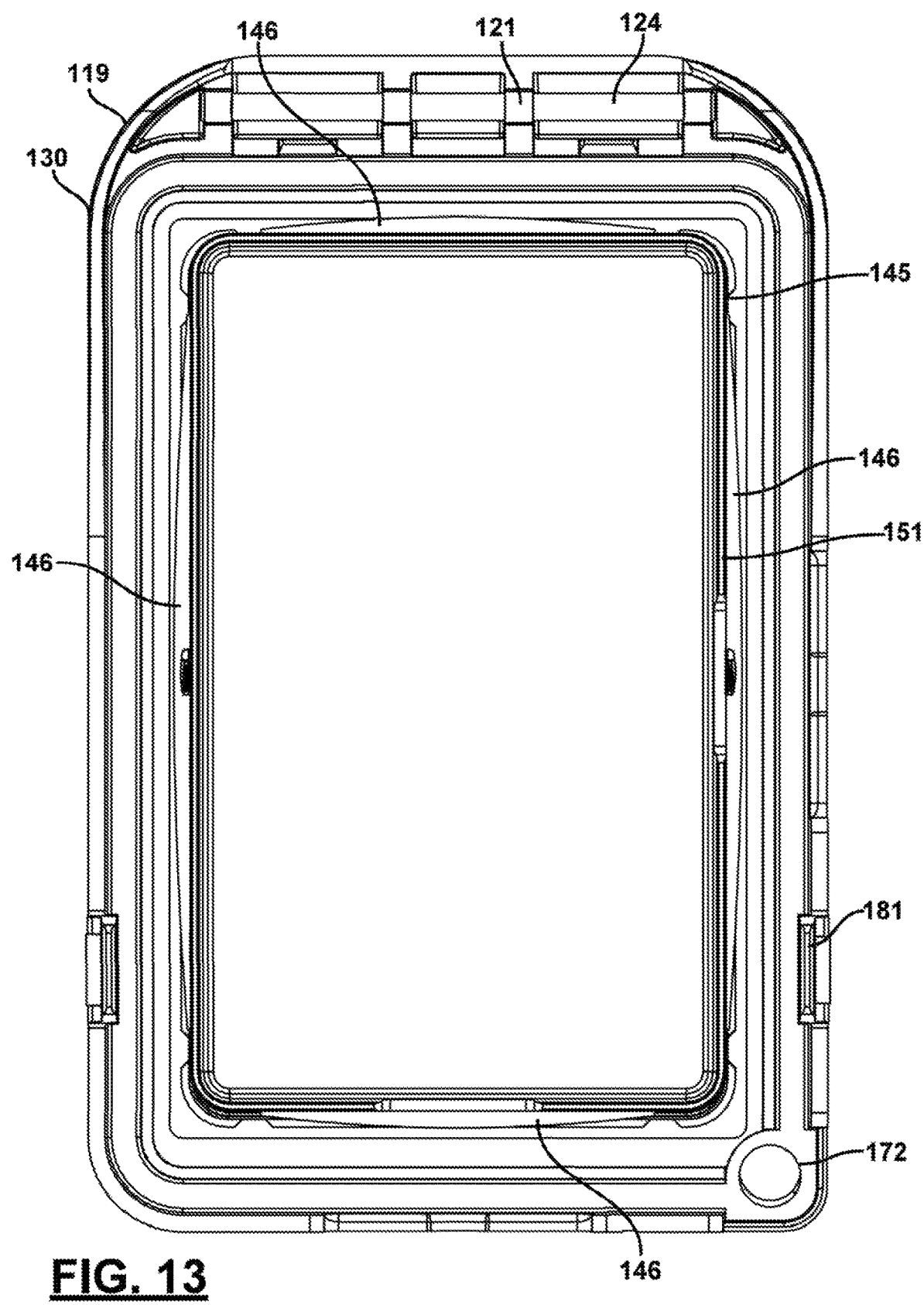
FIG. 13 is a rear view of a lid portion of the outlet cover assembly of FIG. 1.
Figure 14:
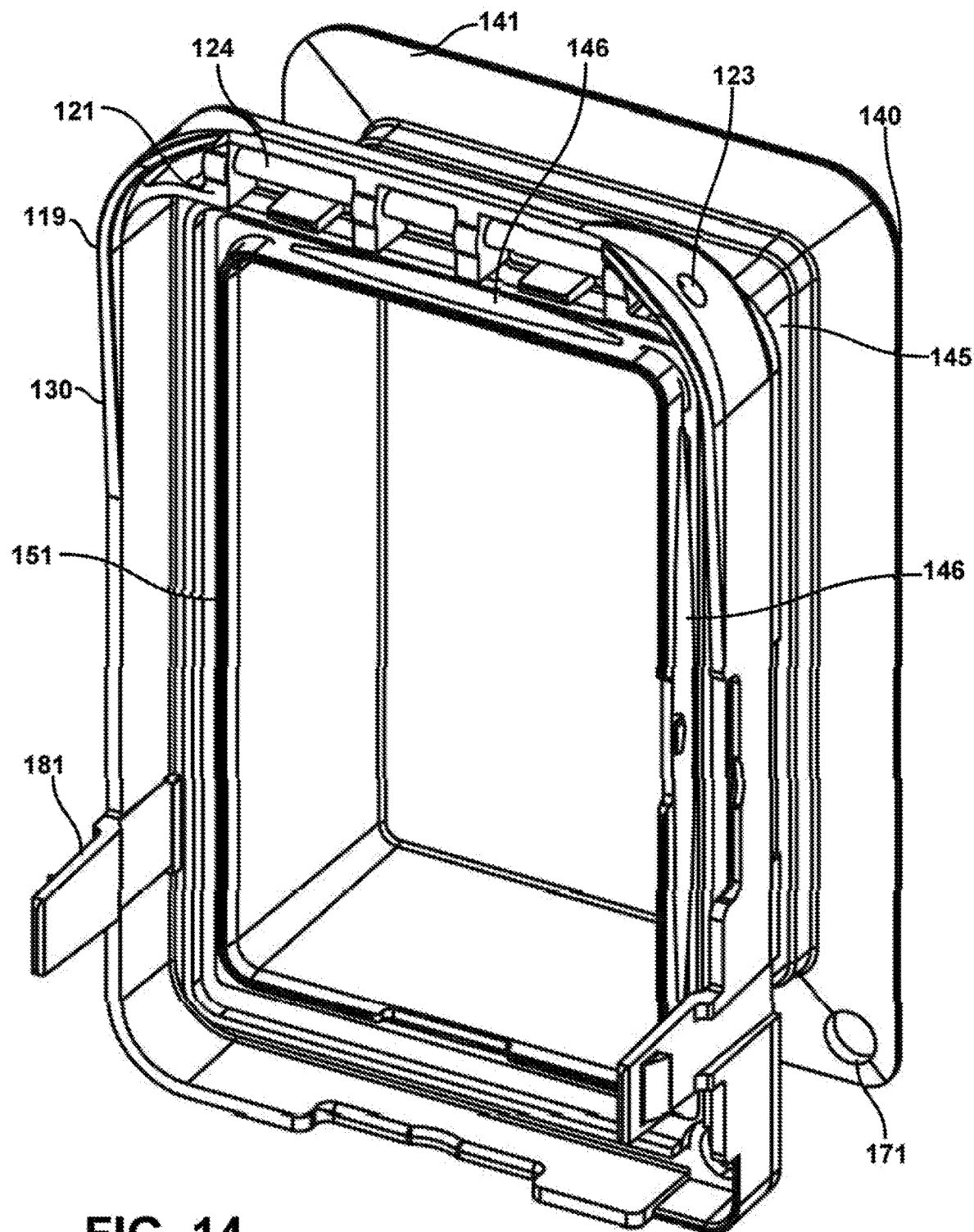
FIG. 14 is a rear perspective view of the lid assembly of FIG. 13.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DESCRIPTION

This document features a cover for an electrical outlet. There are many features of an outlet cover and method implementations disclosed herein, of which one, a plurality, or all features or steps may be used in any particular implementation.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

FIGS. 1-6 depict various views of a non-limiting implementation of a cover for an electrical outlet. An example of an electrical outlet cover according to a first approach described herein and generally shown in FIGS. 1-14. Although the particular material from which this outlet cover 101 is formed is not critical to the outlet cover 101, and any materials known in the art that electrical outlet covers are formed from will suffice, this particular approach is particularly useful when manufacturing the cover of plastic commonly used for manufacturing electrical outlet covers. A second approach, illustrated in FIGS. 15-26, is more conducive and useful to manufacturing from metal. Outlet cover 101 includes a base 110 hingedly coupled to a lid 119 (e.g., using hinge assembly 120). The lid 119 includes at least a frame 130. Outlet cover 100 may be attached to an electrical outlet by screwing a screw into box mounting screw holes 114 (FIG. 4A), which attaches outlet cover 101 to an electrical box housing an electrical outlet. A wall plate 190 may be attached to the electrical box or the electrical outlet. The lid 119 may be pivotally lifted from the base 110 to change from a closed position (as in FIGS. 1 and 2) to an open position (as in FIGS. 3 and 5). In the closed position, a latch assembly 180 may lock the lid 119 to the base 110. In the closed position 109, a locking assembly 170 allows a lock or other locking device to be threaded through the locking assembly 170. Further description of this locking assembly 170 is provided below.

The base 110 of outlet cover 100 may include one or more cord ports 116. A cord port door 117 is removably coupled to each cord port 116. The cord port 116 operates to allow a power cord 119 to enter the outlet cover 100 and couple to the electrical outlet. The base 110 includes an outlet aperture 115 to allow the electrical outlet to be accessible through the outlet cover 100. The base 110 may include an insert 113 (FIG. 4A) that allows a variety of different types of electrical outlets to mate with a single type of outlet cover 100. A seal 192 (e.g., a foam seal as in FIG. 11) may protect the base from water and weather by being sandwiched between the back of the base 110 and the adjacent wall or wall plate 190.

A hinge assembly 120 of outlet cover 100 hingedly couples the base 110 to the lid 119. The hinge assembly 120 includes a first hinge member 121 and a second hinge member 122. The hinge assembly 120 may be held together by threading a pin 124 into pin aperture 123 and threading the pin 124 through both the first hinge member 121 and the second hinge member 122. The base may include a trough 118 or similar structure to mate with the lid 119 in a tortuous path that resists the passage of water and dirt when in the closed position.

A locking assembly 170 of outlet cover 100 allows a user to lock or tie off at least two of: the base 110, the frame 130, and a telescoping enclosure 140. An enclosure locking aperture 171 is aligned with both a frame locking aperture 172 and a base locking aperture 173. At least two of apertures 171, 172, and 173 may be positioned in proximity to each other and a locking device may be threaded through the apertures to lock the elements together.

A latch assembly 180 of outlet cover 100 allows the lid 119 to releasably lock to the base 110. The latch assembly 180 may automatically lock when lid 119 is in a closed position 109. The latch assembly 180 may include a lid latch member 181 and a base latch member 182. The latch assembly 180 may be a variety of fasteners, couplers, latches, or the like (e.g., a cantilevered snap-fit latch).

Referring specifically to FIGS. 4-14, outlet cover 101 includes a telescoping enclosure 140 housed within a central aperture 131 of the frame 130. The telescoping enclosure 140 includes a sleeve 145 that slides within the central aperture 131 between an expanded position (as in FIGS. 5, 8, 11 and 14) and a collapsed position (as in FIGS. 4, 7 and 12A). In the expanded position, the telescoping enclosure 140 may be held in place in the expanded position by way of couplings, fasteners, and/or friction between the sleeve 145 and the central aperture 131. Various fasteners can hold the telescoping enclosure 140 in the expanded position, such as: snap-fit fasteners, latches, couplers, magnets, or the like. In some embodiments, the frame 130 has a flexible ring 133 with a ridge 132 that mates with a plurality of protrusions 147 on the sleeve 145 so that the protrusions 147 and ridge 132 operate together as an annular snap-fit fastener to hold the telescoping enclosure 140 in the expanded position 148. Thus, sliding sleeve 145 from the collapsed position into the expanded position causes the protrusions 147 to traverse the ridge 132, thereby snap-fitting the telescoping enclosure 140 in the expanded position.

The telescoping enclosure 140 slides between the collapsed position and the expanded position without falling out of the frame 130. The sleeve 145 may include a plurality of ledges 146 near a back portion of the sleeve 145. The ledges 146 increase the diameter of the sleeve 145 to be larger than the central aperture 131, which causes the ledges 146 to catch on the frame 130 and stop outward sliding movement. Thus, one or more ledges 146 may be abutting the frame 130 in the expanded position. In addition, protrusions 147 may be snap-fit with ridge 132 in the expanded position. The flexible ring 133 may have sufficient friction against the sleeve 145 to restrict water from entering the outlet cover 101 when in the expanded position.

Sometimes a user may lose or discard the cord port door 117, which may allow water or dirt to enter the outlet cover 101 unless another element blocks the water and dirt from entering. The telescoping enclosure 140 positioned in the collapsed position (see FIG. 12A) helps restrict water and dirt from entering the outlet cover 101. In some embodiments, telescoping enclosure 140 may include a flange 141 (or another protrusion or lip) that abuts the frame 130 when in the collapsed position 149. The shape of the frame 130 and the flange 141 create a significant obstruction to water and dirt. In certain embodiments, the telescoping enclosure 140 may seat into the base 110 when in the collapsed position. A back edge 151 (FIG. 4A) of the sleeve 145 seats against or abuts the base when in the collapsed position. The back edge 151 may seat in a valley 91 near at least one ridge (e.g., next to ridge 90, between ridge 90 and outer ridge 92, or the like). Back edge 151 seated proximate ridge 90 of the base 110 helps restrict water and dirt from entering and contacting the electrical outlet, and may form a tortuous path for any water or dirt attempting to enter. This beneficial barrier to contaminants entering the enclosure even when the cord ports are open is particularly advantageous. One significant benefit of having the back edge 151 abutting the base 110 is that it doesn't matter if a cord port door 117 is missing because positioning the telescoping enclosure 140 in the collapsed position forms an inner barrier against water and dirt. Thus, water can enter an open cord port 116 and be substantially or entirely blocked from reaching the electrical outlet 115 by a telescoping enclosure 140 in the collapsed position.

FIGS. 15-26 depict various views of a non-limiting implementation of a cover for an electrical outlet. An electrical outlet cover 101 may be formed according to the second approach described herein and generally shown in FIGS. 15-26. Although the particular materials with which this second approach is manufactured is not critical to the operation of the cover and may be formed of plastic or metal or any other materials known in the formation of electrical outlet covers, this approach is particularly advantageous for electrical outlet covers manufactured of metal. Outlet cover 102 is similarly structured to outlet cover 101 in the previous approach, with differences discussed below.

Figure 17:
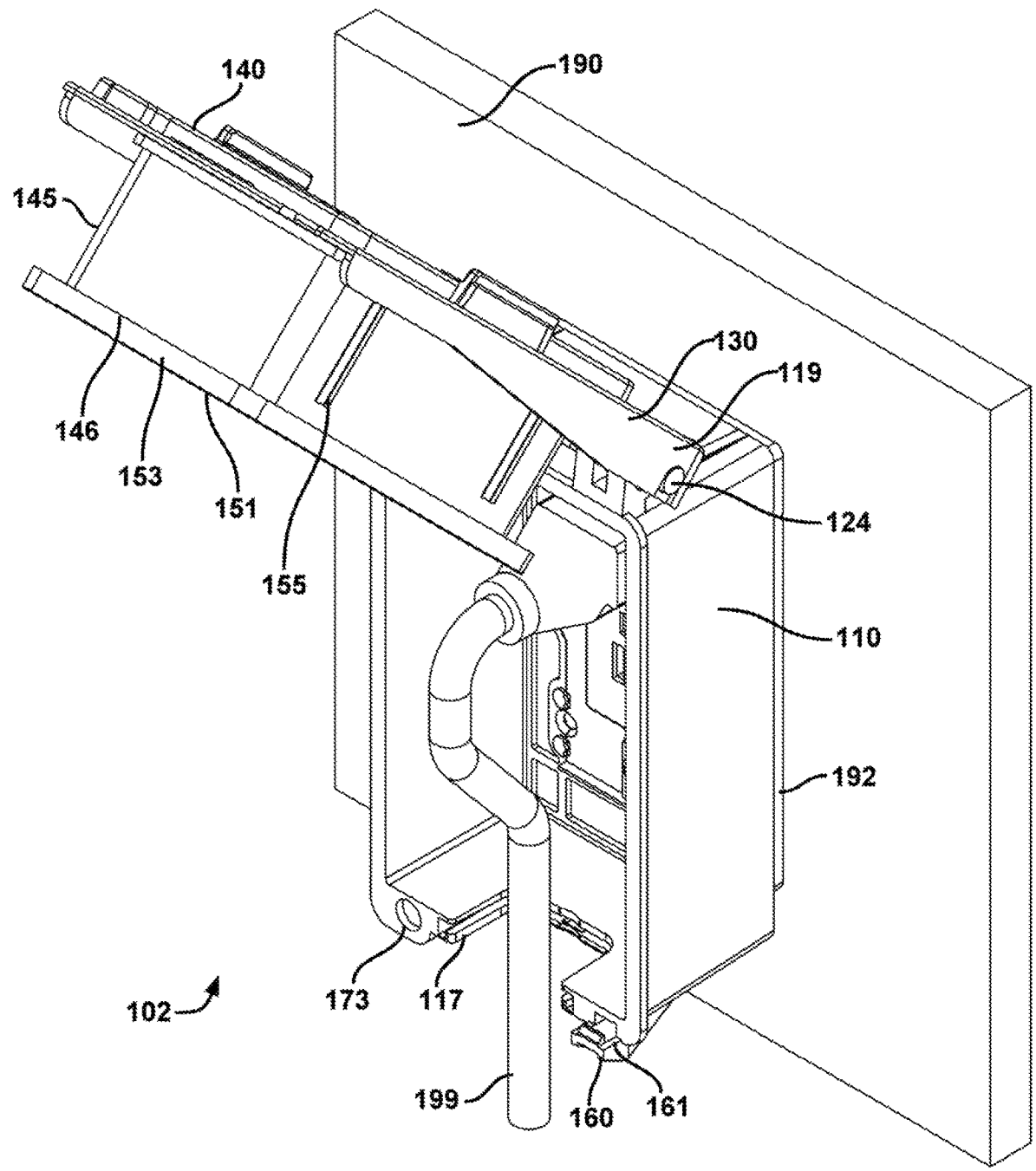
FIGS. 17 and 18 are perspective views the outlet cover assembly of FIG. 15 with the lid in, respectively, an open collapsed position and an open expanded position.
Figure 18:
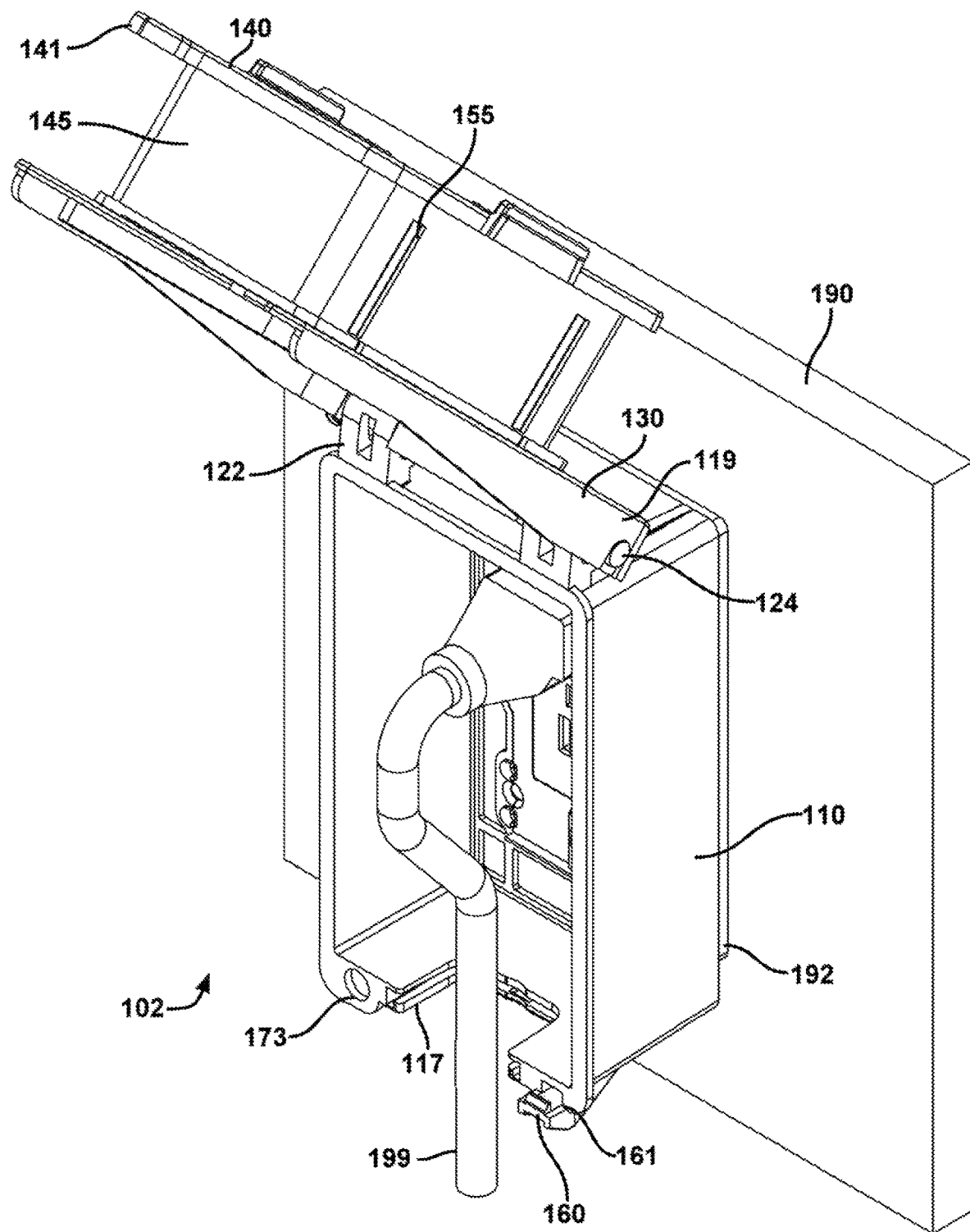
Figure 19:
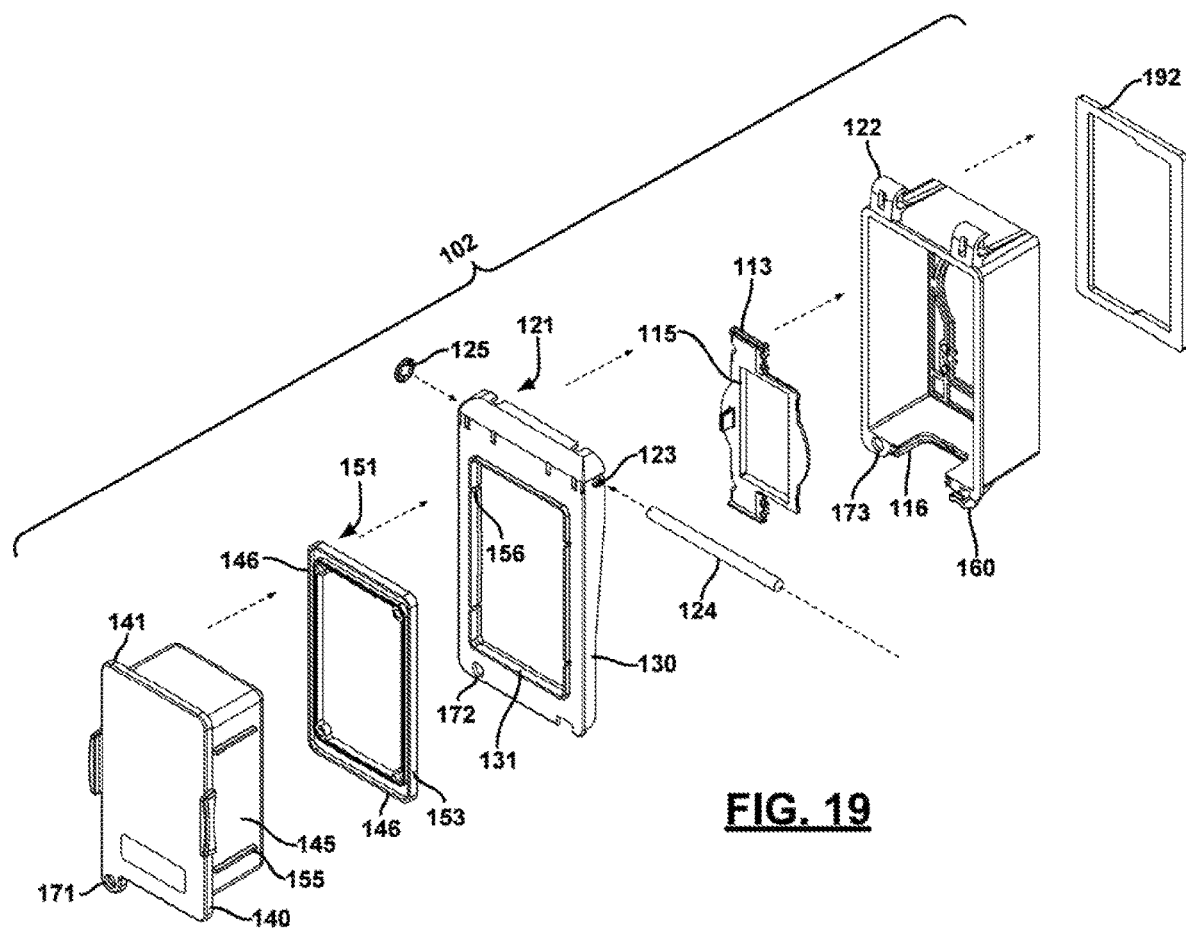
FIG. 19 is an exploded perspective view of the outlet cover assembly of FIG. 15.
Figure 22:
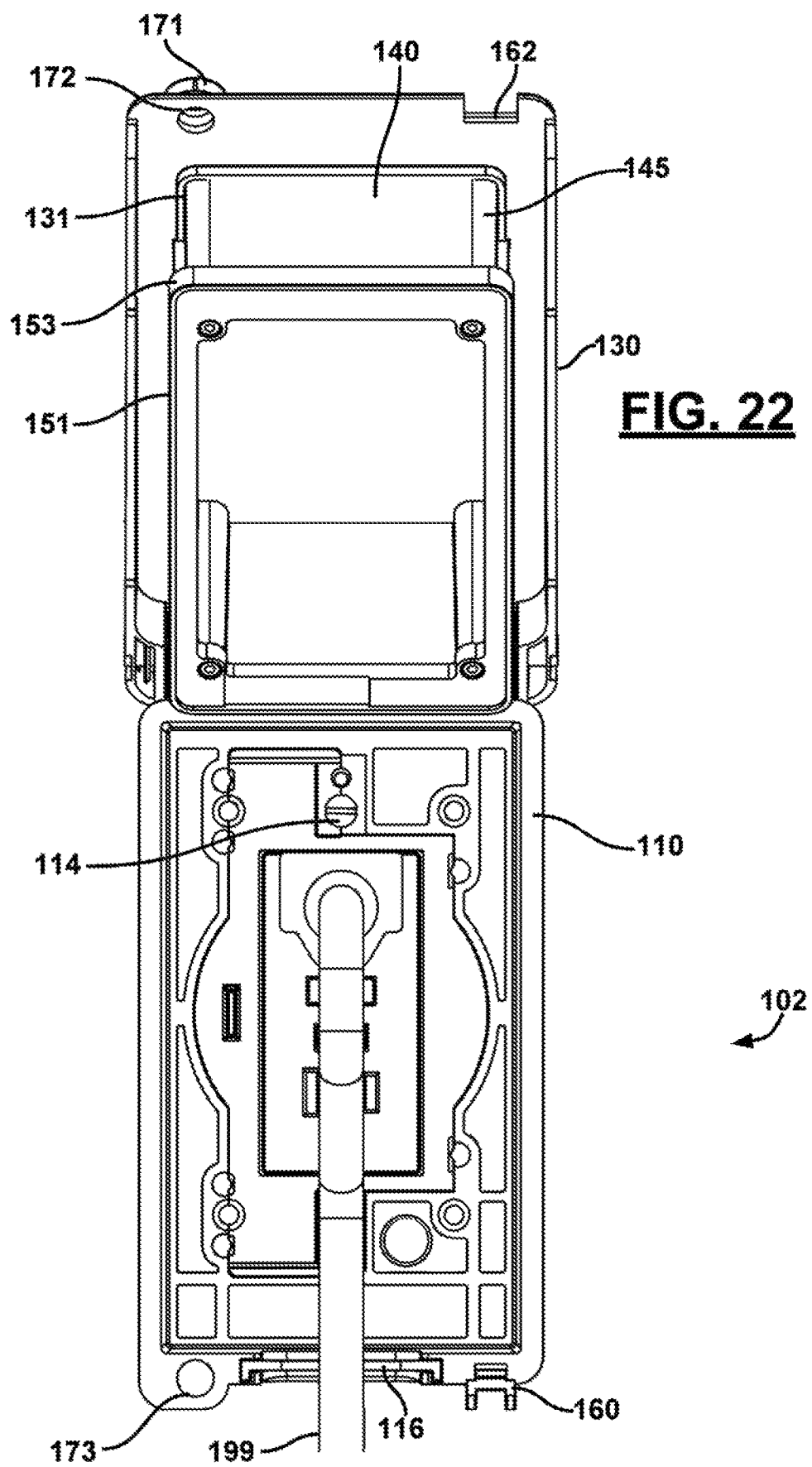
FIG. 22 is a front view of the outlet cover assembly of FIG. 15 with the lid in its open collapsed position.
Figure 23:
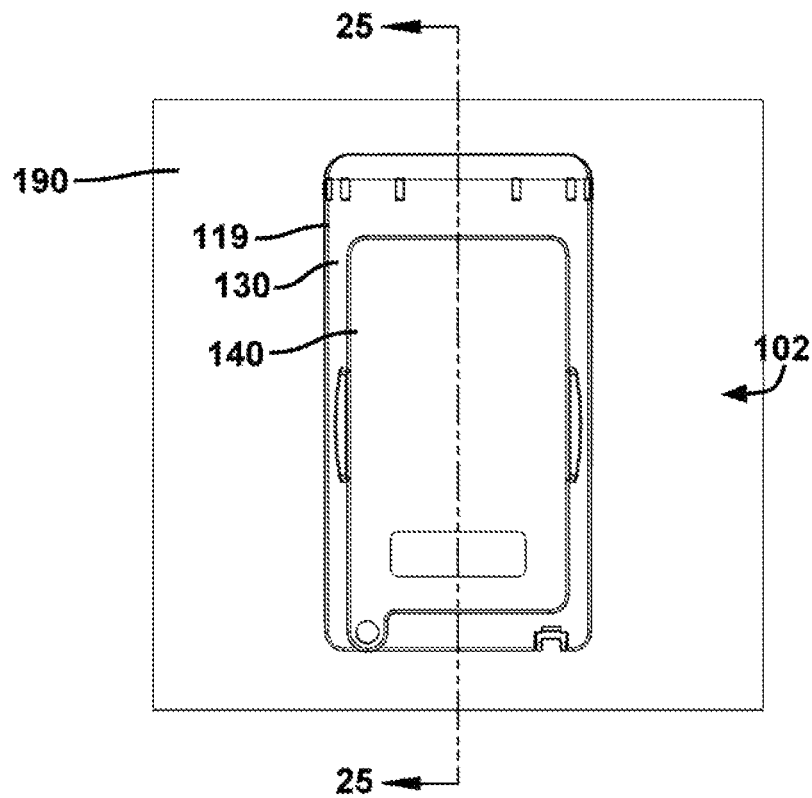
FIG. 23 is a front view of an outlet cover assembly of FIG. 15 shown mounted on a wall.
Figure 24:
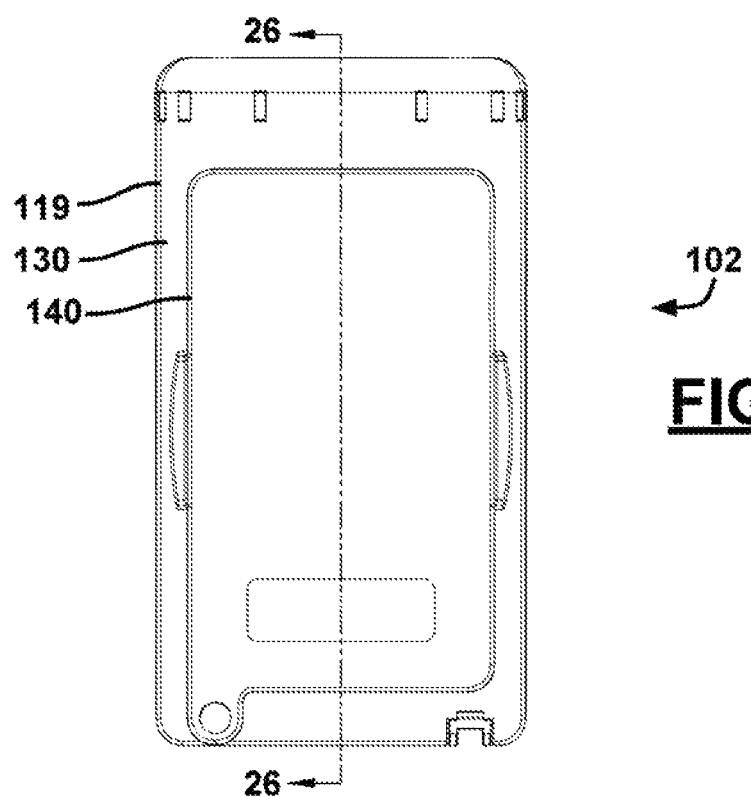
FIG. 24 is a front view of an outlet cover assembly of FIG. 15, not mounted on a wall.
Figure 25:
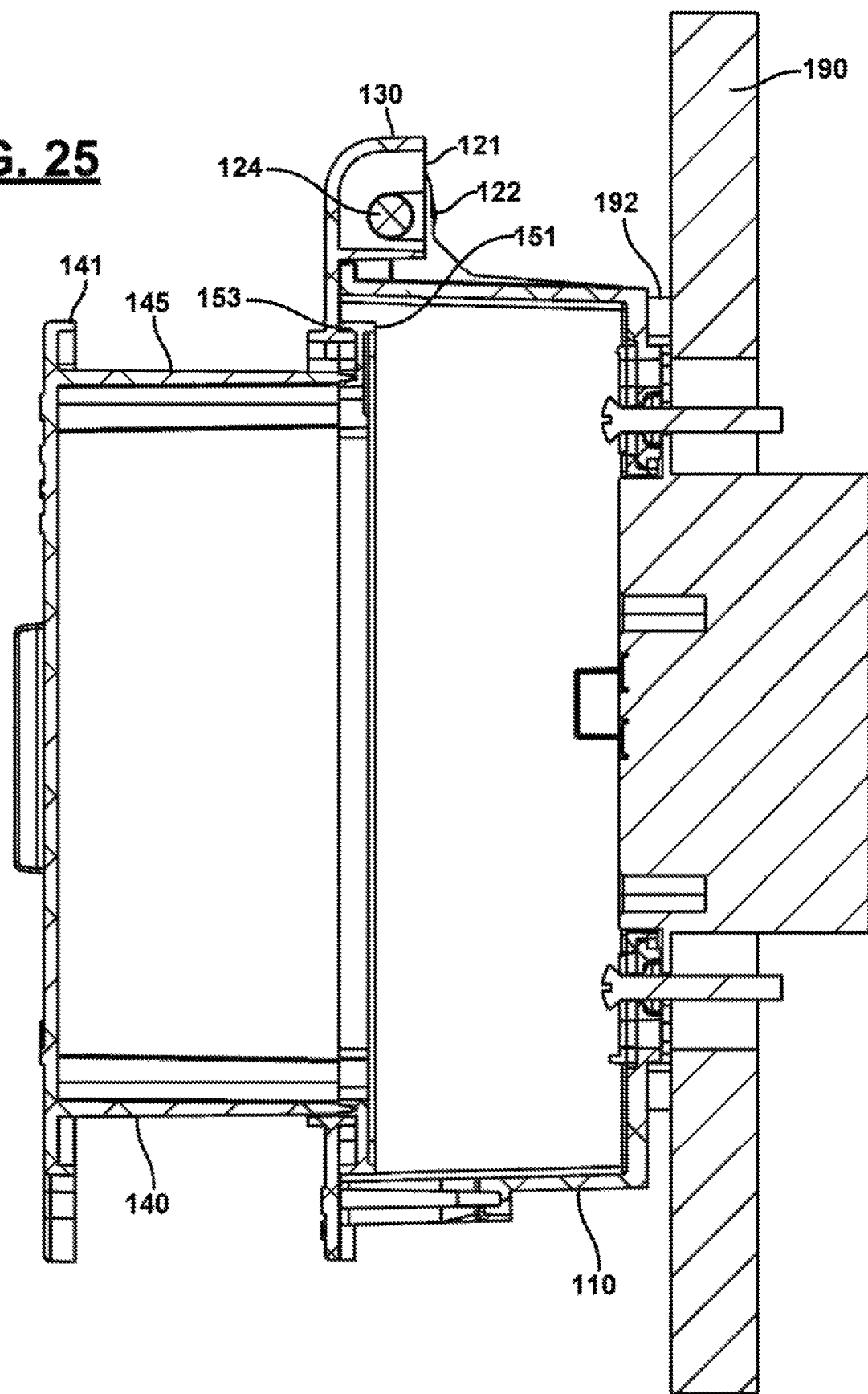
FIG. 25 is a sectional view of FIG. 23, with the section taken along section lines 25-25.
Figure 26:
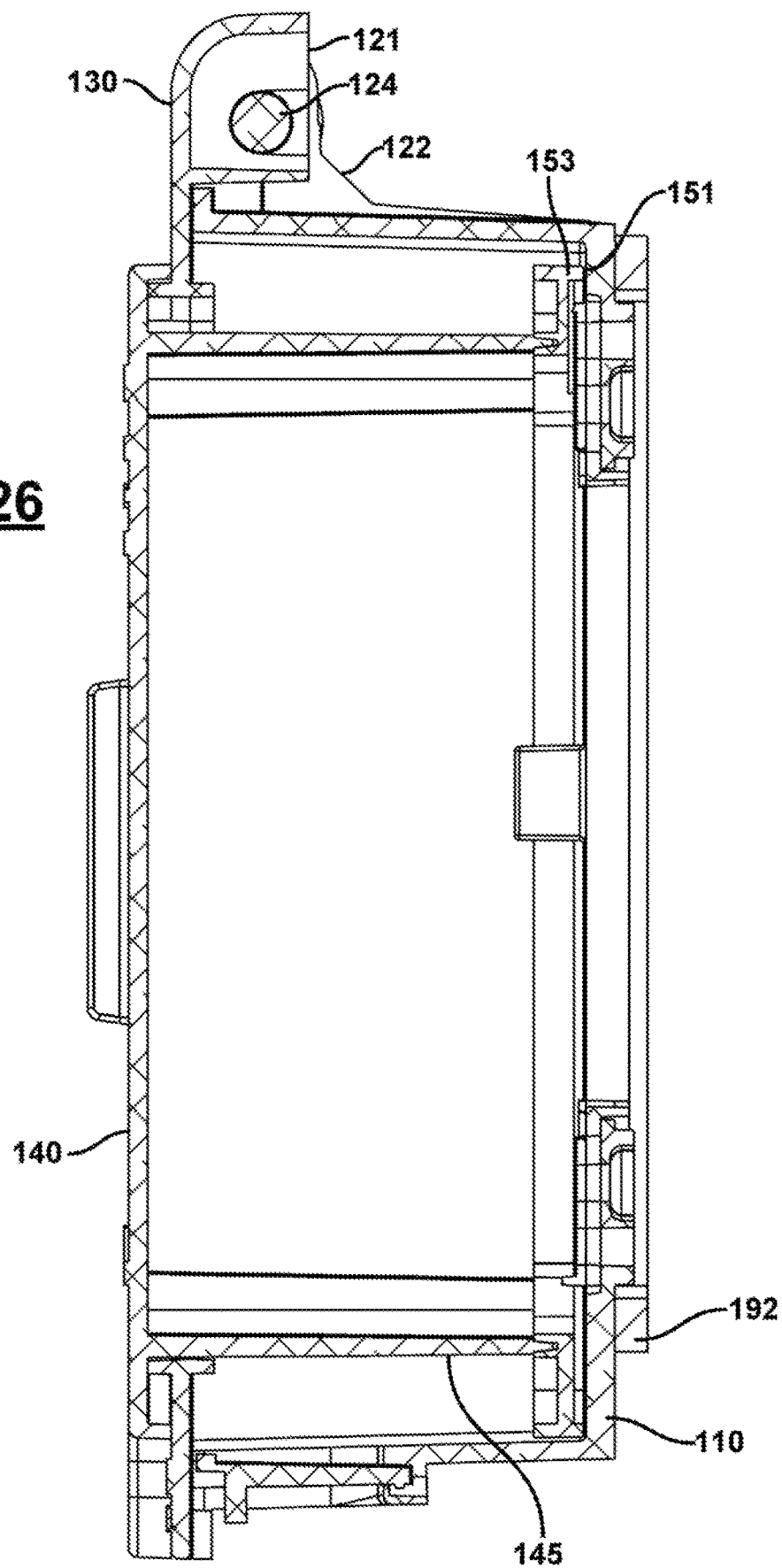
FIG. 26 is a sectional view of FIG. 24, with the section taken along section lines 26-26.
Figure 30:
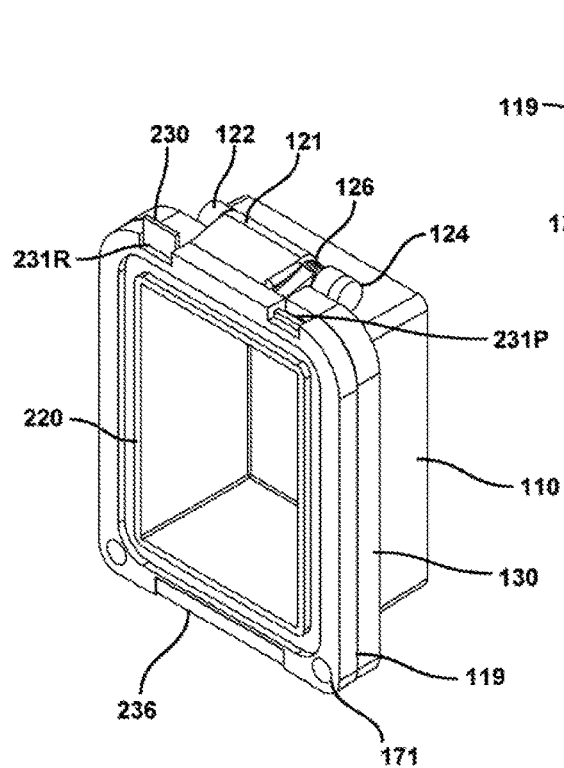
FIG. 30 is a perspective view of the outlet cover assembly of FIG. 27 in the closed receding position.
Figure 31:
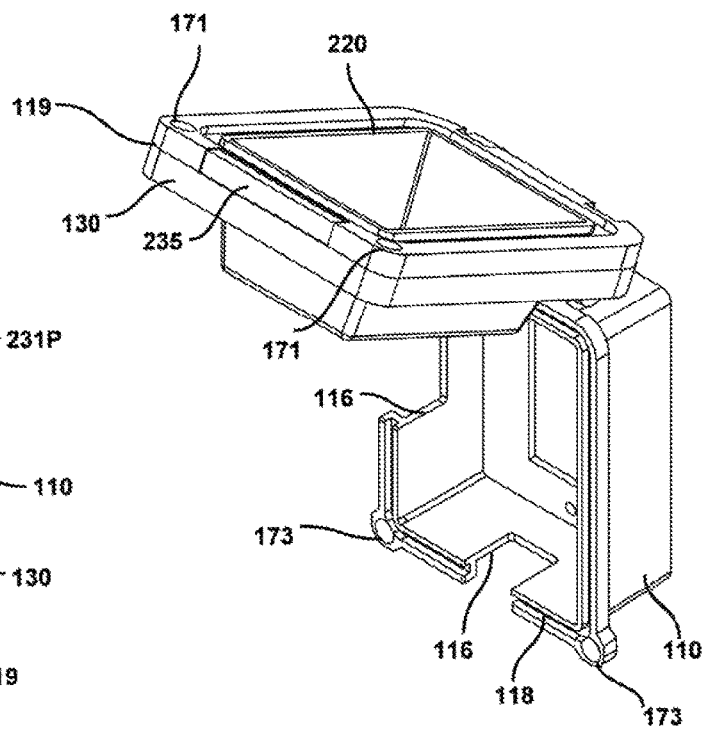
FIG. 31 is a perspective view of the outlet cover assembly of FIG. 27 in the open receding position.
Figure 32:
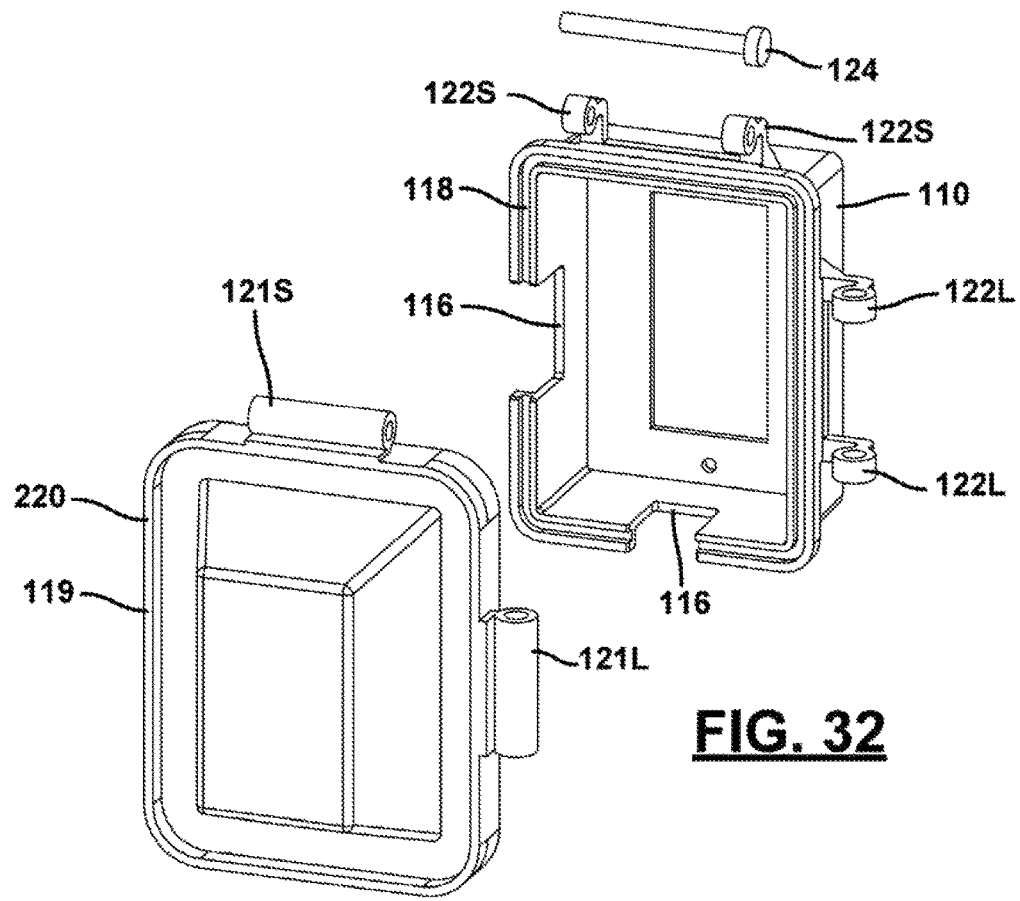
FIG. 32 is an exploded perspective view of an outlet cover assembly with a reversible two-hinged lid mounted in a vertical orientation.
Figures 33, 34:
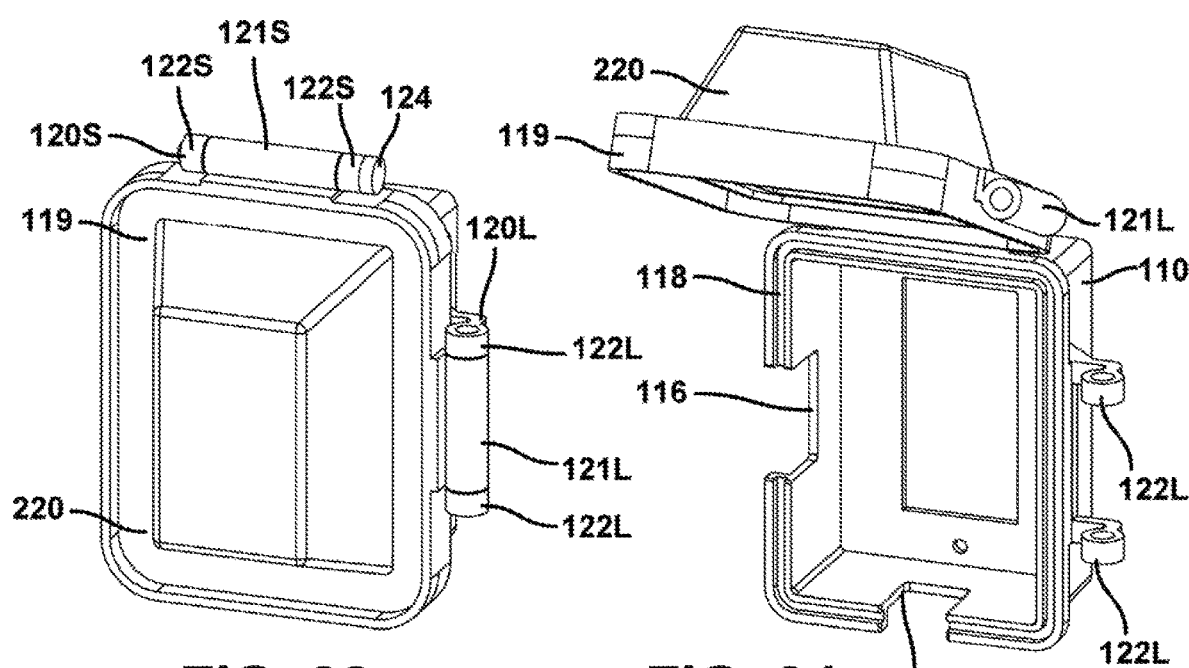
FIG. 33 is a perspective view of the outlet cover assembly of FIG. 32 in the closed protruding position.
FIG. 34 is a perspective view of the outlet cover assembly of FIG. 32 in the open protruding position.
Figure 37:
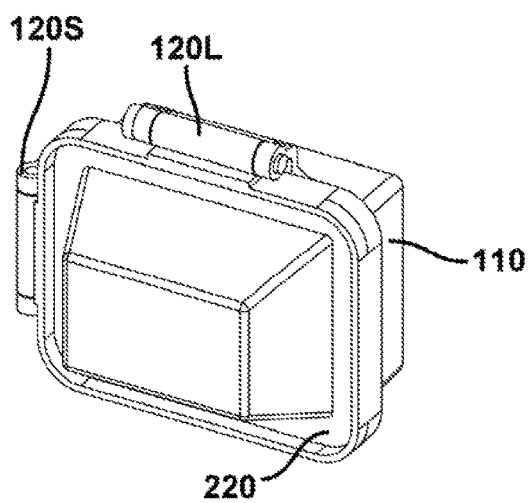
FIG. 37 is a perspective view of the outlet cover assembly of FIG. 32 but mounted in a horizontal orientation with the lid in the closed protruding position.
Figure 38:
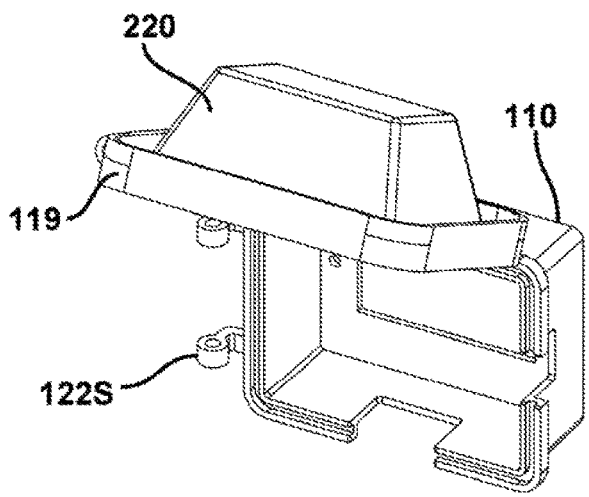
FIG. 38 is a perspective view of the outlet cover assembly of FIG. 32 but mounted in a horizontal orientation with the lid in the open protruding position.
Figure 39:
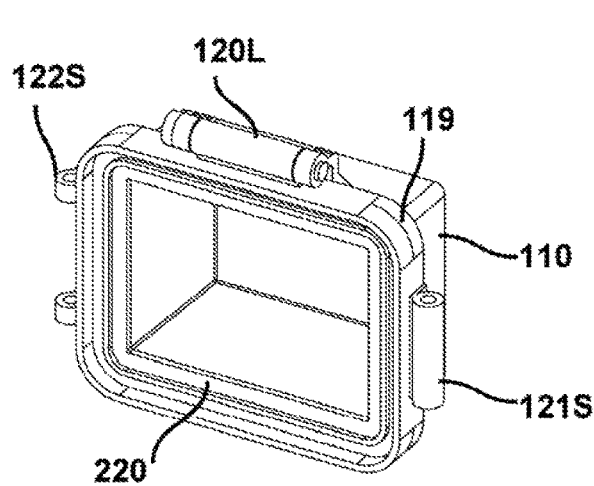
FIG. 39 is a perspective view of the outlet cover assembly of FIG. 32 but mounted in a horizontal orientation with the lid in the closed receding position.
Figure 40:
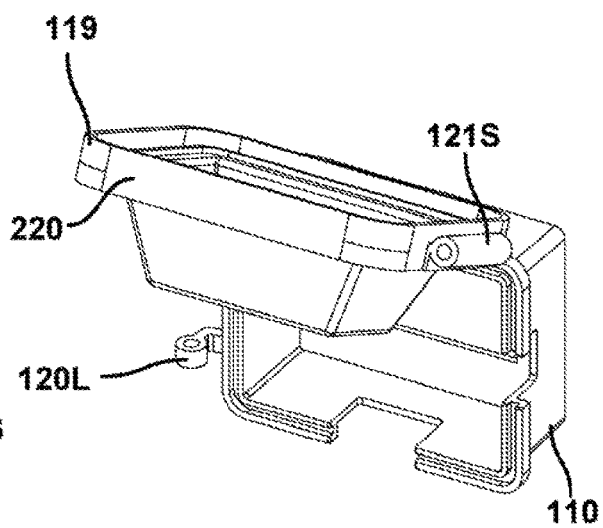
FIG. 40 is a perspective view of the outlet cover assembly of FIG. 32 but mounted in a horizontal orientation with the lid in the open receding position.
Figure 41B:
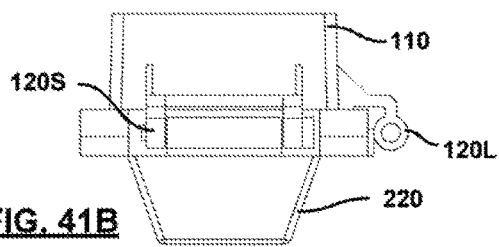
FIG. 41B is a first side view of FIG. 41A.
Figure 41E:
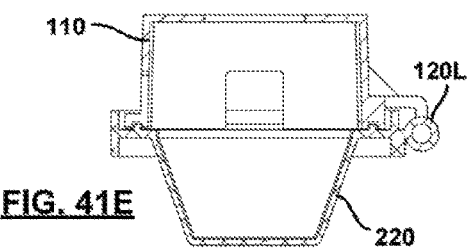
FIG. 41E is a sectional view of FIG. 41A.
Figure 41A:
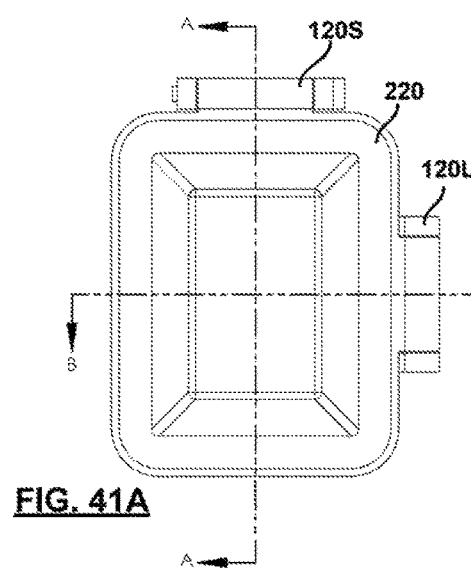
FIG. 41A is a front view of an outlet cover assembly of FIG. 33.
Figure 41C:
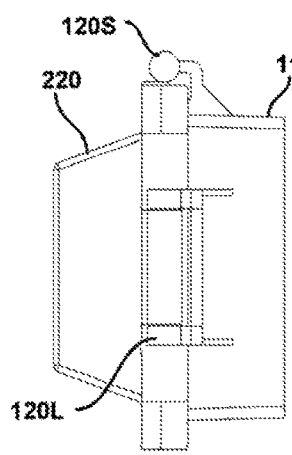
FIG. 41C is a second side view of FIG. 41A.
Figure 41D:
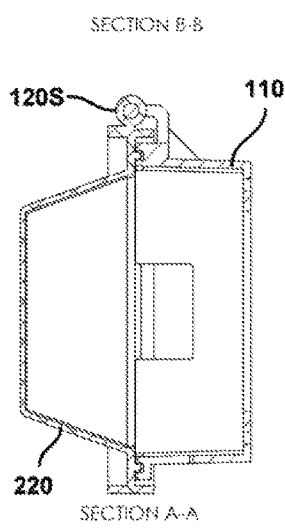
FIG. 41D is a sectional view of FIG. 41A.
Figure 45:
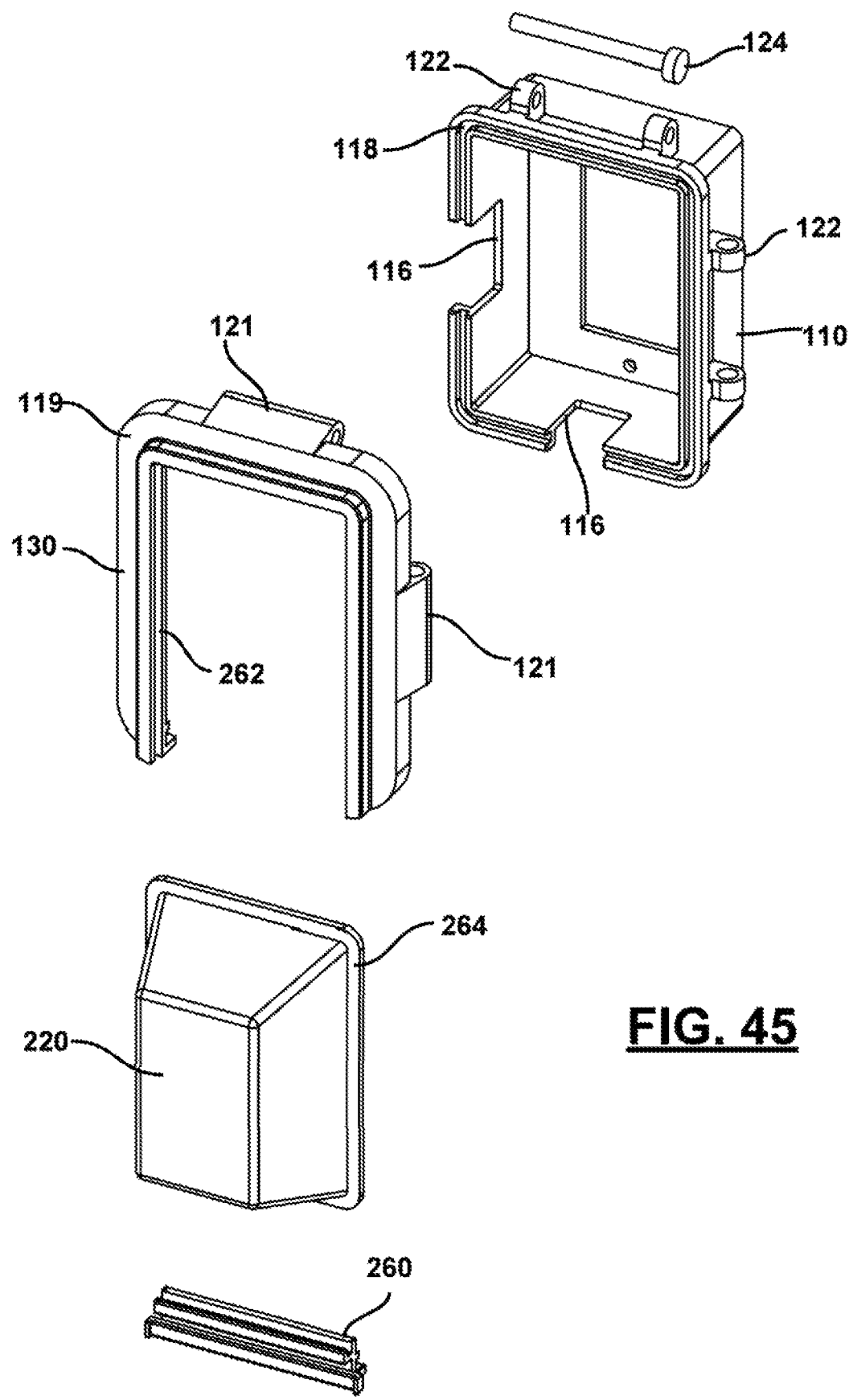
FIG. 45 is an exploded perspective view of an outlet cover assembly with bubble removable from a frame.
Figure 48:
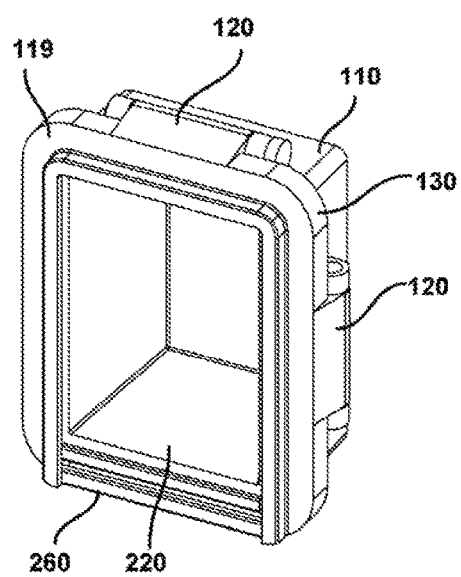
FIG. 48 is a perspective view of the outlet cover assembly of FIG. 45 in the closed receding position.
Figure 49:
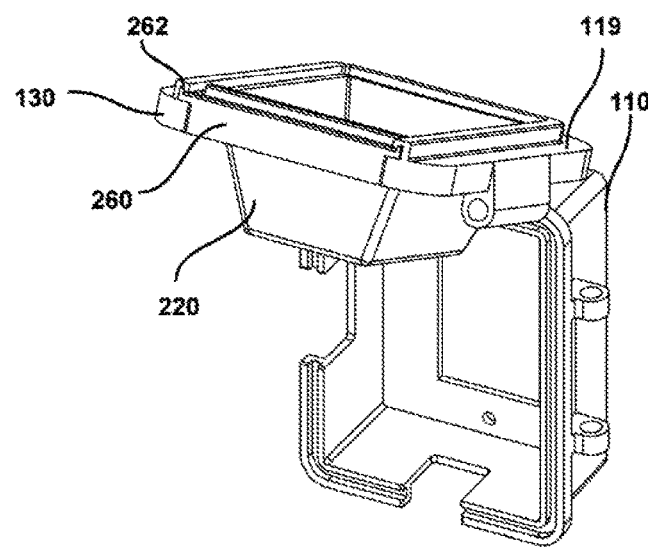
FIG. 49 is a perspective view of the outlet cover assembly of FIG. 45 in the open receding position.
Figure 50:
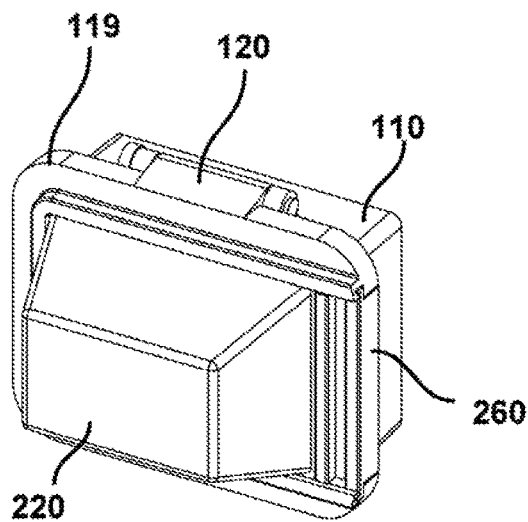
FIG. 50 is a perspective view of the outlet cover assembly of FIG. 45 but mounted in a horizontal orientation with the lid in the closed protruding position.
Figure 51:
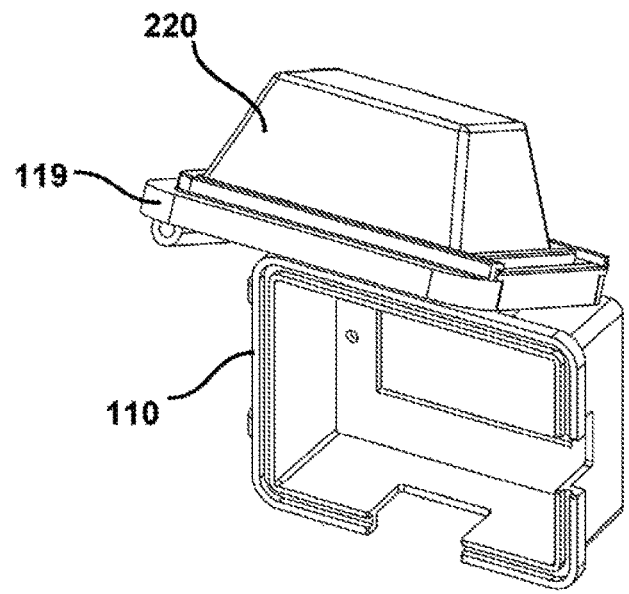
FIG. 51 is a perspective view of the outlet cover assembly of FIG. 45 but mounted in a horizontal orientation with the lid in the open protruding position.
Figure 52:
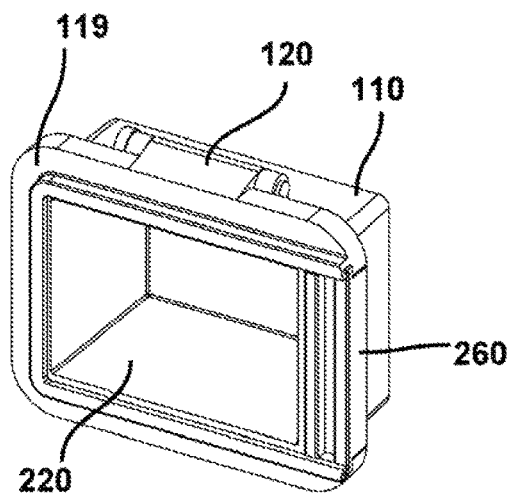
FIG. 52 is a perspective view of the outlet cover assembly of FIG. 45 but mounted in a horizontal orientation with the lid in the closed receding position.
Figure 53:
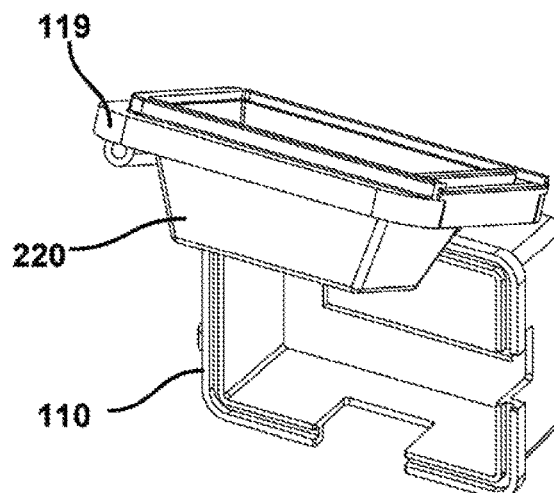
FIG. 53 is a perspective view of the outlet cover assembly of FIG. 45 but mounted in a horizontal orientation with the lid in the open receding position.

Outlet cover 102 may include a latch assembly 160 that includes a hitch seat 161 (FIG. 17) that mates with the frame 130, for example mating with frame 130 at cutout 162 (FIG. 22). Latch assembly 160 operates by employing a hinge assembly 120 with a pin 124 where there is sufficient vertical movement or "play" for the lid hinge so that when vertically moving the lid 119 in its closed position (FIG. 15 or 16) against the base 110, the cutout 162 unseats from the hitch seat 161 so that the lid 119 can then be pivoted forward to pass over the latch assembly 160 to allow the lid 119 to continue to be lifted into the open position (FIG. 17 or 18).

Figure 20:
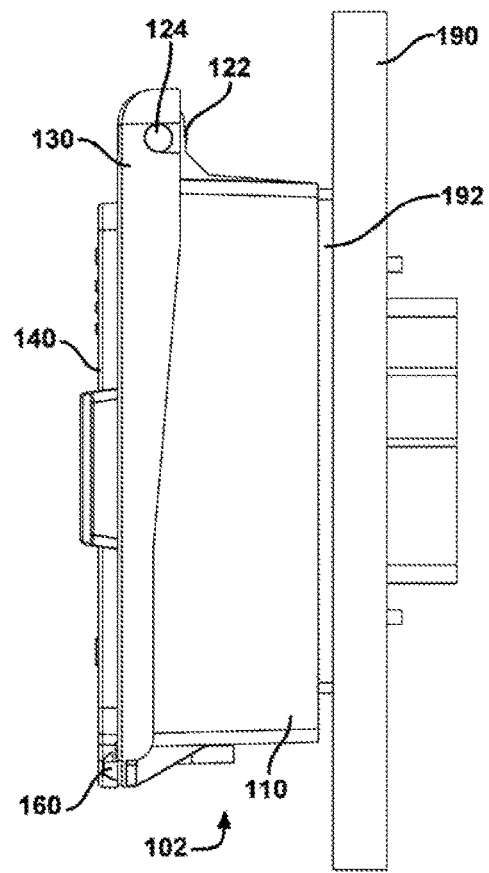
FIGS. 20 and 21 are, respectively, side views of the outlet cover assembly of FIG. 15 in, respectively, the closed collapsed position and the closed expanded position.
Figure 21:
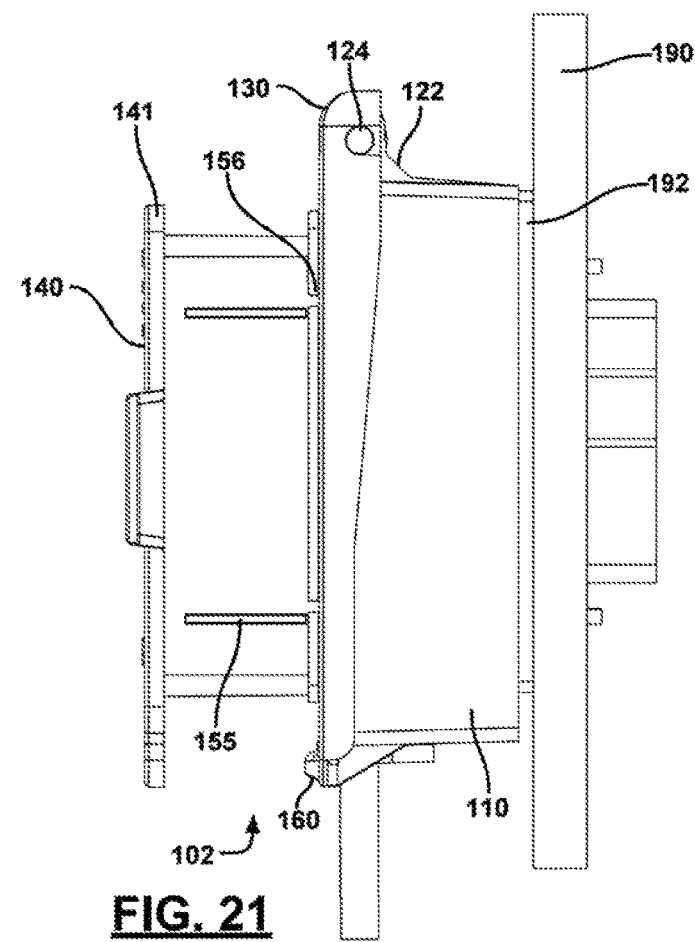

Flange 141 of the telescoping enclosure 140 may have a variety of shapes and sizes. For example, the flange 141 depicted in FIGS. 15-26 has a different shape than the flange 141 depicted in FIGS. 1-14, but both flanges 141 may serve the same purpose and function. It follows that flange 141 of outlet cover 102 also abuts the frame 130 in the collapsed position (FIGS. 17 and 20).

Sleeve 145 may also include a foot assembly 153 (FIG. 17) attached to a back portion of the sleeve. The base of the foot assembly 153 thus becomes the back edge 151 of the sleeve 145. That is, when the sleeve 145 seats down into the base 110 in the collapsed position (see FIG. 26), the back edge 151 of the sleeve 145 is the underside of the foot assembly 153. In addition, the top surface of the foot assembly 153 is labeled as ledge 146 because this top surface of the foot assembly 153 now operates as ledge 146 in outlet cover 102. Thus, foot assembly 153 abuts the frame 130 when the ledge 146 abuts the frame 130 to stop the telescoping enclosure 140 from entirely sliding out of the central aperture 131 in the extended position 148. The ledge 146 may also help form a tortuous path with the frame 130 to restrict entry of water or dirt. The foot assembly 153 may have cavities and a diameter configured to seal or restrict contaminants between the frame 130 and/or the base 110.

Sleeve 145 may include runners 155 that help support the telescoping enclosure 140 within the frame 130 as the runners 155 (FIGS. 19 and 21) slide through channels 156 in the frame 130. The length of the runners 155 may be short enough to allow the telescoping enclosure 140 to slightly fall or slip down when in the extended position 148 (see FIG. 21). This ability to fall or slip down operates to lock the telescoping enclosure 140 in the extended position because a user would need to lift the telescoping enclosure 140 and re-insert the runners 155 into the channels 156 to slide the telescoping enclosure back to the collapsed position. It also assists in locking the telescoping enclosure 140 in the collapsed position for the same reasons.

Each of the embodiments disclosed in FIGS. 27-53 includes a cover for an electrical outlet that has a base with an opening large enough to receive a portion of an electrical device therein, a lid hingedly coupled to the base on one side that can pivot between an open position and a closed position. For each embodiment, the lid of the assembly includes a frame surrounding a central aperture 215 in the frame, with a bubble protruding outward from the frame. For the bubble, by nature of either the lid as a whole or the bubble by itself in relation to the frame, being in a first position, the bubble protrudes outward, away from the base to allow space within the cover assembly in the closed position so that a plug can be plugged into an electrical outlet and the cover closed without interference. When the lid as a whole or the bubble itself in relation to the frame results in the bubble being in a second position, by rotating the bubble 180 degrees in at least one direction, the bubble recedes inward toward the base and when the lid is placed in a closed position the bubble extends into the base. By the bubble having both a first position and a second position in which the bubble can attach to the outlet cover assembly and in the first position it allows for use of the assembly as a weatherproof outlet cover and in the second position it is more compact, blocks the outlet receptacle from use and still closes, the outlet cover assembly provides significant advantage over conventional bubble covers.

FIGS. 27-31 depict various views of a non-limiting implementation of a cover 103 for an electrical outlet. This embodiment shares numerous similarities with the previous two embodiments, but the previous two embodiments differ from this embodiment and the two embodiments following this one by employing a reversible bubble assembly 220 rather than a telescoping enclosure 140. The bubble assembly 220 of outlet covers 103, 104 and 105 can be positioned in a protruding position (see, e.g., FIGS. 28 and 29) and a receding position (see, e.g., FIGS. 30 and 31) rather than an expanded position and a collapsed position as with the telescoping enclosure 140. Each lid 119 in outlet covers 103, 104 and 105 may be arranged in an open position (see, e.g., FIGS. 29 and 31) or a closed position (see, e.g., FIGS. 28 and 30), which may look different than previously described outlet covers 101 and 102 if two hinge assemblies 120 are employed, but the operation is generally the same as described above.

As shown in FIG. 27, an outlet cover 103 includes a lid 119 with a detachable and reversible bubble assembly 220. A bottom edge of the bubble assembly 220 includes a lip 236 that seats into slot 235 in either a protruding position (see FIGS. 28 and 29) or in a receding position (see FIGS. 30 and 31). A clip assembly 230 on the frame clips on to the bubble assembly 220. The clip assembly 230 may be a cantilevered snap-fit fastener with a clip 232 that grasps onto a catch 231P (resulting in bubble assembly 220 in a protruding position) or onto a catch 231R (resulting in bubble assembly 220 in a receding position). The bubble assembly 220 may switch between the protruding position and the receding position by simply releasing the clip assembly 230, removing the bubble assembly 220 from the slot 235, rotating the bubble assembly by 180° around the long central axis, re-seating the lip 236 into the slot 235, and then attaching clip assembly 230 to either catch 231R (for receding position) or catch 231P (for protruding position). By configuring the lid frame to receive the bubble assembly 220 in either of the first position or the second position, the cover assembly structure is simplified in that cord port covers for the cord ports 116 may not be required. The bubble assembly 220 oriented in the second position (FIGS. 30-31) protects the electrical outlet and acts as at least a partial barrier against water and other contaminants.

In some embodiments, hinge assembly 120 includes a hinge bias member 126, such as a spring, torsion member, or the like. Although not depicted in FIGS. 27-31, the hinge assembly 120 may be positioned on a long edge of the lid 119 and base 110 rather than a short edge (as shown), or, like other embodiments in this disclosure, two hinge assemblies 120 on adjacent sides of the lid and base may be provided.

FIGS. 32-44 depict various views of a non-limiting embodiment of a cover 104 for an electrical outlet. The bubble assembly 220 of the outlet cover 104 can be oriented in a protruding position (see, e.g., FIGS. 33 and 34) or in a receding position (see, e.g., FIGS. 35 and 36). Lid 119 of outlet cover 104 may be pivoted to an open position (see, e.g., FIGS. 34 and 36) or to a closed position (see, e.g., FIGS. 33 and 35) on either of two hinged axes when two hinge assemblies 120 are employed. The general operation and components of an electrical outlet cover of this embodiment is, nevertheless, similar to that described in other embodiments of this disclosure. While not all of the disclosed outlet covers are displayed in this way, any of outlets covers 101, 102, 103, 104, or 105 may be oriented on a wall or wall plate 190 in either a "portrait" or "vertical" orientation (see, e.g., FIGS. 33-36) or a "landscape" or "horizontal" orientation (see, e.g., FIGS. 37-40).

In this particular embodiment, an outlet cover 104 includes a frame 130, a lid 119, and a bubble assembly 220 that may be combined to form an electrical outlet cover assembly. The outlet cover 104 of this particular embodiment comprises two hinge assemblies 120—a first hinge assembly 120L on a long side of the base 110 and lid 119, and a second hinge assembly 120S on a short side of the base 110 and lid 119. Pin 124 may be removed from either hinge assembly 120S or 120L to allow lid 119 to be rotated into various configurations. The pin 124 inserted in hinge assembly 120S configures outlet cover 104 to open in a "portrait" orientation (see, e.g., FIGS. 33-36). The pin 124 inserted in hinge assembly 120L configures outlet cover 104 to open in a "landscape" orientation (see, e.g., FIGS. 37-40).

For example, the lid 119 and bubble assembly 220 may switch between the protruding position and the receding position in a "portrait" orientation by simply removing the pin 124 from hinge assembly 120S, separating hinge members 121S and 122S, rotating the bubble assembly 220 by 1800 around the long central axis, re-joining hinge members 121S and 122S, and then replacing the pin 124 into hinge assembly 120S.

FIGS. 41A-E depict a "portrait" orientation opening outlet cover 104 with the bubble assembly 220 in a protruding position so that the bubble portion of the bubble assembly extends away from the base. FIGS. 42A-F depict a "portrait" orientation opening outlet cover 104 with the bubble assembly 220 in a receding position so that the bubble portion of the bubble assembly extends toward and into the base. FIGS. 43A-F depict a "landscape" orientation opening the outlet cover 104 with the bubble assembly 220 in a protruding position. FIGS. 44A-F depict a "landscape" orientation opening the outlet cover 104 with the bubble assembly 220 in a receding position.

It is particular to note that the hinge assemblies are constructed such that the lid hinge members and the base hinge members can mate with the bubble assembly 220 in either the protruding position or the receding position. By extending the base hinge members away from the base with hinge member arms, and by establishing the lid hinge members so that there is an unimpeded portion so that the lid can close on the base in both the protruding position and in the receding position without interference from any portion of the base. The bubble assembly 220 may switch between the protruding position and the receding position by simply removing the hinge pin 124, removing the bubble assembly 220 from the base, rotating the bubble assembly by 180° around the long central axis or the short central axis (depending upon whether the user wants the cover to be oriented horizontally or vertically and reattaching the hinge pin 124. By configuring the base to receive attachment of the bubble assembly 220 in either a protruding position or a receding position, the cover assembly structure is simplified in that cord port covers for the cord ports 116 may not be required. The bubble oriented in the receding position protects the electrical outlet and acts as at least a partial barrier against water and other contaminants.

FIGS. 45-53 depict various views of a non-limiting implementation of a cover 105 for an electrical outlet. The bubble assembly 220 of outlet cover 105 can be positioned in a protruding position (see, e.g., FIGS. 46 and 47) and a receding position (see, e.g., FIGS. 48 and 49) rather than an expanded position and a collapsed position as with a telescoping enclosure illustrated in the first two embodiments of this disclosure. The lid 119 of the outlet cover 105 may be in an open position (see, e.g., FIGS. 47 and 49) or a closed position (see, e.g., FIGS. 46 and 48), and may comprise one or two hinge assemblies, but the operation is generally the same as described above in relation to the first two embodiments of this disclosure. While not all of the disclosed outlet covers are displayed in this way, any of outlet covers 101, 102, 103, 104, or 105 may be oriented on a wall or wall plate 190 in either a "portrait" or "vertical" orientation (see, e.g., FIGS. 46-49) or a "landscape" or "horizontal" orientation (see, e.g., FIGS. 50-53).

In outlet cover 105, the lid 119 includes a detachable and reversible bubble assembly 220. A bottom edge of the frame 130 includes a gate 260 that may be removably attached to the frame 130 to allow the bubble assembly 220 to slide into and out of a track 262. Bubble assembly 220 may include a flange 264 sized and shaped to slidably mate with track 262 and form a water resistant barrier. Flange 264 of the bubble assembly 220, if used, slidably fits within track 262 in either the protruding position or in the receding position (by rotating the bubble assembly 220 axially 180°). The gate 260 releasably couples or fastens to the frame 130 using snap-fit couplings or other suitable couplings.

The bubble assembly 220 may switch between the protruding position (FIGS. 46-47 and 50-51) and the receding position (FIGS. 48-49 and 52-53) by removing the gate 260, removing the bubble assembly 220 from the track 262, rotating the bubble assembly by 180° around either the long central axis or the short central axis, reinserting the bubble assembly 220 into the track 262, and then reattaching the gate 260 to the frame 130. By configuring the lid frame to receive the bubble cover in either of the first position or the second position, the cover assembly structure is simplified in that cord port covers for the cord ports 116 may not be required. The bubble assembly 220 oriented in the second position (FIGS. 48-49 and 52-53) protects the electrical outlet and acts as at least a partial barrier against water and other contaminants.

Figure 54:
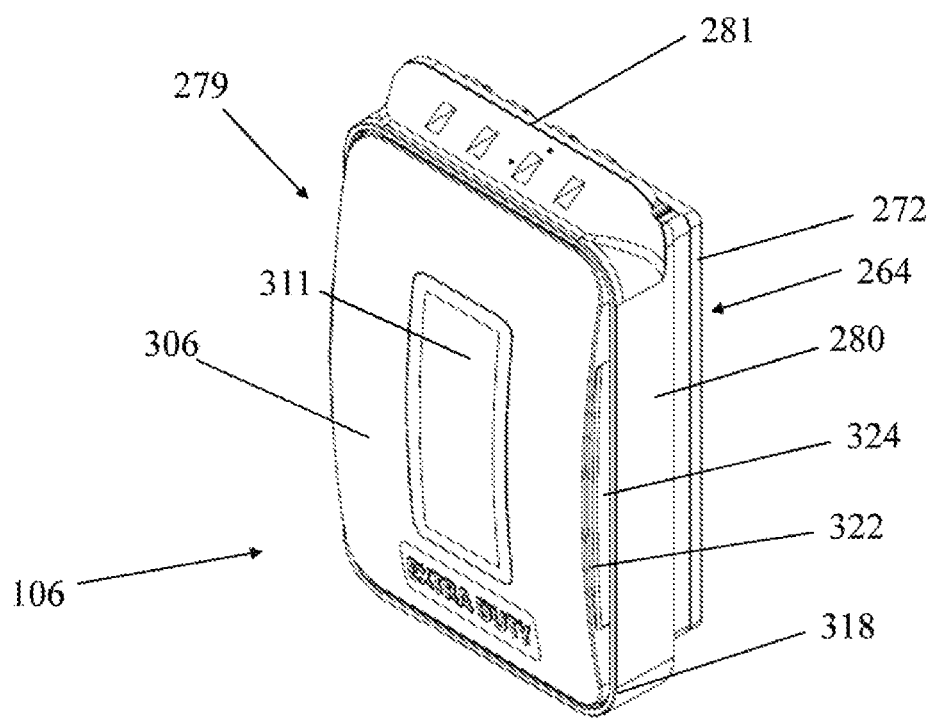
FIG. 54 is a perspective view of an outlet cover assembly with a curved front surface.
Figure 55:
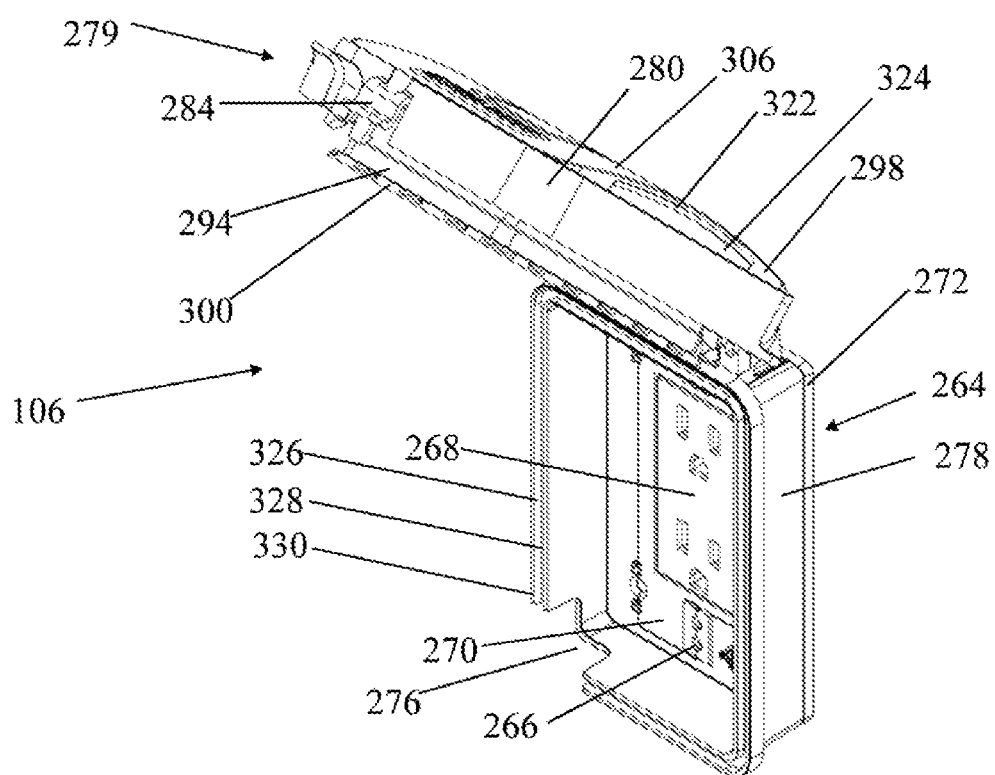
FIG. 55 is a perspective view of the outlet cover assembly of FIG. 54 in an open position with the enclosure collapsed.

FIGS. 54-64 depict various views of a non-limiting implementation of an outlet cover 106 for an electrical outlet. As shown in FIG. 55, an outlet cover 106 includes a base 264 with at least one electrical box mounting screw aperture 266 and an electrical device aperture 268 extending through the base. The base 264 includes an electrical device aperture 268 that allows the electrical outlet to be accessible through the outlet cover 106. The outlet cover 106 may be attached to an electrical outlet by screwing a screw into electrical box mounting screw apertures 266. The base 264 may include an insert 270 that allows a variety of different types of electrical outlets to mate with a specific type of outlet cover 106. The base 264 of outlet cover 106 may include one or more cord port apertures 276 through a base side wall 278. A cord port aperture 276 operates to allow a power cord 119 to enter the outlet cover 106 and couple to the electrical outlet. A gasket 272 may be used to limit water and other particles from reaching the electrical outlet by being sandwiched between the back of the base 264 and the adjacent wall. As more specifically shown in FIG. 62, the gasket 272 includes a gasket aperture 274 to allow access to the electrical outlet through the outlet cover 106.

The base 264 is hingedly coupled to a lid 279 along a first side 281 of a lid frame 280 (FIG. 54). The lid 279 may be pivotally lifted from the base 264 to move the lid 279 from a closed position (as in FIG. 54) to an open position (as in FIG. 55). As illustrated more specifically in FIGS. 57-58, in the closed position, a latch assembly 282 may be used to lock the lid frame 280 to the base 264 through the coupling of a first latch member 284 on the lid frame and a second latch member 286 on the base 264.

Figure 63:
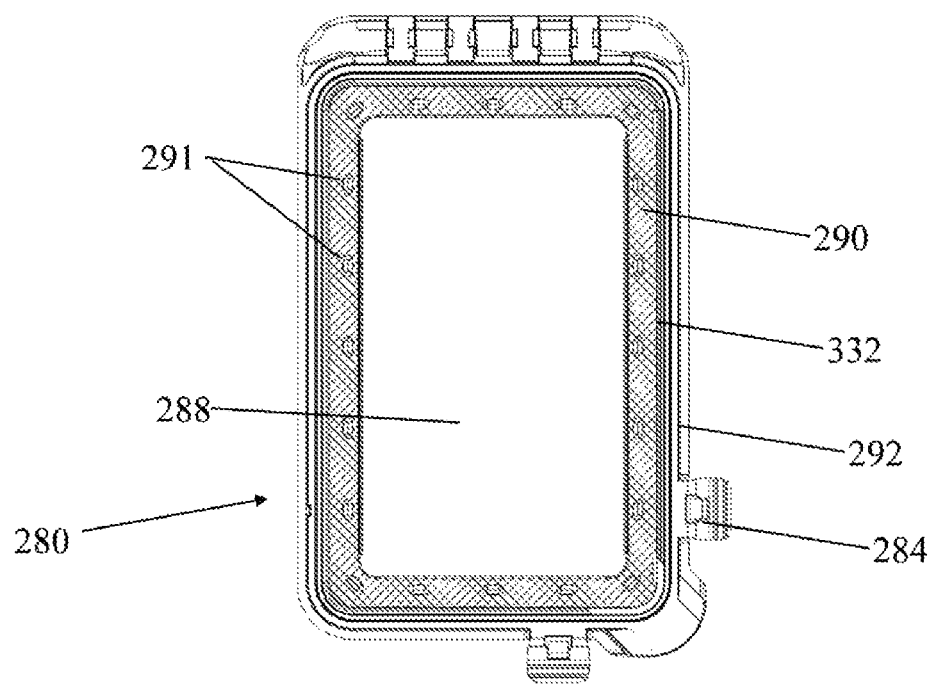
FIG. 63 is a rear view of the lid frame of the outlet cover assembly of FIG. 54.

As shown in FIG. 63, the lid frame 280 includes a central aperture 288 and may include a lid frame gasket 290 surrounding the central aperture 288 on a rear surface 292 of the lid frame 280. The lid frame gasket 290 may be coupled to the lid frame 280 through one or more prongs 291 extending from the rear surface 292 of the lid frame 280 and through the lid frame gasket 290. An enclosure 294 (FIG. 61) slidably couples with the lid frame 280 within the central aperture 288. The enclosure 294 slides between a collapsed, not-in-use position (as in FIG. 57) and an extended, in-use position (as in FIG. 60). When in the extended, in-use position, the enclosure 294 provides enough space inside of the outlet cover 106 for the power cord 119 to couple to the electrical outlet and exit the outlet cover 106 through the cord port aperture 276 while still enclosing the electrical outlet with the lid 279 closed.

As illustrated in FIGS. 60 and 61, the enclosure 294 includes a continuous side wall 296 and a front wall 298. The side wall 296 includes a ledge 300 located near a back edge 302 of the enclosure side wall 296. When the enclosure 294 is in the extended, in-use position, the ledge 300 comes into contact with the lid frame gasket 290, as shown in FIG. 60. This contact helps to limit the entrance of water and other particles into the outlet cover 106 when in use. The side wall 296 also includes a leading edge 304 distal to the back edge 302. The front wall 298 may include a convex front surface 306, a rear surface 308, and an aperture 309 covered by a window 311 made of a transparent material. In particular embodiments, the front surface 306 will be the window 311 so that a separate aperture 309 holding the window 311 is not necessary.

The window 311 allows a user to see the inside of the outlet cover 106 when the lid 279 is in the closed position. The window 311 may include a ridge or groove near its edge surface adapted to mate with a corresponding groove or ridge adjacent to the front wall opening. Additionally, clips 313 on each side of the window 311 may allow the window 311 (see FIG. 57) to be seated in the front wall 298 with the edge of the aperture 309 fitted into the clips 313 of the window 311 to retain the window 311 in the front wall 298. In some embodiments, the front side of the window 311 does not extend beyond the front side of the front wall (see, e.g., FIG. 54).

Figure 66:
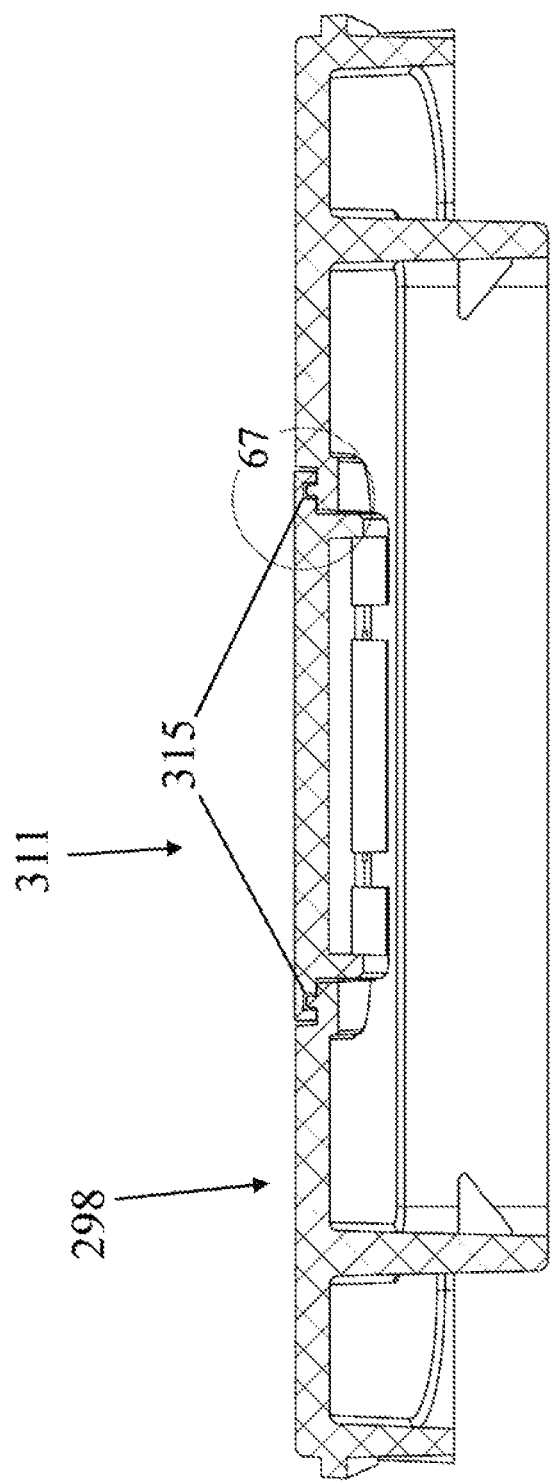
FIG. 66 is a sectional view of a portion of the outlet cover of FIG. 59 taken along section line 66 of FIG. 65.
Figure 67:
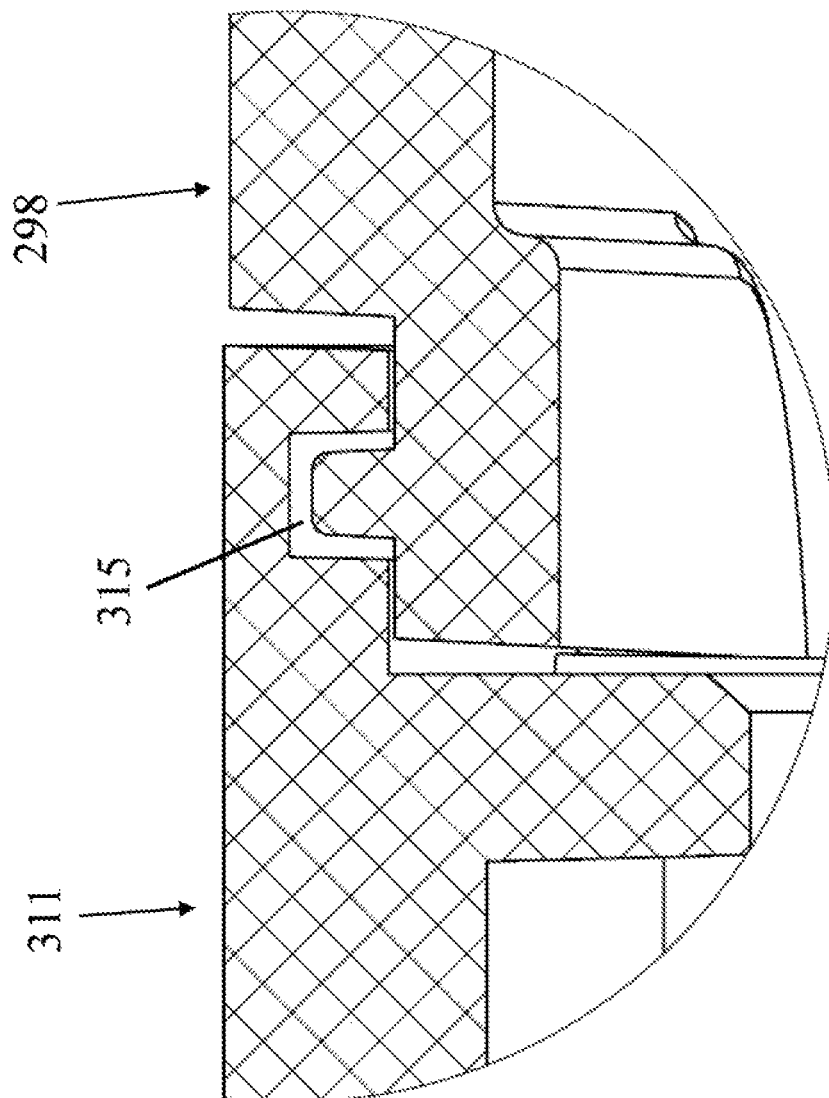
FIG. 67 is a close-up view of a portion of FIG. 66 taken along close-up section line 67.

In addition, the window 311 and the front wall 298 may both include a series of grooves and ridges 315 around an edge of the window 311 and on the front side or rear side of the front wall 298. These series of grooves and ridges 315 may mate together when the window 311 is seated in the front wall 298, as illustrated in FIGS. 66 and 67. This creates a tortuous path and restricts the entrance of water and other contaminants through the aperture 309. The window 311 may couple with the front wall 298 by being inserted into the aperture 309 either from the front or through the back of the front wall 298. Although the particular example provided in FIGS. 66 and 67 show the window 311 attached to the front side of the front wall 298, with the series of grooves and ridges 315 on the front side of the front wall 298, the same structure of grooves and ridges 315 could alternately be formed on the rear side of the front wall 298 and the window 311 could be mated to that structure and may provide a stronger connection. An edge of the front wall may be beveled or thinned as it extends outward to mate with a corresponding surface surrounding the aperture 309 on the front surface 298 for a more consistent transition between the window 311 edge and the front surface 306 of the front wall 298. By attaching the window to the lid in this way, no heat staking, solvent bonding or ultrasonic welding is necessary. The two pieces, window 311 and front wall 298, snap together, saving time and tooling cost, yet still restrict water entry due to the tortuous path.

Figure 64:
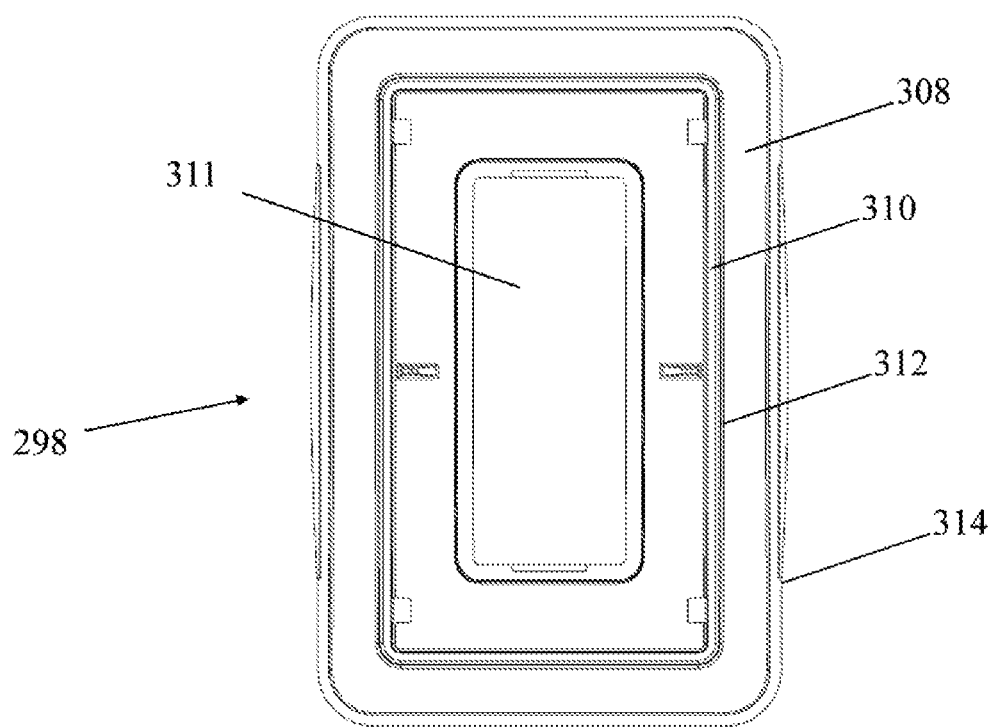
FIG. 64 is a rear view of the enclosure front wall of the outlet cover assembly of FIG. 54.
Figure 65:
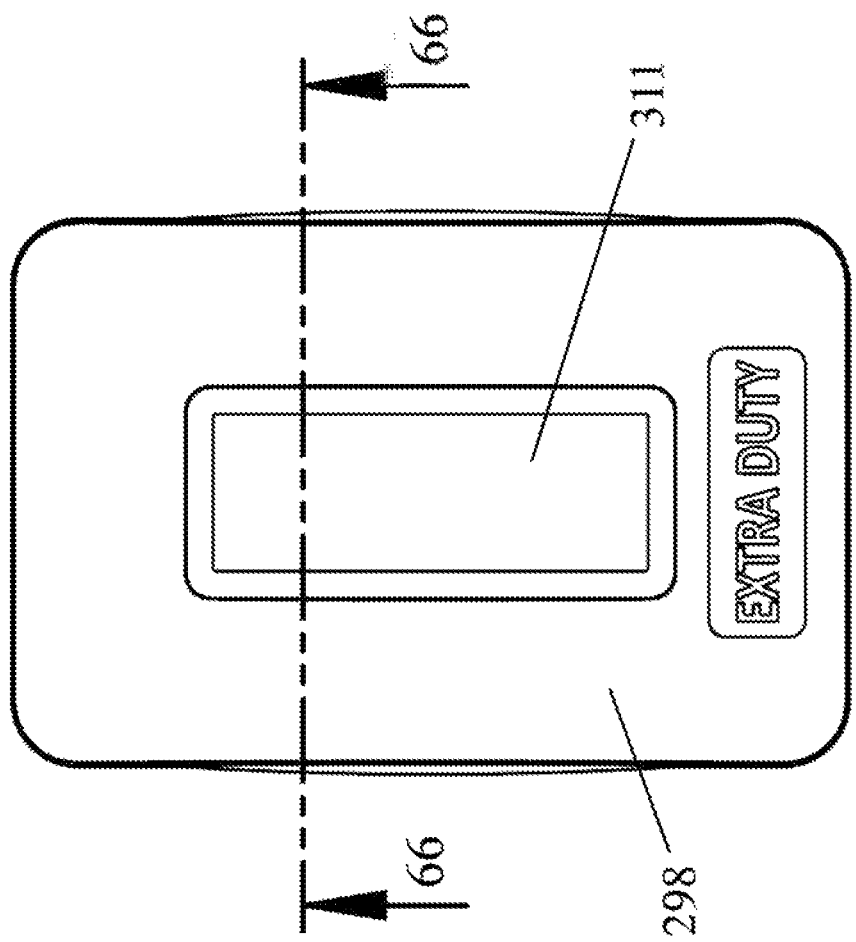
FIG. 65 is a front view of the front wall of the outlet cover of FIG. 59.

As shown in FIG. 64, the rear surface 308 includes a connecting wall 310 with a first perimeter 312 smaller than a second perimeter 314 of the front surface 306. The connecting wall 310 extends rearward of the rear surface 308 and engages with the leading edge 304 of the side wall 296. When the outlet cover 106 is manufactured in this way, the ledge 300 and the front surface 306 both have perimeters larger than the perimeter of the central aperture 288, therefore limiting the risk of pulling the enclosure 294 free of the lid frame 280.

Figure 56:
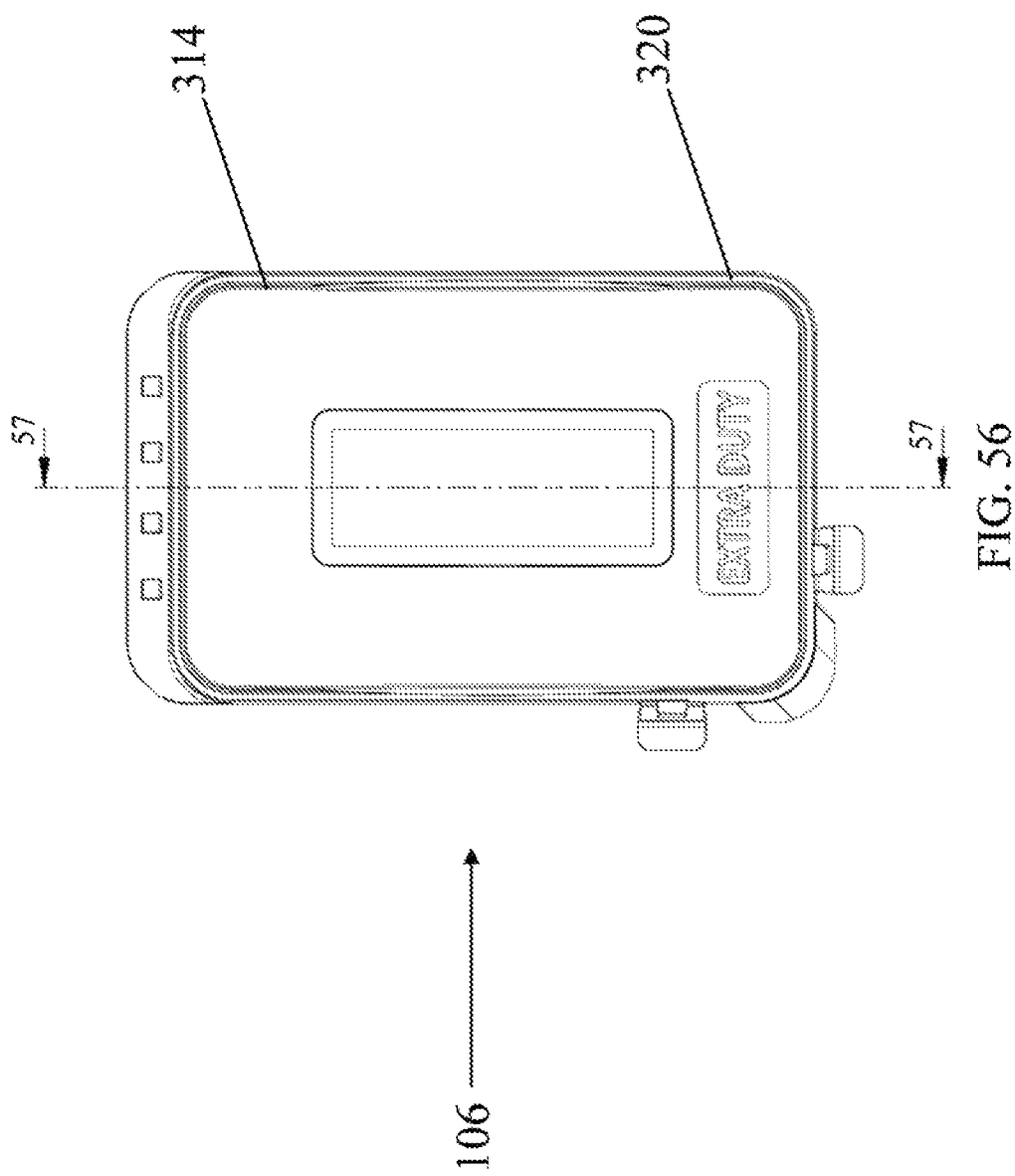
FIG. 56 is a front view of the outlet cover assembly of FIG. 54 in a closed position with the enclosure collapsed.
Figure 57:
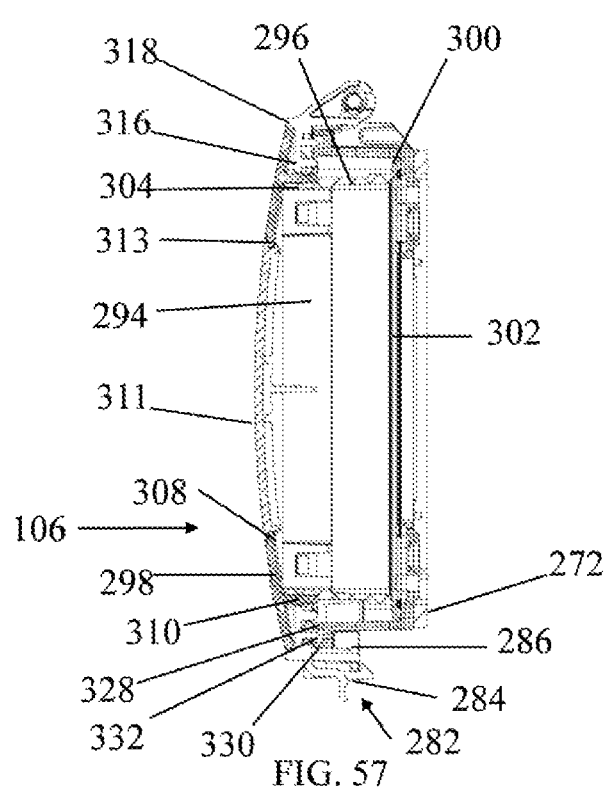
FIG. 57 is a sectional view of the outlet cover assembly of FIG. 56.
Figure 58:
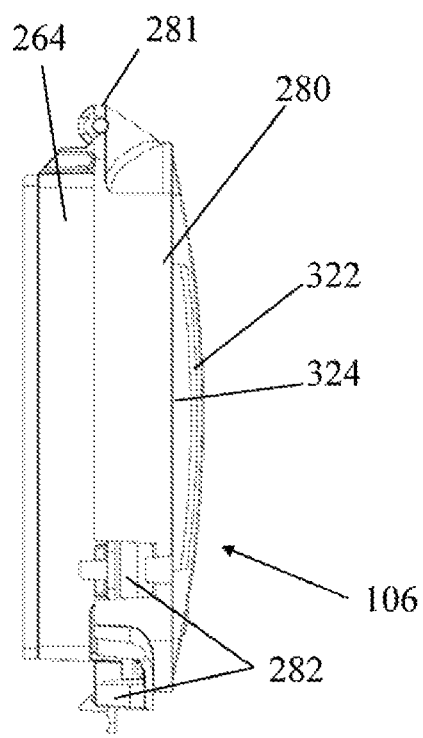
FIG. 58 is a side view of the outlet cover assembly of FIG. 56.
Figure 62:
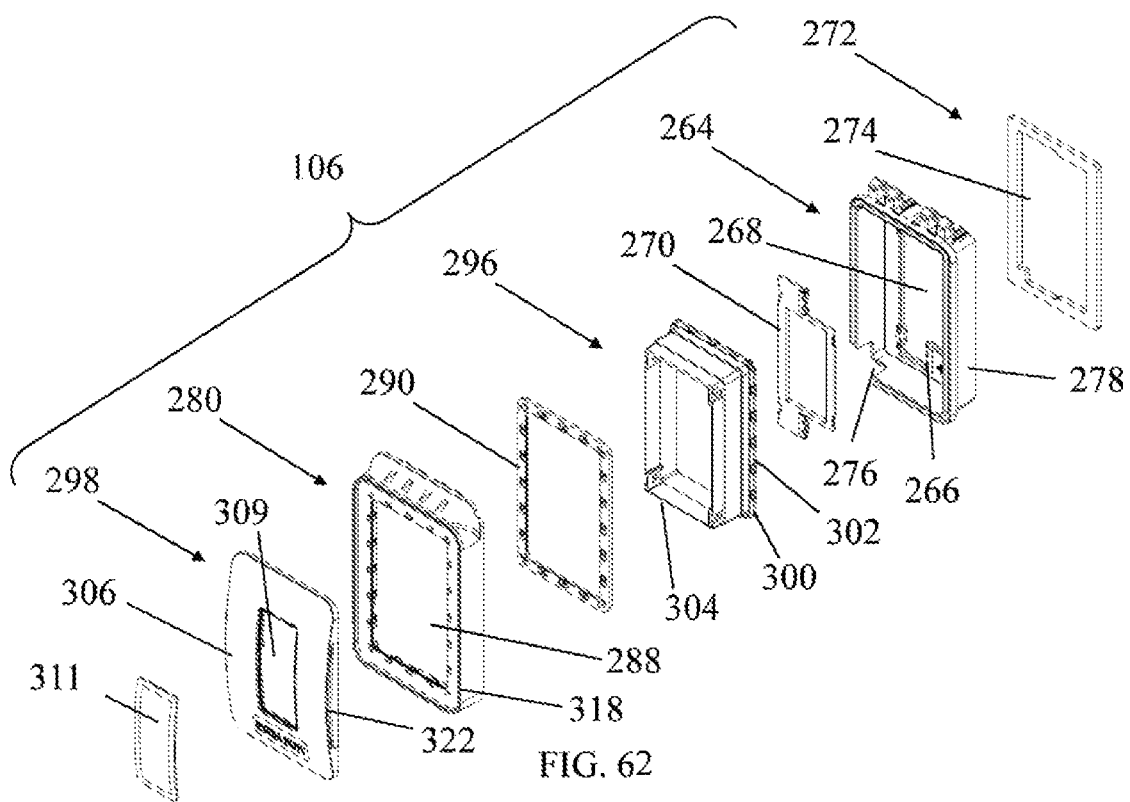
FIG. 62 is an exploded view of the outlet cover assembly of FIG. 54 in a closed position.

As shown in FIGS. 60 and 62, the lid frame 280 has a leading surface 316 which surrounds the central aperture 288. A lid frame lip 318 surrounds and extends forward of the leading surface 316. The second perimeter 314 of the enclosure front wall 298 is smaller than an inner perimeter 320 of the lid frame lip 318, as shown in FIG. 56. This allows the enclosure front wall 298 to sit within the lid frame lip 318 when the enclosure 294 is in the collapsed, not-in-use position. Alternatively, the lid frame lip 318 may include an outer perimeter smaller than the second perimeter 314 of the enclosure front wall 298 so that the lid frame lip 318 sits around the outside of the lid frame lip 318. As FIG. 58 further illustrates, at least two tabs 322 may extend outward from the enclosure front wall 298 on opposing sides. In particular embodiments, when the enclosure 294 is in the collapsed, not-in-use position, the convex front surface 306 extends forward of the lid frame lip 318, providing a gap 324 between the at least two tabs 322 and the lid frame lip 318. The at least two tabs 322 and the gap 324 may increase the ease with which the enclosure 294 is moved between the collapsed, not-in-use position and the extended, in-use position. Although the specific examples illustrated in FIGS. 54-62 show the lid having a convex surface that curves along only one axis, particular embodiments contemplated may include convex surfaces along more than one axis to create an elliptical or spherical front surface, or other partial curves and flat surfaces to create more complex surfaces such as pyramidal, frustum, truncated pyramid, or other-shaped front surface.

As specifically shown in FIG. 55, the base 264 may include a forward edge 326 having an inner lip 328 and an outer lip 330. FIG. 63 further illustrates the lid frame 280 including a second lip 332 which extends rearward on the lid frame rear surface 292 and surrounding the lid frame gasket 290. The forward edge 326 and the second lip 332 interact when the lid frame 280 is in the closed position, as shown in FIG. 60, with the second lip 332 inserting between the inner lip 328 and the outer lip 330, providing further protection against the entrance of water and other particles into the outlet cover 106.

Figure 15:
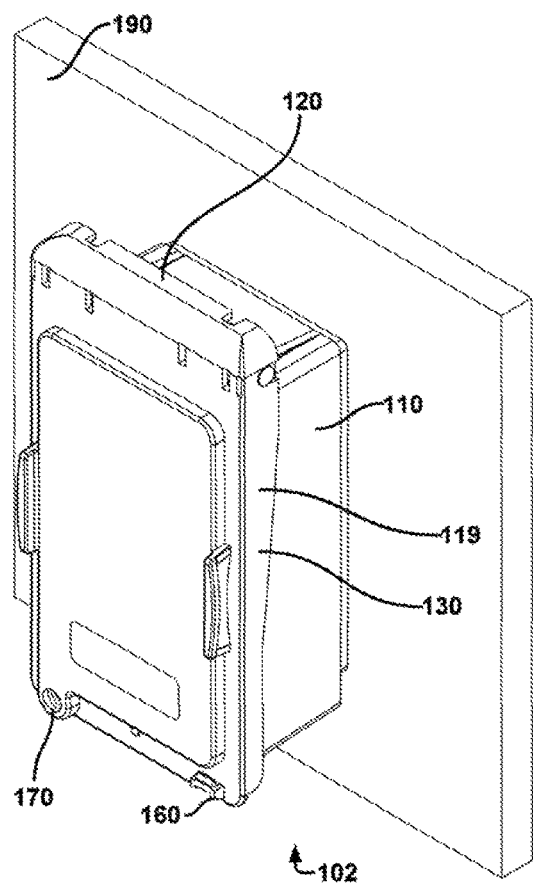
FIG. 15 is a perspective view of an outlet cover assembly configured according to an embodiment of a second approach in a closed collapsed position.
Figure 16:
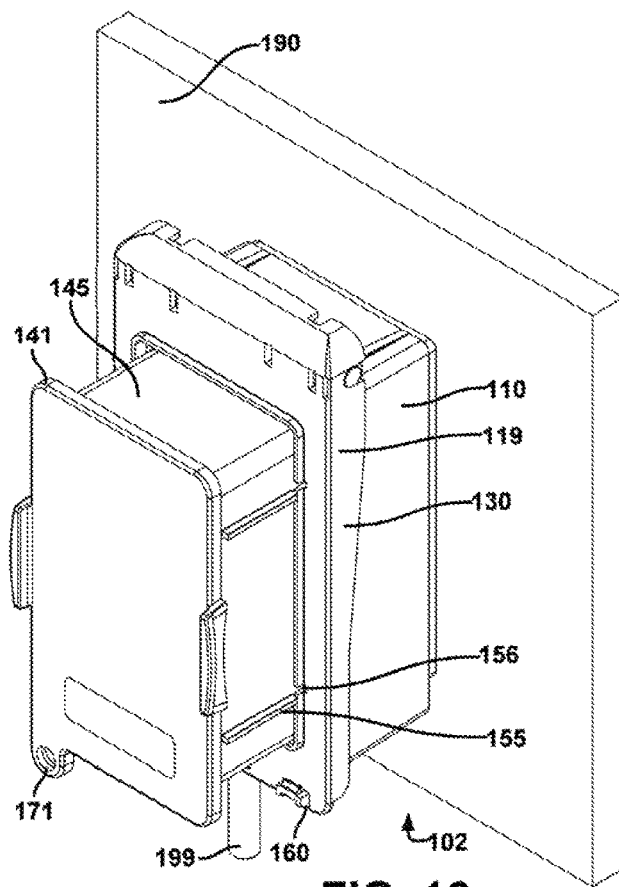
FIG. 16 is a perspective view of the outlet cover assembly of FIG. 15 with the lid in a closed expanded position.
Figure 68:
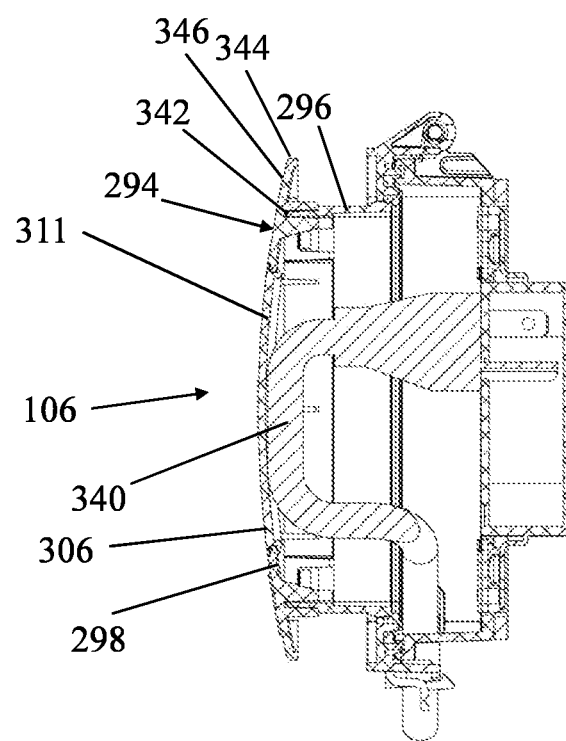
FIG. 68 is the sectional view of the outlet cover of FIG. 60 with an electrical cord.
Figure 70A:
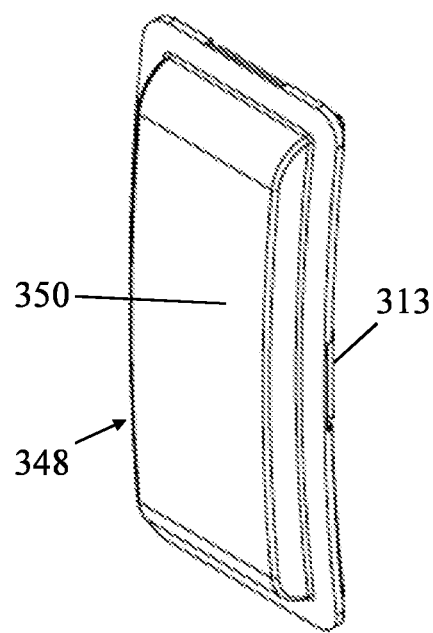
FIGS. 70A-70C are, respectively, perspective, left side and top views of a window portion of the outlet cover of FIG. 68.
Figure 70B:
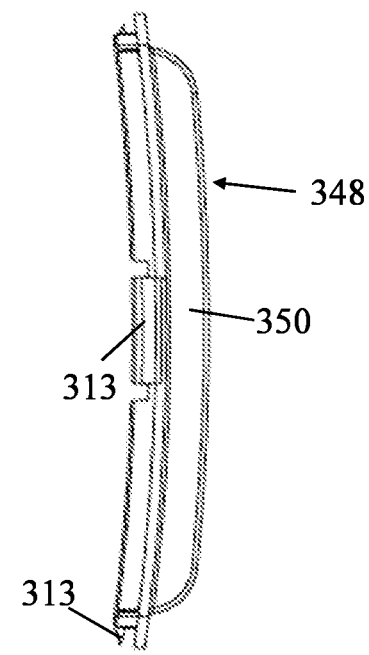
Figure 70C:
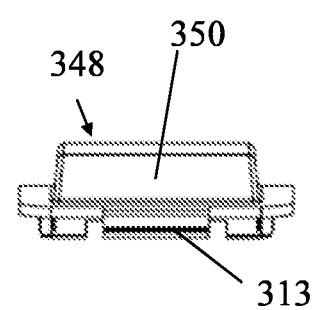
Figure 71A:
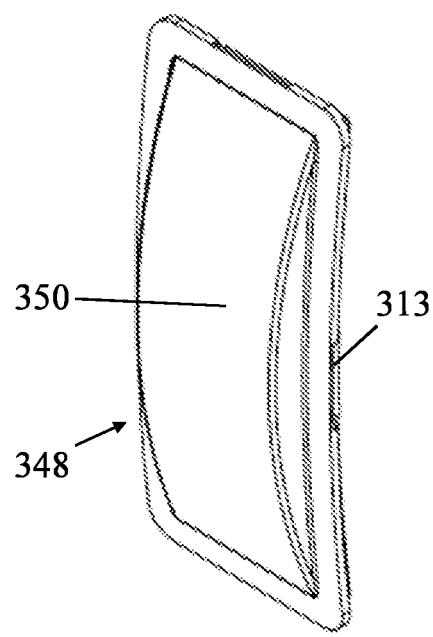
FIGS. 71A-71C are, respectively, perspective, left side and top views of a window portion of the outlet cover of FIG. 69B.
Figure 71B:
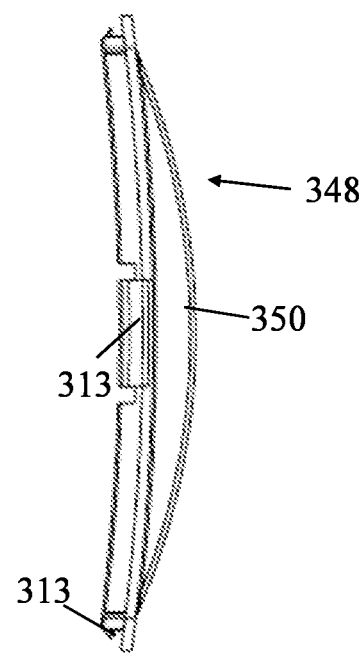
Figure 71C:
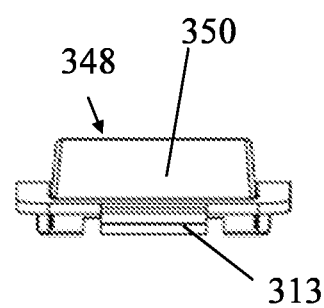
Figure 72:
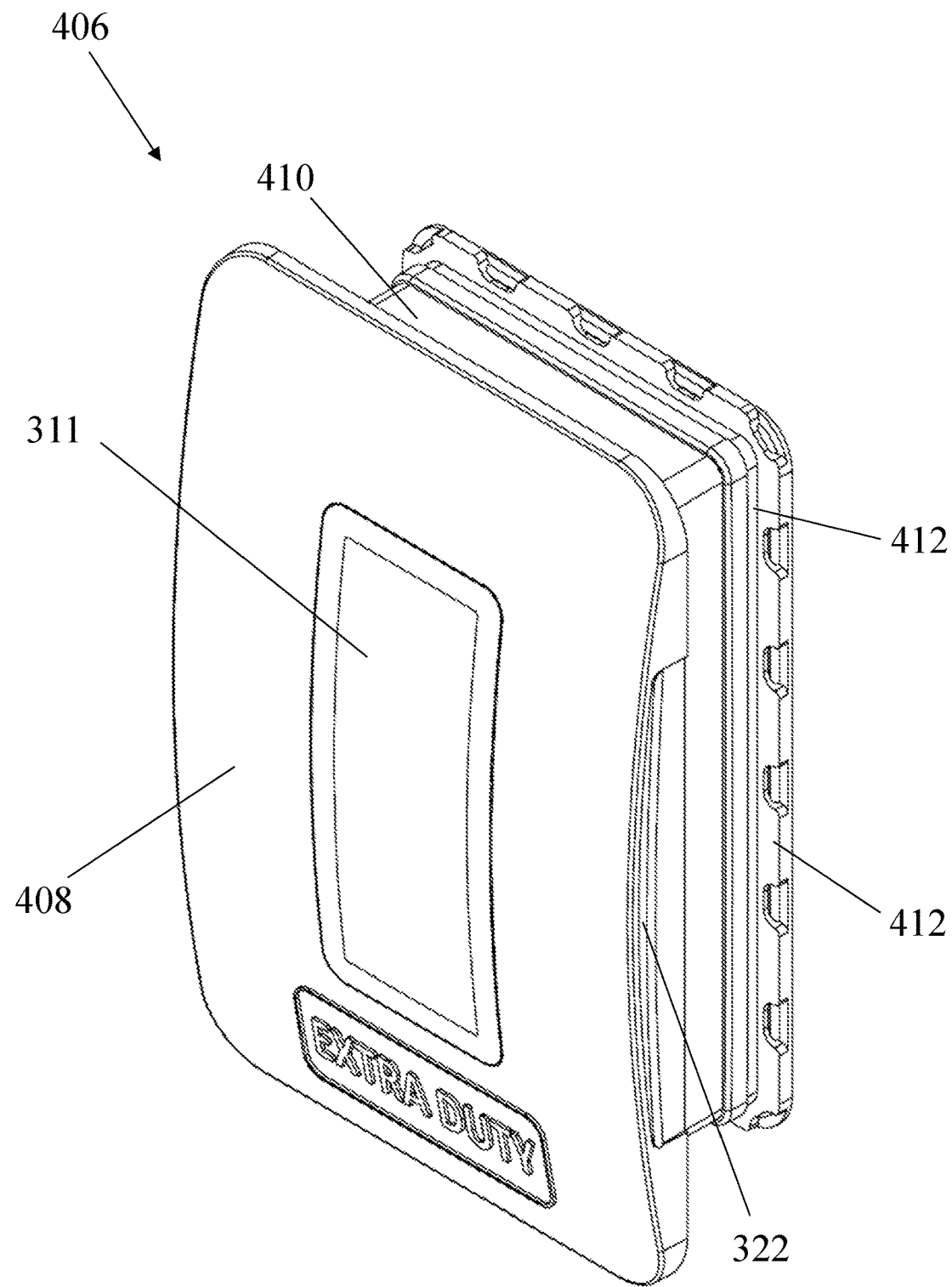
FIG. 72 is a perspective view of another embodiment of the enclosure.
Figure 73:
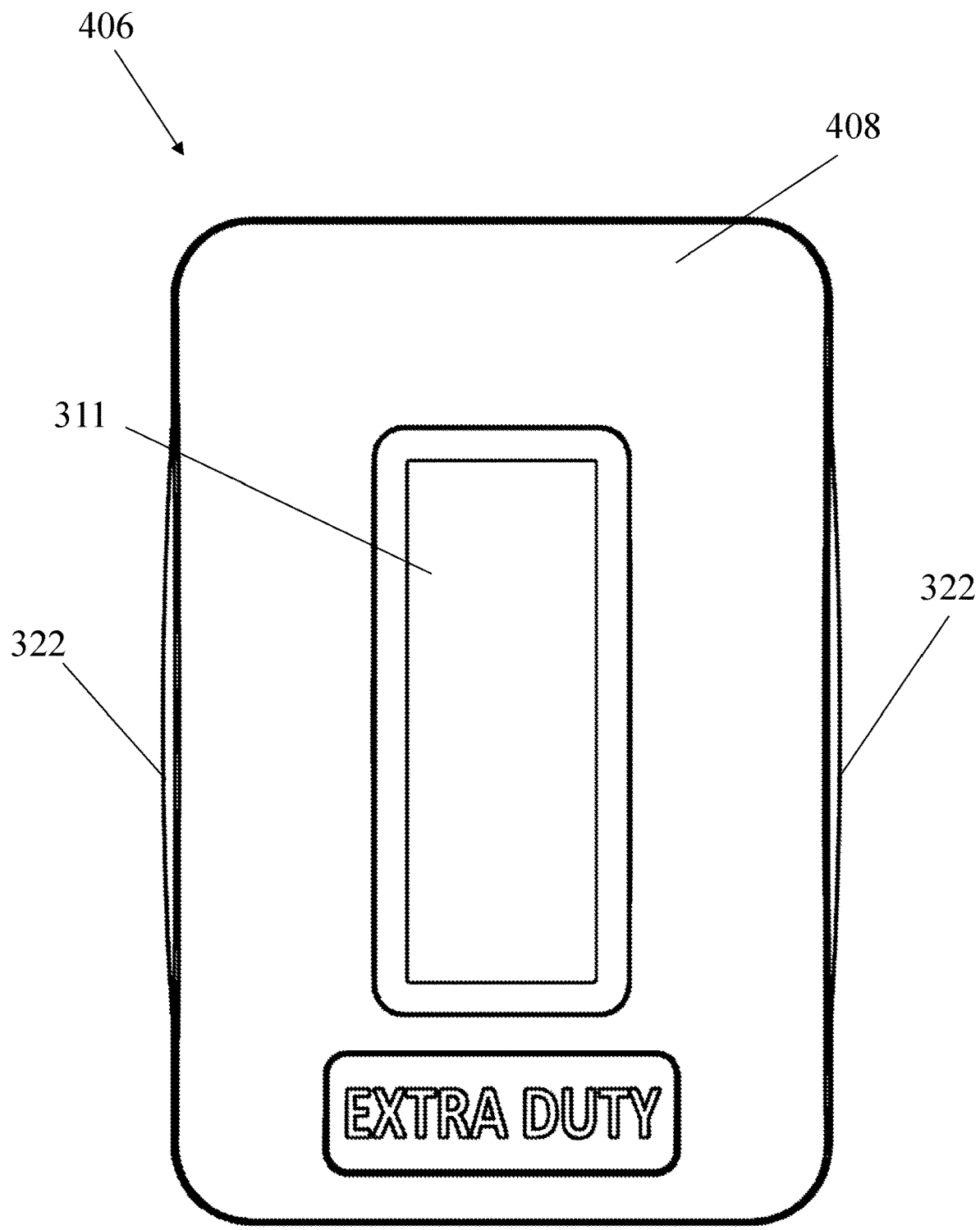
FIG. 73 is a front view of the enclosure shown in FIG. 72.

In some embodiments, the front wall of the enclosure 140 is substantially flat (see FIGS. 1 and 15, for example). In other embodiments, the front wall 298 of the enclosure 294 includes a convex front surface 306. The convex front surface 306 not only provides a gap 324 (FIG. 58) to assist in pulling out the enclosure 294, as illustrated in the cross-sectional view of FIG. 68, inclusion of a convex front surface 306 provides a more space within the enclosure 294 for an electrical plug cord 340 to fit within the enclosure 294 when the outlet cover 106 is closed. With the convex front surface 306 curving outward when compared to the enclosure side wall 296, the cord 340 has additional room to fold back on itself and extend toward the cord port exit 352 of the enclosure 294. This helps the outlet cover 106 to have an appearance of a shorter profile while allowing more space for the cord 340.

In embodiments that include a window 311, like the examples illustrated in FIGS. 54 and 62, like the front surface 306, the window 311 may be convex too, so that it curves outward in relation to, and extends forward of, the front edge 342 of the side wall 296 of the enclosure 294 and curves outward in relation to, and extends forward of the edge 344 of the flange 346 of the front surface 306. This applies whether the front surface is flat, like in FIGS. 1-26, or has a curved or other-shaped front surface, like in FIGS. 54-65.

For the embodiment illustrated in FIGS. 69A-69B, the various components of the outlet cover 107 are the same as the outlet cover 106 illustrated in FIG. 62 except that the window 348 is different. In particular embodiments, for example in the outlet cover 107 illustrated in FIGS. 69A-69B, the window 348 may be formed to itself include a portion of the window 348 that extends outward in relation to the front surface 306 of the enclosure 294 as a bulge 350. As illustrated in FIG. 69B, this provides even more cord 340 space within the enclosure without increasing the dimensions of the outlet cover 107 except at the window 348. In particular embodiments, the entire front wall 298 of the enclosure 294 may be formed of a transparent material so that the entire front wall 298 is a window and the front surface 306, therefore, has a window in the enclosure front wall 298.

FIGS. 70A-C and 71A-C illustrate two embodiments of outlet cover windows 348, each having a bulge 350 that extends outward in relation to the front surface 306 of the enclosure 294 and clips 313 to help secure the window to the aperture 309 of the front wall 298. In the first embodiment shown in FIGS. 70A-C, the bulge 350 has a more immediate extension beyond the front surface 306 of the enclosure 294. In the second embodiment shown in FIGS. 71A-C, the bulge 350 has a more gradual extension beyond the front surface 306 of the enclosure 294. Both include convex outer surfaces, but that is not a requirement of the windows 348. The windows 311, 348 may, in some embodiments, be transparent, translucent, or opaque. Although in some embodiments the windows 311, 348 of this disclosure are intended to provide an outside view into the inside of the outlet covers, some embodiments may be opaque so an observer cannot see into the outlet cover but can still receive the advantage of the increased space within the cover.

FIGS. 72-81 illustrate another outlet cover 400. The outlet cover 400 has many of the same components and features as the outlet cover 106. For example, the outlet cover 400 may include a base 264, an insert 270, a cord port aperture 276, a lid 279, a lid frame 280, and a latch assembly 282 with a first latch member 284 and a second latch member 286, as disclosed with reference to the outlet cover 106 above. Other components and features disclosed above that have not been explicitly mentioned with reference to the outlet cover 400 may also be incorporated with the outlet cover 400. By specific reference and without limitation, the lid frame 280 of the outlet cover 400 may include a central aperture 288 and a lid frame gasket 290 as disclosed above. The central aperture 288 may be defined by an inner edge 402 of the lid frame 280. The gasket 290 may be positioned on a surface of the lid frame 280. The surface may be the rear surface 292 of the lid frame 280. The gasket 290 has a sealing edge 404 configured to reduce the flow of contaminants past the sealing edge 404 when the sealing edge 404 is in contact with another surface. The sealing edge 404 may extend inward past the inner edge 402 of the lid frame 280 so that the sealing edge 404 extends into the central aperture 288 (see FIGS. 79 and 81).

The outlet cover 400 also comprises an enclosure 406. The enclosure 406 generally has the same components and features as the enclosure 294. For example, as shown in FIGS. 72-75, the enclosure 406 may comprise a front wall 408, a side wall 410, and a ledge 412. The enclosure 406 is slidably coupled to the lid frame 280 within the central aperture 288, and is slidable within the lid frame 280 between the collapsed position and the extended position, as discussed in detail above, and as discussed in more detail below. The front wall 408 is positioned in front of the lid frame 280, the side wall 410 extends rearward from the front wall 408 through the central aperture 288 of the lid frame 280, and the ledge 412 extends outward from the side wall 410 positioned behind the lid frame 280 opposite the front wall 408. In other words, the front wall 408 and the ledge 412 are on opposite sides of the lid frame 280, thus keeping the enclosure 406 slidably coupled to the lid frame 280 within the central aperture 288. The outlet cover 400 may have at least two tabs 322 extending outward from the front wall 408. As disclosed above, the tabs 322 are configured to provide a grip for moving the enclosure 406 between the collapsed position and the extended position.

Figure 74:
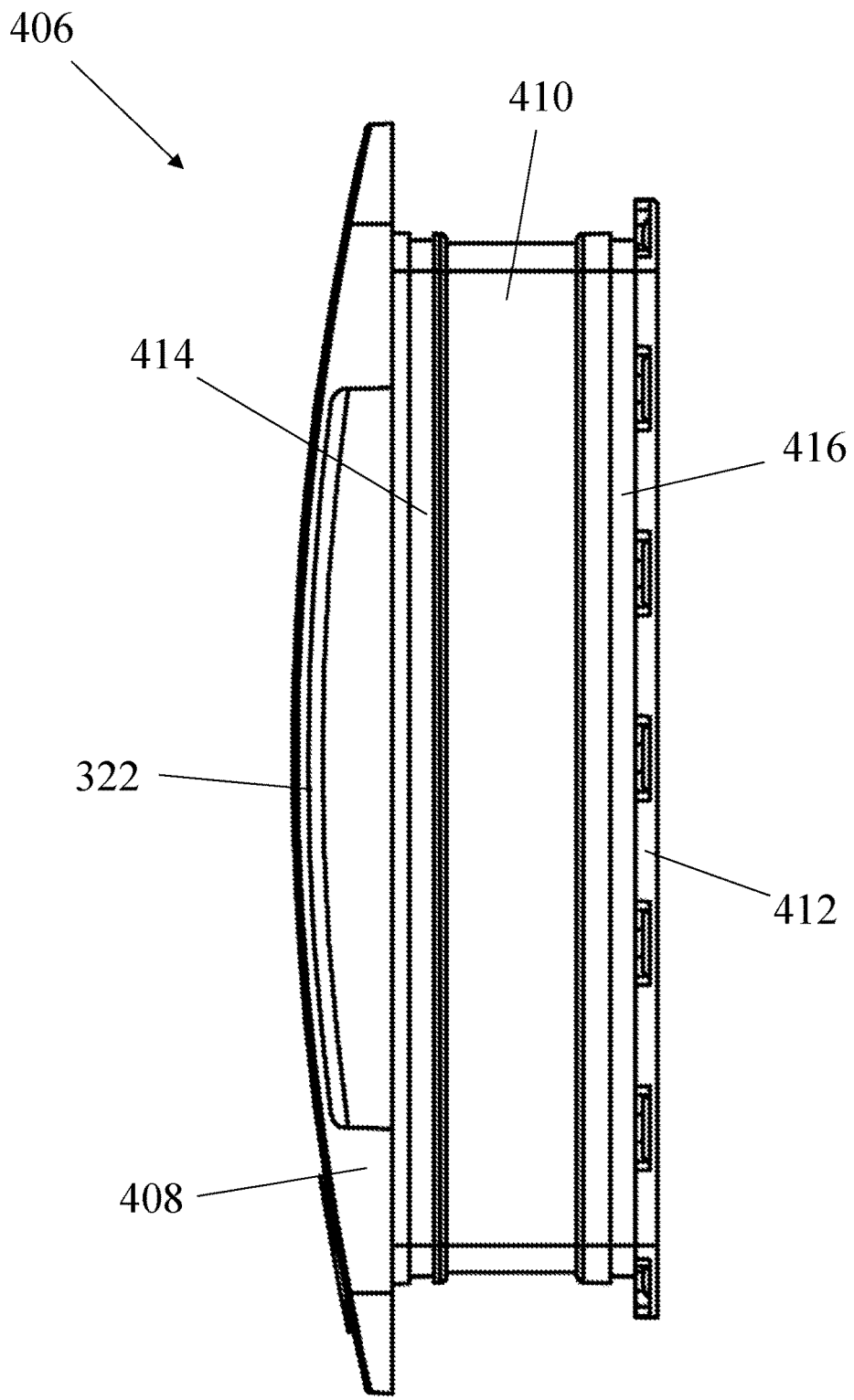
FIG. 74 is a right-side view of the enclosure shown in FIG. 72.
Figure 75:
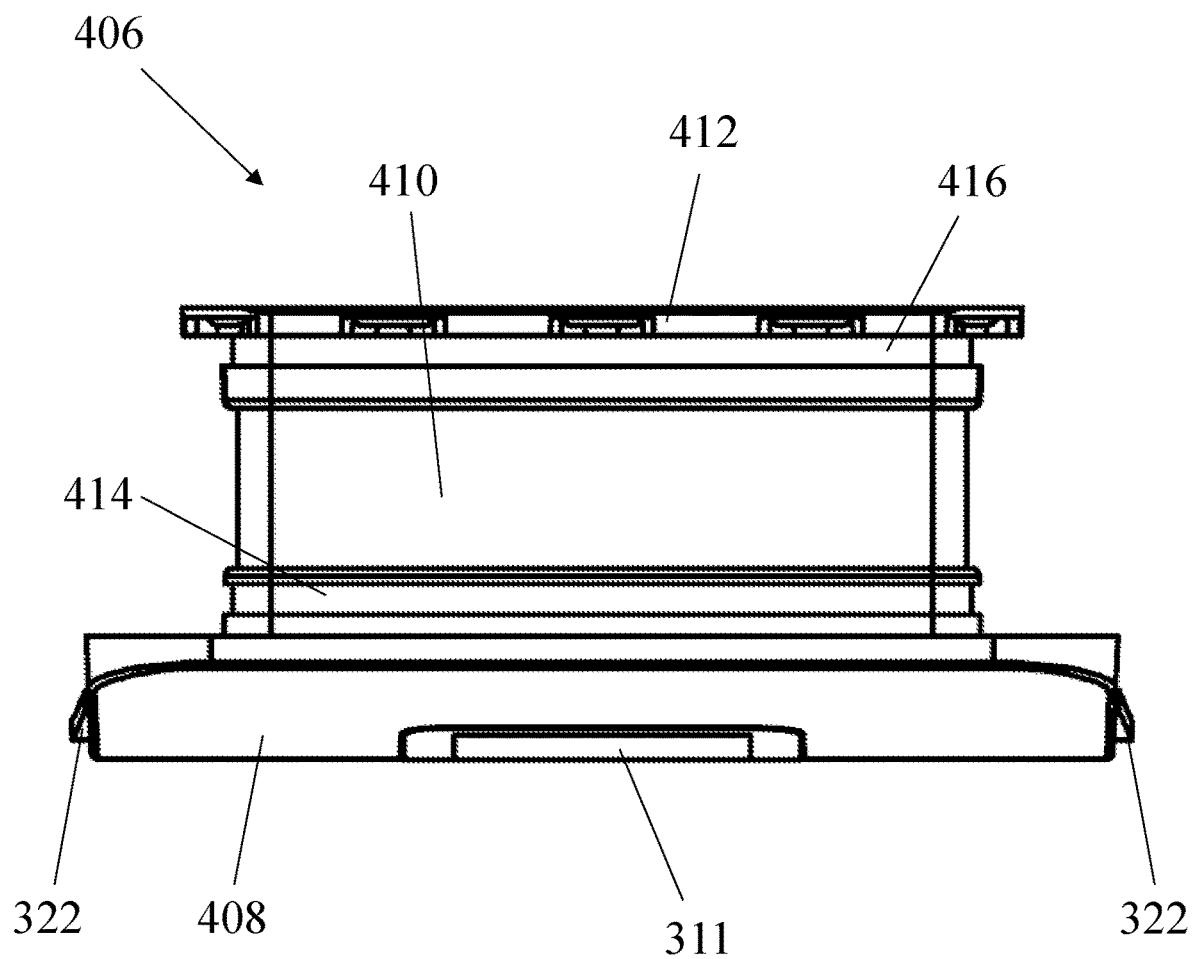
FIG. 75 is a top view of the enclosure shown in FIG. 72.
Figure 76:
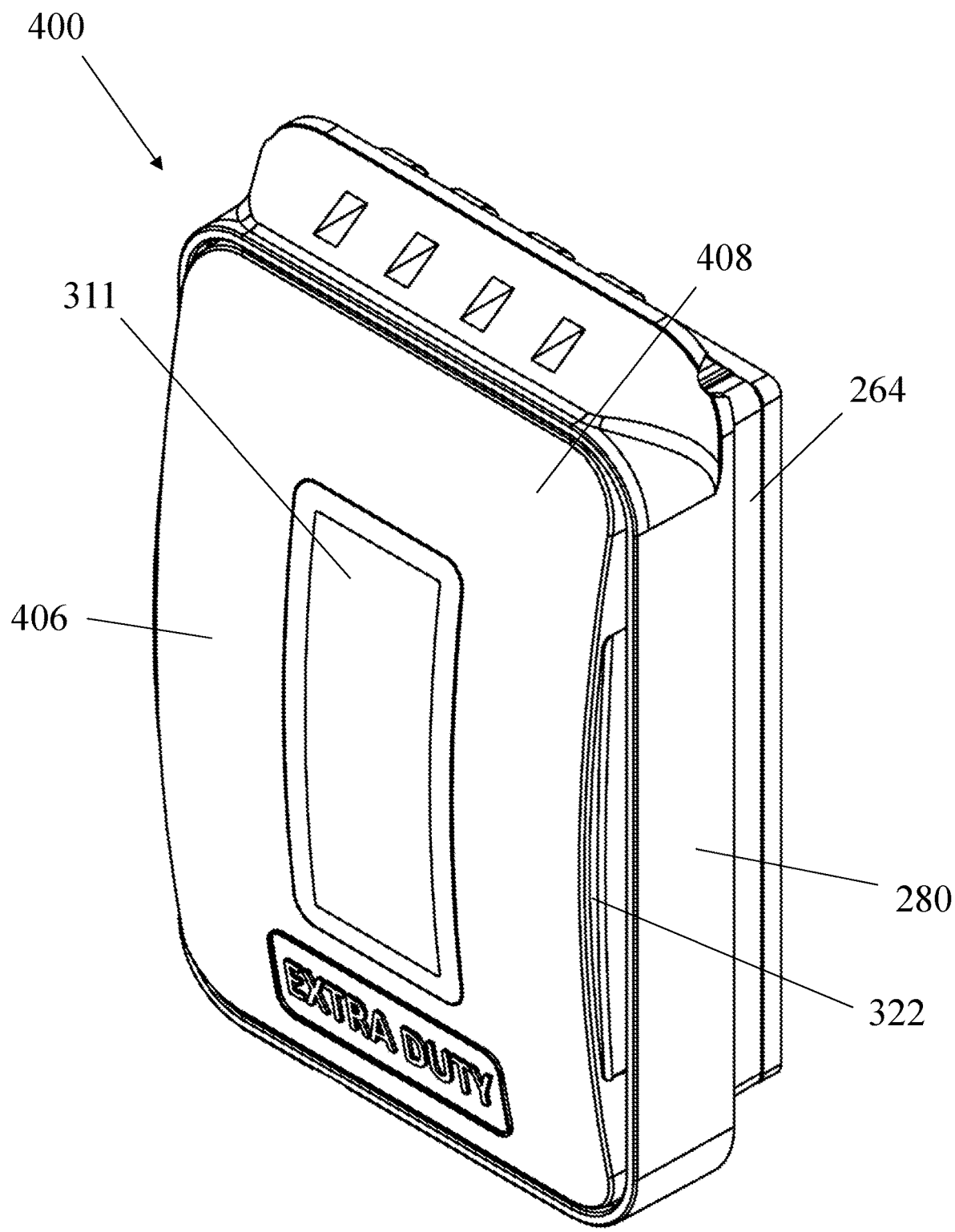
FIG. 76 is a perspective view of an electrical outlet cover implementing the enclosure shown in FIG. 72.
Figure 77:
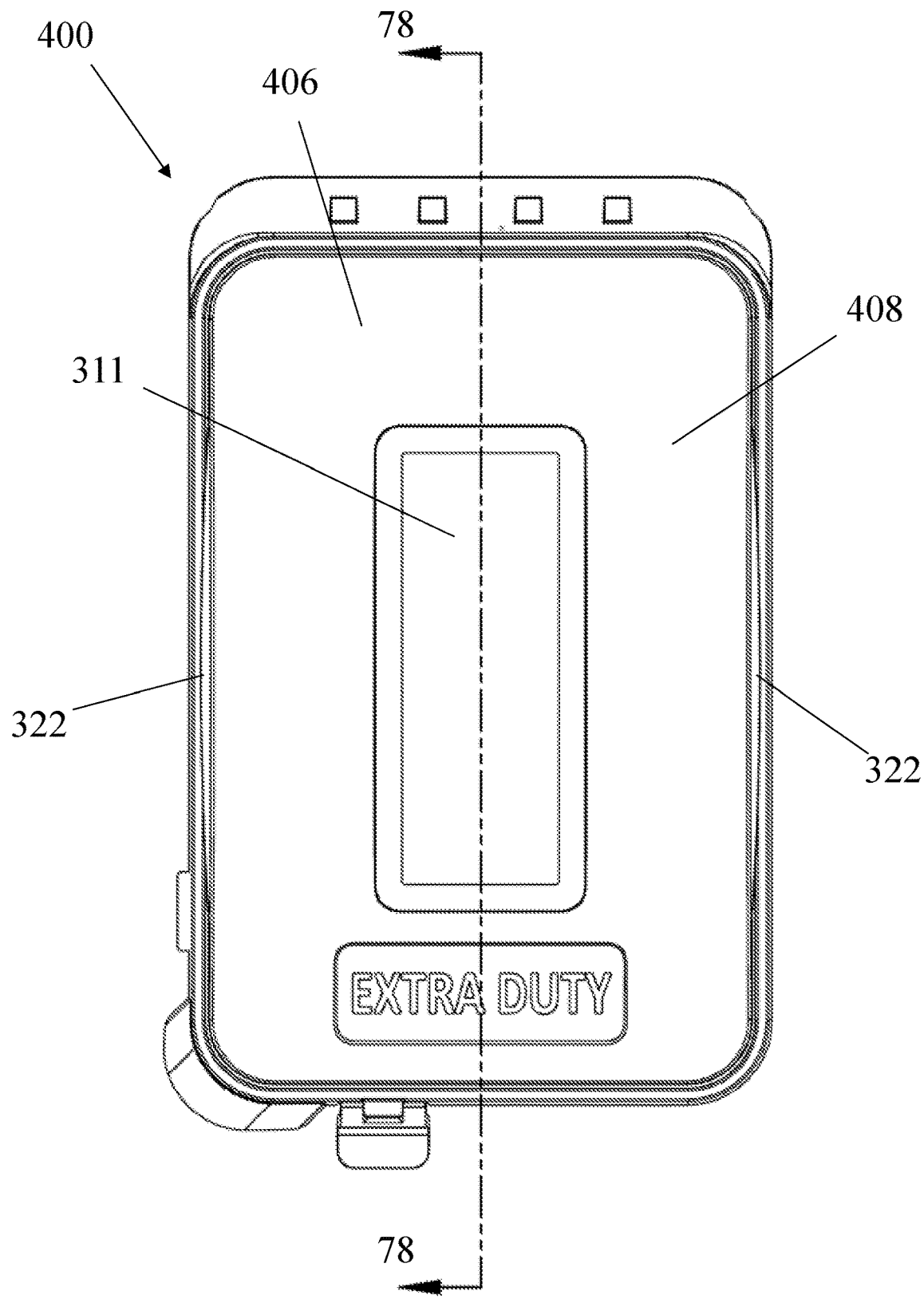
FIG. 77 is a front view of the electrical outlet cover shown in FIG. 76.
Figure 78:
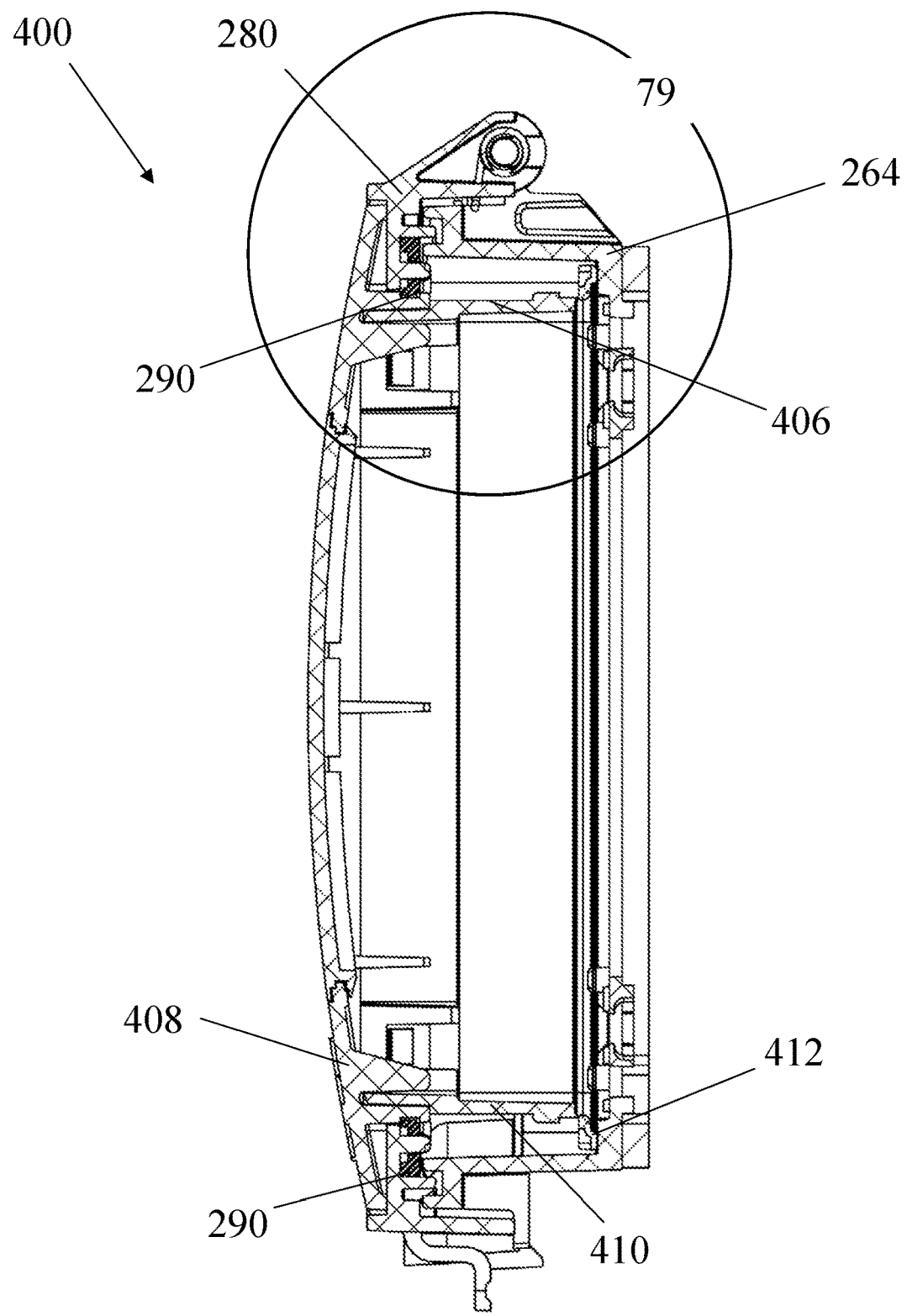
FIG. 78 is a cross section view of the electrical outlet cover shown in FIG. 77, taken along line 78-78, with the enclosure in the collapsed position.
Figure 79:
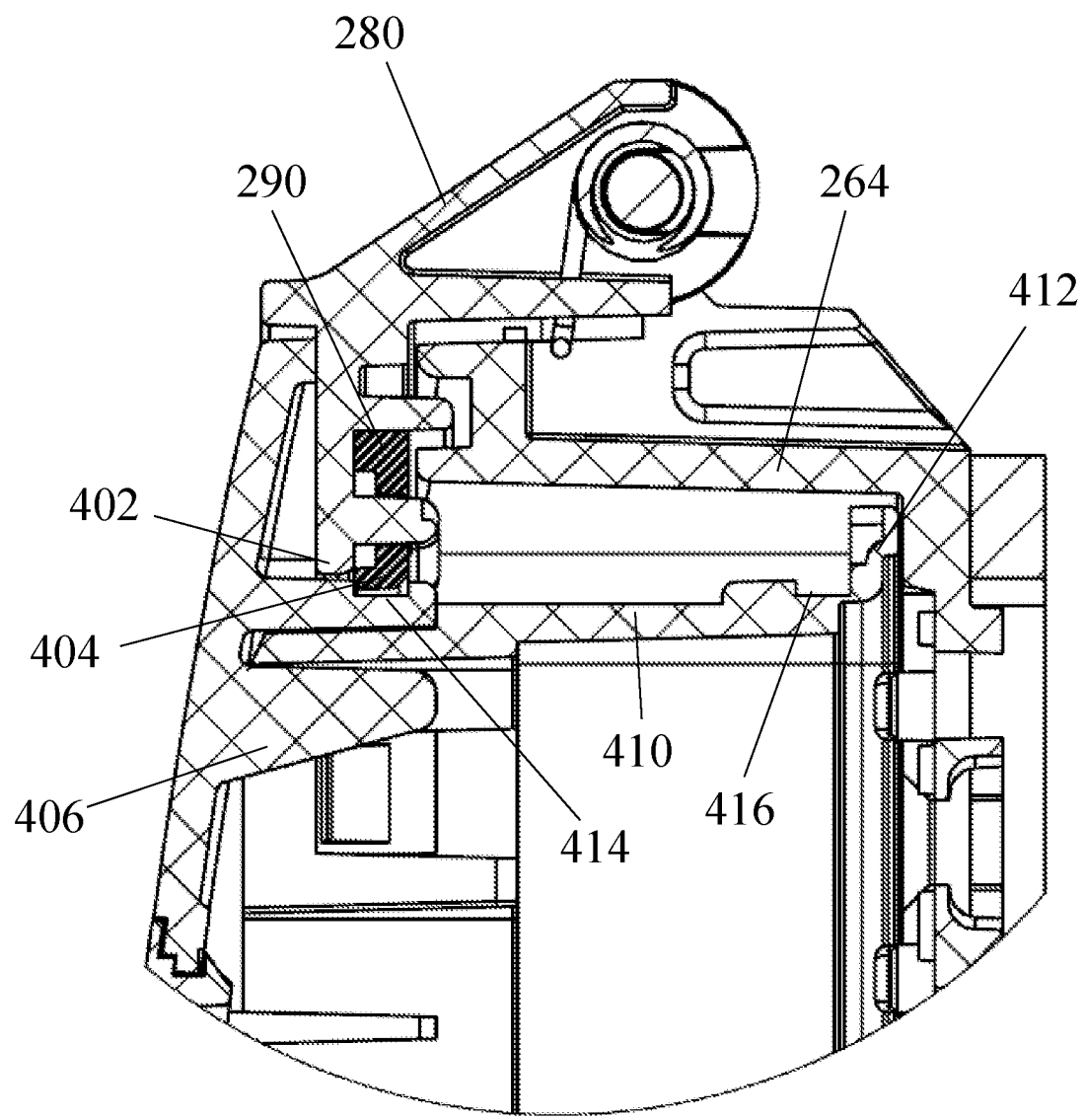
FIG. 79 is a close-up view of the electrical outlet cover shown in FIG. 78, taken from circle 79.
Figure 80:
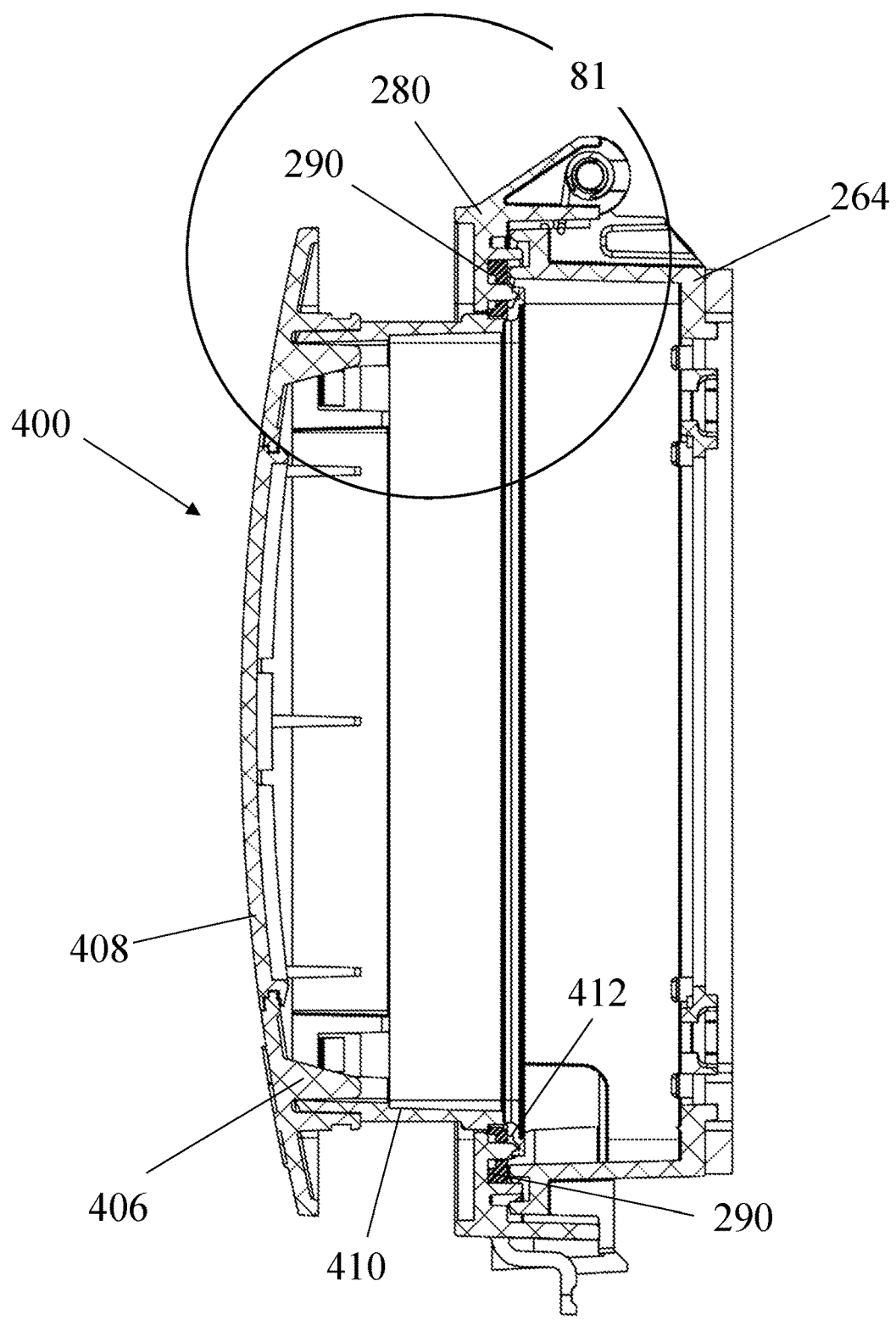
FIG. 80 is a cross section view of the electrical outlet cover shown in FIG. 77, taken along line 78-78, with the enclosure in the extended position.
Figure 81:
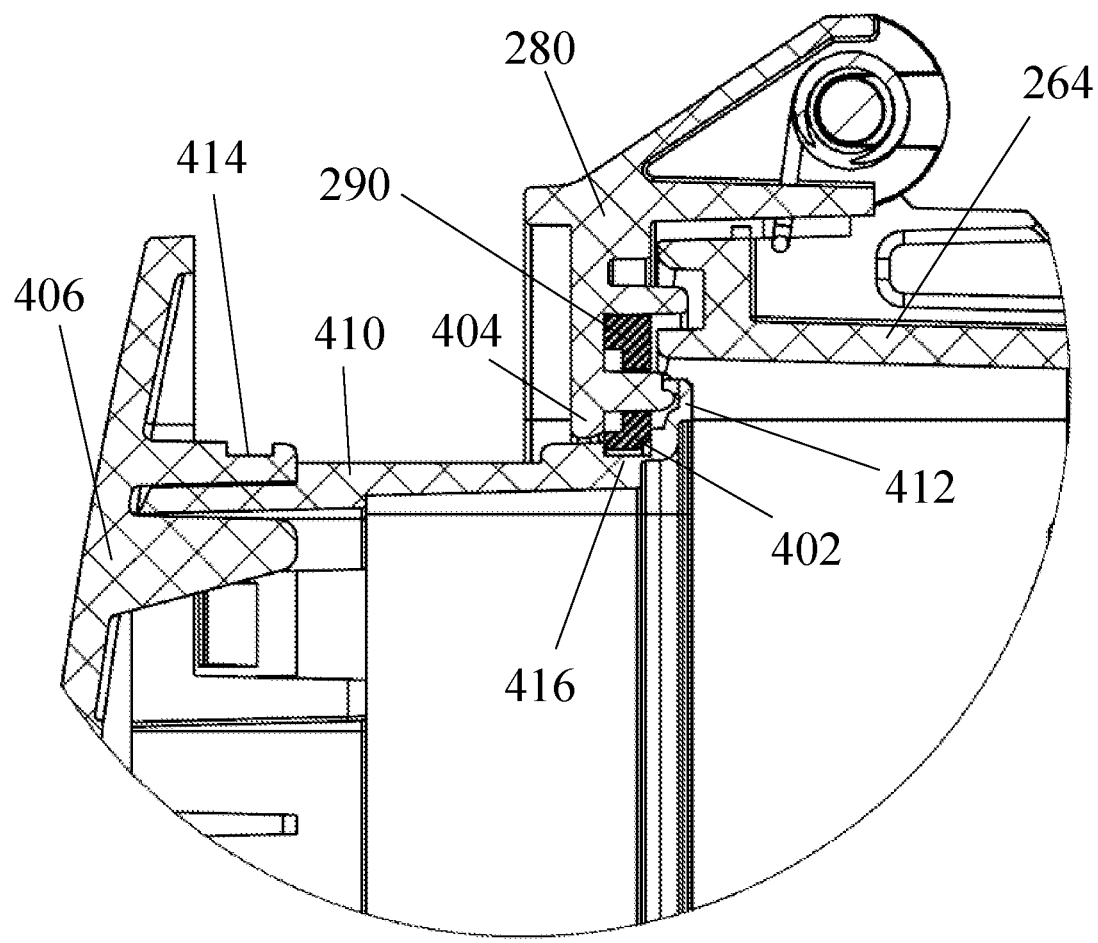
FIG. 81 is a close-up view of the electrical outlet cover shown in FIG. 80, taken from circle 81.

The side wall 410 may have a first groove 414 and a second groove 416. Each of the first groove 414 and the second groove 416 may extend around a perimeter of the side wall 410 and may be configured to receive the sealing edge 404 of the gasket 290. This may snap, click, or otherwise lock the enclosure 406 in place in an open or closed position. The first groove 414 may be adjacent the front wall 408 of the enclosure 406 and the second groove 416 may be adjacent the ledge 412 of the enclosure 408, as shown in FIGS. 74 and 75. The enclosure 406 may be in the collapsed position, as shown in FIGS. 78-79. When the enclosure 406 is in the collapsed position, the sealing edge 404 of the gasket 290 is in the first groove 414, and when the enclosure 406 is in the extended position, the sealing edge 404 of the gasket 290 is in the second groove 416. By positioning the sealing edge 404 of the gasket 290 in the first groove 414 or in the second groove 416, the enclosure 406 is better maintained in either the collapsed position or the extended position.

It will be understood that outlet cover implementations are not limited to the specific assemblies, devices and components disclosed in this document, as virtually any assemblies, devices and components consistent with the intended operation of an outlet cover implementation may be utilized. Accordingly, for example, although particular outlet covers, lids, sleeves, latches, snap-fit couplers, hinges, frames, enclosures, bubble covers, housings, joints, protrusions, ledges, clamps, grooves, ridges, couplers, fasteners, power sockets, and other assemblies, devices and components are disclosed, such may include any shape, size, style, type, model, version, class, measurement, concentration, material, weight, quantity, and/or the like consistent with the intended operation of an outlet cover implementation. Implementations are not limited to uses of any specific assemblies, devices and components; provided that the assemblies, devices and components selected are consistent with the intended operation of an outlet cover implementation.

Accordingly, the components defining any outlet cover implementations may be formed of any of many different types of materials or combinations thereof that can readily be formed into shaped objects provided that the components selected are consistent with the intended operation of an outlet cover implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

For the exemplary purposes of this disclosure, sizing, dimensions, and angles of outlet cover implementations may vary according to different implementations.

Various outlet cover implementations may be manufactured using conventional procedures as added to and improved upon through the procedures described here. Some components defining outlet cover implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of outlet covers are not limited to the specific order of steps as disclosed in this document. Any steps or sequence of steps of the assembly of outlet covers indicated herein are given as examples of possible steps or sequence of steps and not as limitations, since various assembly processes and sequences of steps may be used to assemble outlet covers.

The outlet cover implementations are described being used to configure a lid in various protruding, expanded, receding, or collapsed positions. Nevertheless, implementations are not limited to uses relating to the foregoing. Rather, any description relating to the foregoing is for the exemplary purposes of this disclosure, and implementations may also be used with similar results for a variety of other applications requiring a configurable outlet cover. For example, implementations may be used to adjustably position an outlet cover to, for example: reduce the size for shipping, house ancillary parts in a cavity, winterize an outlet cover, and so on.

What is claimed is:

1. A cover for an electrical outlet comprising:
   a base comprising an electrical device aperture extending through the base;
   a lid hingedly coupled to the base along a first side of the lid and pivotable between an open position and a closed position, the lid comprising a lid frame with a central aperture and a gasket with a sealing edge surrounding the central aperture; and
   an enclosure slidably coupled to the lid frame within the central aperture and slidable within the lid frame between a collapsed position and an extended position, the enclosure comprising a side wall having a first groove and a second groove each configured to receive the sealing edge of the gasket, wherein when the enclosure is in the collapsed position, the sealing edge of the gasket is in the first groove and the enclosure is positionally fixed in relation to the lid frame, and when the enclosure is in the extended position, the sealing edge of the gasket is in the second groove and the enclosure is positionally fixed in relation to the lid frame.

2. The cover of claim 1, the enclosure further comprising a front wall on a front side of the lid frame, wherein the side wall extends rearward from the front wall through the central aperture of the lid frame, and a ledge extending outward from the side wall on a rear side of the lid frame opposite the front side.

3. The cover of claim 2, wherein the first groove is adjacent the front wall of the enclosure and the second groove is adjacent the ledge of the enclosure.

4. The cover of claim 1, wherein the central aperture of the lid frame is defined by an inner edge of the lid frame and wherein the sealing edge of the gasket extends inward past the inner edge of the lid frame.

5. The cover of claim 1, wherein the gasket is positioned on a rear surface of the lid frame.

6. The cover of claim 1, wherein each of the first groove and the second groove extends around a perimeter of the side wall.

7. The cover of claim 1, further comprising at least two tabs extending outward from the front wall configured to provide a grip for moving the enclosure between the collapsed position and the extended position.

8. The cover of claim 1, further comprising a latch assembly comprising a first latch member on the base and a second latch member on the lid frame, the second latch member aligned with the first latch member when the lid frame is in the closed position, wherein the lid frame is releasably locked to the base when the lid frame is in the closed position.

9. The cover of claim 1, the base further comprising at least one cord port configured to allow an electrical cord to enter the outlet cover and couple to the electrical outlet.

10. A cover for an electrical outlet comprising:
    a base comprising an electrical device aperture extending through the base sized large enough to receive a portion of an electrical device therethrough;
    a lid hingedly coupled to the base along a first side of the lid and pivotable between an open position and a closed position, the lid comprising a lid frame with a central aperture defined by an inner edge of the lid frame and a gasket surrounding the central aperture on a surface of the lid frame, wherein the gasket has a sealing edge extending inward past the inner edge of the lid frame; and
    an enclosure slidably coupled to the lid frame within the central aperture and slidable within the lid frame between a collapsed position and an extended position, the enclosure comprising a front wall on a front side of the lid frame, a side wall extending rearward from the front wall through the central aperture of the lid frame, and a ledge extending outward from the side wall on a rear side of the lid frame opposite the front side, the side wall having a first groove and a second groove each configured to receive the sealing edge of the gasket, wherein when the enclosure is in the collapsed position, the sealing edge of the gasket is in the first groove and the enclosure is positionally locked in relation to the lid frame, and when the enclosure is in the extended position, the sealing edge of the gasket is in the second groove and the enclosure is positionally locked in relation to the lid frame.

11. The cover of claim 10, wherein the first groove is adjacent the front wall of the enclosure and the second groove is adjacent the ledge of the enclosure.

12. The cover of claim 10, wherein the gasket is positioned on a rear surface of the lid frame.

13. The cover of claim 10, wherein each of the first groove and the second groove extends around a perimeter of the side wall.

14. The cover of claim 10, further comprising at least two tabs extending outward from the front wall configured to provide a grip for moving the enclosure between the collapsed position and the extended position.

15. The cover of claim 10, further comprising a latch assembly comprising a first latch member on the base and a second latch member on the lid frame, the second latch member aligned with the first latch member when the lid frame is in the closed position, wherein the lid frame is releasably locked to the base when the lid frame is in the closed position.

16. The cover of claim 10, the base further comprising at least one cord port configured to allow an electrical cord to enter the outlet cover and couple to the electrical outlet.

17. A cover for an electrical outlet comprising:
    a base comprising an electrical device aperture extending through the base sized large enough to receive a portion of an electrical device therethrough;
    a lid hingedly coupled to the base along a first side of the lid and pivotable between an open position and a closed position, the lid comprising a lid frame with a central aperture defined by an inner edge of the lid frame and a gasket surrounding the central aperture on a rear surface of the lid frame, wherein the gasket has a sealing edge extending inward past the inner edge of the lid frame; and
    an enclosure slidably coupled to the lid frame within the central aperture and slidable within the lid frame between a collapsed position and an extended position, the enclosure comprising a front wall positioned in front of the lid frame, a side wall extending rearward from the front wall through the central aperture of the lid frame, and a ledge extending outward from the side wall positioned behind the lid frame opposite the front wall, the side wall having a first groove adjacent the front wall of the enclosure and a second groove adjacent the ledge of the enclosure, wherein each of the first groove and the second groove extends around a perimeter of the side wall and is configured to receive the sealing edge of the gasket, and wherein when the enclosure is in the collapsed position, the sealing edge of the gasket is in the first groove and the enclosure is positionally locked in relation to the lid frame, and when the enclosure is in the extended position, the sealing edge of the gasket is in the second groove and the enclosure is positionally locked in relation to the lid frame.

18. The cover of claim 17, further comprising at least two tabs extending outward from the front wall configured to provide a grip for moving the enclosure between the collapsed position and the extended position.

19. The cover of claim 17, further comprising a latch assembly comprising a first latch member on the base and a second latch member on the lid frame, the second latch member aligned with the first latch member when the lid frame is in the closed position, wherein the lid frame is releasably locked to the base when the lid frame is in the closed position.

20. The cover of claim 17, the base further comprising at least one cord port configured to allow an electrical cord to enter the outlet cover and couple to the electrical outlet.

* * * * *